United States Patent
Naidu et al.

(10) Patent No.: US 8,996,456 B2
(45) Date of Patent: Mar. 31, 2015

(54) DATA PROCESSING SERVICE

(71) Applicant: Google Inc., Mountain View, CA (US)

(72) Inventors: Siddartha Naidu, Seattle, WA (US);
Amit Agarwal, Gremont, CA (US);
Michael Sheldon, Seattle, WA (US);
Andrew Kadatch, Redmond, WA (US);
Jordan Tigani, Seattle, WA (US);
Jeremy P. C. Condit, Redmond, WA (US)

(73) Assignee: Google Inc., Mountain View, CA (US)

( * ) Notice: Subject to any disclaimer, the term of this patent is extended or adjusted under 35 U.S.C. 154(b) by 21 days.

(21) Appl. No.: 13/677,069

(22) Filed: Nov. 14, 2012

(65) Prior Publication Data

US 2013/0124467 A1    May 16, 2013

Related U.S. Application Data

(60) Provisional application No. 61/559,707, filed on Nov. 14, 2011.

(51) Int. Cl.
*G06F 17/30* (2006.01)
*G06F 7/00* (2006.01)

(52) U.S. Cl.
CPC .... *G06F 17/30575* (2013.01); *G06F 17/30339* (2013.01); *G06F 17/30979* (2013.01); *G06F 17/30312* (2013.01); *G06F 17/30345* (2013.01); *G06F 7/00* (2013.01)
USPC .......................................... 707/610; 707/691

(58) Field of Classification Search
USPC .................. 707/610, 614, 770, 769, 812, 782
See application file for complete search history.

(56) References Cited

U.S. PATENT DOCUMENTS

| 6,751,618 B1 | 6/2004 | Germscheid et al. |
| 7,970,903 B2 | 6/2011 | Oeda |

(Continued)

FOREIGN PATENT DOCUMENTS

| EP | 1024441 A2 * | 8/2000 |
| WO | WO 2011/064741 | 6/2011 |

(Continued)

OTHER PUBLICATIONS

Authorized Officer N. Lindner. International Preliminary Report on Patentability in International Application No. PCT/US2011/031123, mailed Oct. 9, 2012, 8 pages.

(Continued)

*Primary Examiner* — Robert Beausoliel, Jr.
*Assistant Examiner* — Pedro J Santos
(74) *Attorney, Agent, or Firm* — Fish & Richardson P.C.

(57) ABSTRACT

In general, the subject matter described in this disclosure can be embodied in methods, systems, and program products. A system includes a first data center, a second data center, and a third data center. The multiple data centers are configured to replicate a logical collection of data that comprises multiple logical partitions of data. The system comprises a first writing subsystem that is designated to write updates to a copy of a first logical partition of data that is stored by the first data center. The system comprises a second writing subsystem that is designated to write updates to a copy of a second logical partition of data that is stored by the second data center. The system comprises a third writing subsystem that is designated to write updates to a copy of a third logical partition of data that is stored by the third data center.

16 Claims, 26 Drawing Sheets

(56) References Cited

U.S. PATENT DOCUMENTS

| | | | |
|---|---|---|---|
| 8,099,499 B2 | 1/2012 | Oeda | |
| 8,458,250 B2* | 6/2013 | Sivasubramanian et al. | 709/203 |
| 8,504,515 B2* | 8/2013 | Prahlad et al. | 707/609 |
| 8,595,084 B2* | 11/2013 | Mohan | 705/26.1 |
| 2003/0028509 A1 | 2/2003 | Sah et al. | |
| 2005/0210082 A1 | 9/2005 | Shutt et al. | |
| 2006/0253419 A1 | 11/2006 | Lin et al. | |
| 2007/0022103 A1 | 1/2007 | Rys | |
| 2007/0088723 A1 | 4/2007 | Fish | |
| 2007/0156842 A1 | 7/2007 | Vermeulen et al. | |
| 2007/0276784 A1 | 11/2007 | Piedmonte | |
| 2009/0276442 A1 | 11/2009 | Parthasarathy | |
| 2010/0235394 A1* | 9/2010 | Sukanen et al. | 707/782 |
| 2010/0306162 A1* | 12/2010 | Madani | 706/52 |
| 2011/0145286 A1 | 6/2011 | LaRowe et al. | |
| 2011/0219020 A1 | 9/2011 | Oks et al. | |
| 2011/0264667 A1 | 10/2011 | Harizopoulos et al. | |
| 2011/0314027 A1 | 12/2011 | Xu et al. | |
| 2011/0314155 A1 | 12/2011 | Narayanaswamy et al. | |
| 2012/0016901 A1 | 1/2012 | Agarwal et al. | |
| 2012/0072414 A1 | 3/2012 | He | |
| 2012/0072910 A1 | 3/2012 | Martin et al. | |
| 2012/0096169 A1 | 4/2012 | Oeda | |
| 2012/0221528 A1 | 8/2012 | Renkes et al. | |
| 2013/0054532 A1 | 2/2013 | Schreter | |
| 2013/0117247 A1 | 5/2013 | Schreter et al. | |

FOREIGN PATENT DOCUMENTS

| | | |
|---|---|---|
| WO | WO 2011/126995 | 10/2011 |
| WO | WO 2011/146452 | 11/2011 |

OTHER PUBLICATIONS

International Search Report & Written Opinion for Application No. PCT/US11/36771, dated Aug. 26, 2011, 7 pages.

'Buzz by Google Research' [online] "Dremel: Interactive Analysis of Web-Scale Datasets," 2010, [retrieved on Nov. 12, 2012]. Retrieved from the Internet: <URL: https://profiles.google.com/goog.research.buzz/posts/WsARqxc7d7R/Dremel-Interactive-Analysis-of-Web-Scale-Datasets#goog.research.buzz/posts/WsARqxc7d7R>. 1 page.

Abadi et al., "Materialization Strategies in a Clumn-Oriented DBMS," *Data Engineering*, 2007, 466-477.

Adabi et al., "SW-Store: a vertically partitioned DBMS for Semantic Web data management," *The VLDB J; the International J on Very Large Data Bases*, 2009, 8(2):385-406.

Abadi, et al., "Column-Oriented Database Systems," *VLDB*, 2009, 2(2):1-2.

Abiteboul et al., "FOundations of Databases," *Addison Wesley*,1995.

Borroso and Holzle. "The Datecenter as a Computer: An Introduction to the Design of Warehouse-Scale Machines," Morgan & Claypool Publishers, 2009.

Chambers et al., "FlumeJava: Easy, Efficient Data-Parallel Pipeline," *PLDI*, 2010, 363-375.

Chang et al., "Bigtable: A Distributed Storage System for Structured Data, " *OSDI*, 2006, 20 pages.

Ćirić, Bojan. "Columnar Databases and Data Warehouse." Global Data Consulting, Dec. 3, 2009 [Retrieved on May 16, 2011]. Retrieved from the Internet <URL: http://www.globaldataconsulting.net/articles/theory/columnar-databases-and-data-warehouse> (5 pages).

Colby, "A Recursive Algebra and Query Optimization for Nested Relations, " *SIGMOD Rec.*, Jun. 1989, 18(2) : 273-283.

Czajkowski, "Sorting 1PB with MapReduce. Official Google Blog, " Nov. 2008 [Retrieved on Nov. 14, 2012]. Retrieved form the Internet <URL: http://googleblog.blogspot.com/2008/11/sorting-1pb-with-mapreduce.html> (2 pages).

Dean and Ghemawat, "MapReduce: Simplified Data Processing on Large Clusters, " *OSDI*, 2004, 1-13.

Dean, "Challenges in Building Large-Scale Information Retrieval Systems: Invited Talk," *WDSM*, 2009.

Ghemawat et al., "The Google File System, " *SOSP*, 2003.

Goetz Graefe, "Efficient columnar storage in B-trees," *ACM SIGMOD Record*, 2007, 36:3-6.

Google Code Labs. "Big Query (Labs): FAQ." [Retrieved on Apr. 8, 2011]. Retrieved from the Internet <URL: http://code.google.com/apis/bigquery/faq/html> (1 page).

'Hive' [online] "Apache Hive," 2012, [retrieved on Nov. 12, 2012]. Retrieved from the Internet: <https://cwiki.apache.org/confluence/display/Hive/Home%3bjsessionid=7A1F6676F6795855D103D82DCA326309>, 3 pages.

Ivanova et al., "Self-organizing strategies for a column-store database, "*Proceedings of the 11$^{th}$ International Conference on Extending Database Technology Advances in Database Technology*, 2008, pp. 157-168.

Kimball, Ralph. "Design Tip #121 Columnar Databases; Game Changers for DW/BI Deployment?" Kimball Group, Kimball University, No. 121, Mar. 3, 2010. (2 pages).

Liefke and Suciu "XMill: An Efficient Compressor for XML Data, " *SIGMOD*, 2000, 153-164.

Melniki et al., "Dremel: Interactive Analysis of Web-Scale Datasets." Google, Inc., publicly available since at least Jul. 16, 2010. (10 pages).

Olston et al., "Pig Latin: a Not-so-Foreign Language for Data Processing," *SIGMOD*, 2008, 1099-1110.

Pike et al., "Interpreting the Data: Parallel Analysis with Sawzall," *Scientific Programming*, 2005, 13(4), 277-298.

'Google Developers' [online] "Protocol Buffers: Developer Guide," 2012, [retrieved on Nov. 12, 2012). Retrieved from the Internet: http://code.google.com/apis/protocolbuffers/docs/overview.html 4 pages.

Wikipedia. "BigQuery." [Retrieved on Apr. 8, 2011). Retrieved from the Internet <URL: http://en.wikipedia.org/w/index/index.php?title=BigQuery&printable=yes> (2 pages).

Yu et al., "Efficient Processing of Distributed Top-k Queries," *DEXA*, 2005, pp. 65-74.

International Search Report and Written Opinion in International Application No. PCT/US2012/065068, mailed Feb. 18, 2013, 13 pages.

Gallersdorfer et al., "An Improved Method for Consistent Replication Data in the Intelligent Network," *Network Operations and Management Symposium*, Feb. 1994, 1:244-256.

Authorized Officer M. Denoual. International Search Report and Written Opinion in International Application No. PCT/US2011/031123, mailed Jun. 17, 2011, 14 pages.

Abadi et al, "Column-Stores vs. Row-Stores: How Different Are They Really?" ACM, 2008.

The Vertica Analytic Database Technical Overview White Paper, A DBMS Architecture Optimized for Net-Generation Data Warehousing, 2010.

\* cited by examiner

```
 1 procedure DissectRecord (RecordDecoder decoder,
 2                FieldWriter writer, int repetitionLevel)
 3   Add current repetitionLevel and definition level to writer
 4   seenFields = {} // empty set of integers
 5   while decoder has more field values
 6     FieldWriter chWriter =
 7       child of writer for field read by decoder
 8     int chRepetitionLevel = repetitionLevel
 9     if set seenFields contains field ID of chWriter
10       chRepetitionLevel = tree depth of chWriter
11     else
12       Add field ID of chWriter to seenFields
13     end if
14     if chWriter corresponds to an atomic field
15       Write value of current field read by decoder
16         using chWriter at chRepetitionLevel
17     else
18       DissectRecord (new RecordDecoder for nested record
19         read by decoder, chWriter, chRepetitionLevel)
20     end if
21   end while
22 end procedure
```

FIG. 4

```
1  procedure ConstructFSM(Field [] fields) :
2  for each field in fields:
3    maxLevel = maximal repetition level of field
4    barrier = next field after field or final FSM state otherwise
5    barrierLevel = common repetition level of field and barrier
6    for each preField before field whose
7        repetition level is larger than barrierLevel:
8      backLevel = common repetition level of preField and field
9      Set transition (field, backLevel)-> preField
10   end for
11   for each level in [barrierLevel+1..maxLevel]
12       that lacks transition from field:
13     Copy transition's destination from that of level-1
14   end for
15   for each level in [0..barrierLevel]:
16     Set transition (field, level) -> barrier
17   end for
18 end for
19 end procedure
```

FIG. 7

```
1  Record AssembleRecord(FieldReaders[] readers) :
2    record = create a new record
3    lastReader = select the root field reader in readers
4    reader = readers [0]
5    while reader has data
6      Fetch next value from reader
7      if current value is not NULL
8        MoveToLevel (tree level of reader, reader)
9        Append reader's value to record
10     else
11       MoveToLevel (full definition level of reader, reader)
12     end if
13     reader = reader that FSM transitions to
14       when reading next repetition level from reader
15     ReturnToLevel (tree level of reader)
16   end while
17   ReturnToLevel (0)
18   End all nested records
19   return record
20 end procedure
21
22 MoveToLevel (int newLevel, FieldReader nextReader):
23   End nested records up to the level of the lowest common ancestor
24     of lastReader and nextReader
25   Start nested records from the level of the lowest common ancestor
26     up to newLevel
27   Set lastReader to the one at newLevel
28 end procedure
29
30 ReturnToLevel (int newLevel) {
31   End nested records up to newLevel
32   Set lastReader to the one at newLevel
33 end procedure
```

FIG. 8

```
SELECT DocId AS Id,
   COUNT (Name.Language.Code) WRITTEN Name AS Cnt,
   Name.Url + ',' + Name.Language.Code AS Str
FROM t
WHERE REGEXP (Name.Url, '^http') AND DocId <20;
```

| Table Name | Number of records | Size (unreal. compressed) | Number of fields | Data center | Repl. factor |
|---|---|---|---|---|---|
| T1 | 85 billion | 87 TB | 270 | A | 3x |
| T2 | 24 billion | 13 TB | 530 | A | 3x |
| T3 | 4 billion | 70 TB | 1200 | A | 3x |
| T4 | 1+ trillion | 105 TB | 50 | B | 3x |
| T5 | 1+ trillion | 20 TB | 30 | B | 2x |

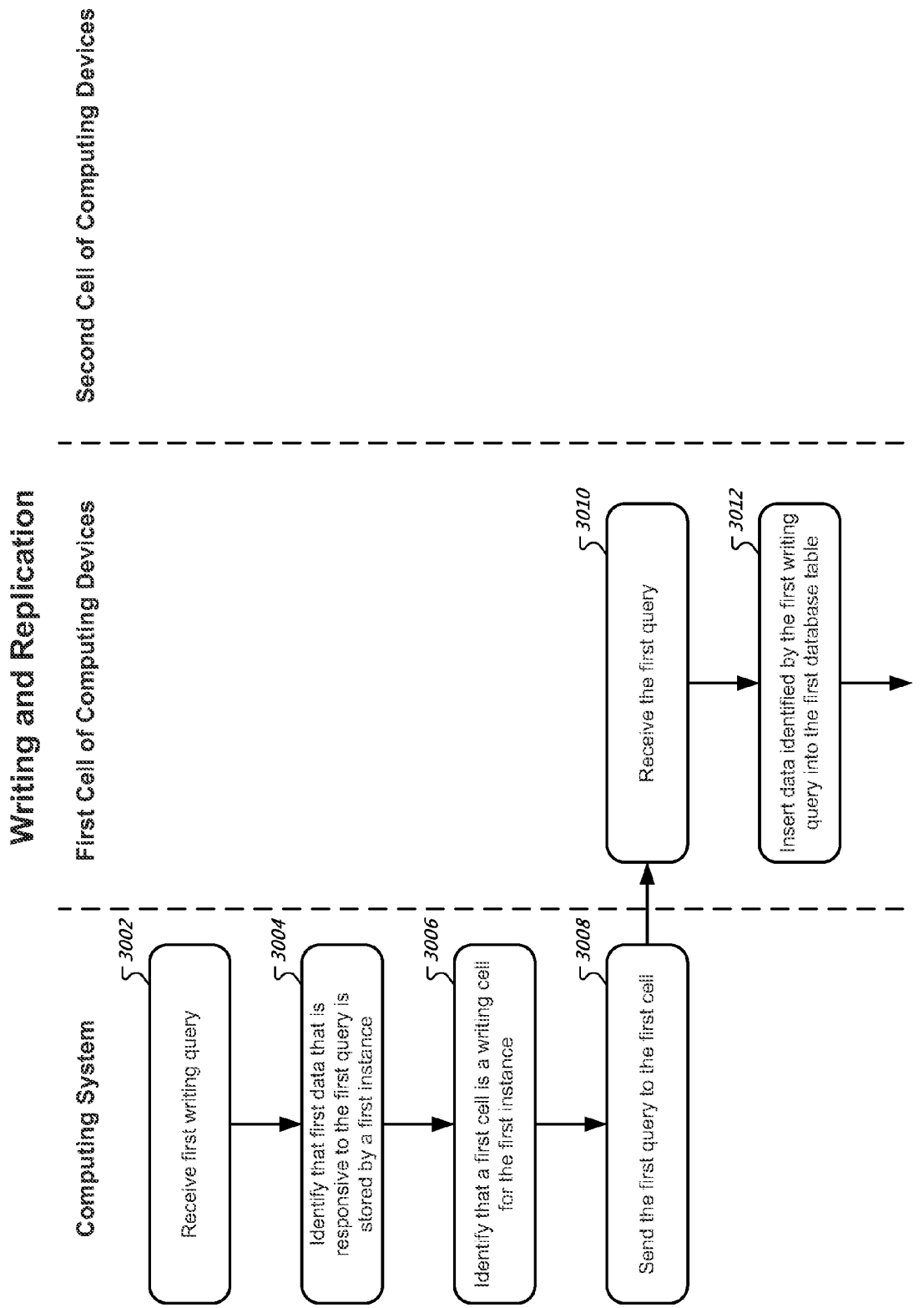

DATA PROCESSING SERVICE

CROSS-REFERENCE TO RELATED APPLICATION

This application claims priority to U.S. Provisional Application Ser. No. 61/559,707, filed on Nov. 14, 2011, the entire contents of which are hereby incorporated by reference.

TECHNICAL FIELD

This document generally describes techniques, methods, systems, and mechanisms for providing a data processing service.

BACKGROUND

The present disclosure generally relates to replication of data among computing devices and large-scale analytical data processing. Such data processing has become widespread in web companies and across industries, not least due to low-cost storage that enabled collecting vast amounts of business-critical data. Putting this data at the fingertips of analysts and engineers has grown increasingly important; interactive response times often make a qualitative difference in data exploration, monitoring, online customer support, rapid prototyping, debugging of data pipelines, and other tasks. Performing interactive data analysis at scale demands a high degree of parallelism. For example, reading one terabyte of compressed data in one second using today's commodity disks may require tens of thousands of disks. Similarly, CPU-intensive queries may need to run on thousands of cores to complete within seconds.

SUMMARY

A data processing service is herein disclosed. The described service provides a scalable, interactive ad-hoc query system for analysis of nested data. By combining multi-level execution trees and columnar data layout, the described system and methods is capable of running rapid and efficient queries such as aggregation queries. A columnar storage representation for nested records, a prevalent data model that may be used in many web-scale and scientific datasets, is described. In accordance with an embodiment, a record is decomposed into column stripes, each column encoded as a set of blocks, each block containing field values and repetition and definition level information. Level information is generated using a tree of field writers, whose structure matches the field hierarchy in the record schema. The record can be assembled from the columnar data efficiently using a finite state machine that reads the field values and level information for each field and appends the values sequentially to the output records. Compared with traditional solutions that extract all of the data fields from every record, a finite state machine can be constructed that accesses a limited amount of data fields in all or a portion of the records (e.g., a single data field in all of the records). Moreover, by storing additional metadata such as constraint information with the columnar storage representation, additional types of queries can be supported.

A multi-level serving tree is used to execute queries. In one embodiment, a root server receives an incoming query, reads metadata from the tables, and routes the queries to a next level in the serving tree. Leaf servers communicate with a storage layer or access the data on local storage, where the stored data can be replicated, and read stripes of nested data in the columnar representation. Each server can have an internal execution tree corresponding to a physical query execution plan, comprising a set of iterators that scan input columns and emit results of aggregates and scalar functions annotated with level information. In another embodiment, a query dispatcher is provided which schedules queries based on their priorities and balances the load. The query dispatcher also provides fault tolerance when one server becomes much slower than others or as a replica becomes unreachable. The query dispatcher can compute a histogram of processing times for execution threads on the leaf servers and reschedule to another server when processing time takes a disproportionate amount of time.

A web service may provide users remote access to the query system and a supporting data storage system. Users of the web service may upload data to the data storage system for hosted storage. A portion of uploaded data may include collections of nested records and may be stored as an object. The web service may provide remote data hosting for multiple users, allowing the multiple users to stream data to the web service and aggregate the data in a single location. Users may create tables on which to perform queries, and may import the data in one or more objects stored in the data storage system into the tables. The import process can include converting nested records in an object into columnar data, and storing the columnar data in a different data layer than the objects. Thus, from a user's perspective, a table may be filled with data from objects, but actually may instead reference underlying sets of columnar data. In this case, queries of the tables by web service users may cause the query system to query particular columns of data that underlie the tables.

The columnar data may be queried in situ. Maintaining the columnar data on a common storage layer and providing mechanisms to assemble records from the columnar data enables operability with data management tools that analyze data in a record structure. The system may scale to numerous CPUs and be capable of rapidly reading large amounts of data. Particular embodiments can be implemented, in certain instances, to realize one or more of the following advantages. Nested data may be operated on in situ, such that the data may be accessed without loading the data with a database management system. Queries of nested data may be performed in a reduced execution time than required by other analysis programs. A columnar storage data structure that is implemented on a common storage layer enables multiple different analysis programs to access the columnar storage data structure.

The details of one or more embodiments are set forth in the accompanying drawings and the description below. Other features, objects, and advantages will be apparent from the description and drawings, and from the claims.

DESCRIPTION OF DRAWINGS

FIG. 4 is an algorithm for dissecting a record into columns.

FIG. 7 is an algorithm for constructing a record assembly automaton.

FIG. 8 is an algorithm for assembling a record from columnar data.

FIGS. 30A-C show a swim-lane diagram illustrating an example of a process for writing and replicating data.

Like reference symbols in the various drawings indicate like elements.

DETAILED DESCRIPTION

Figure 1:
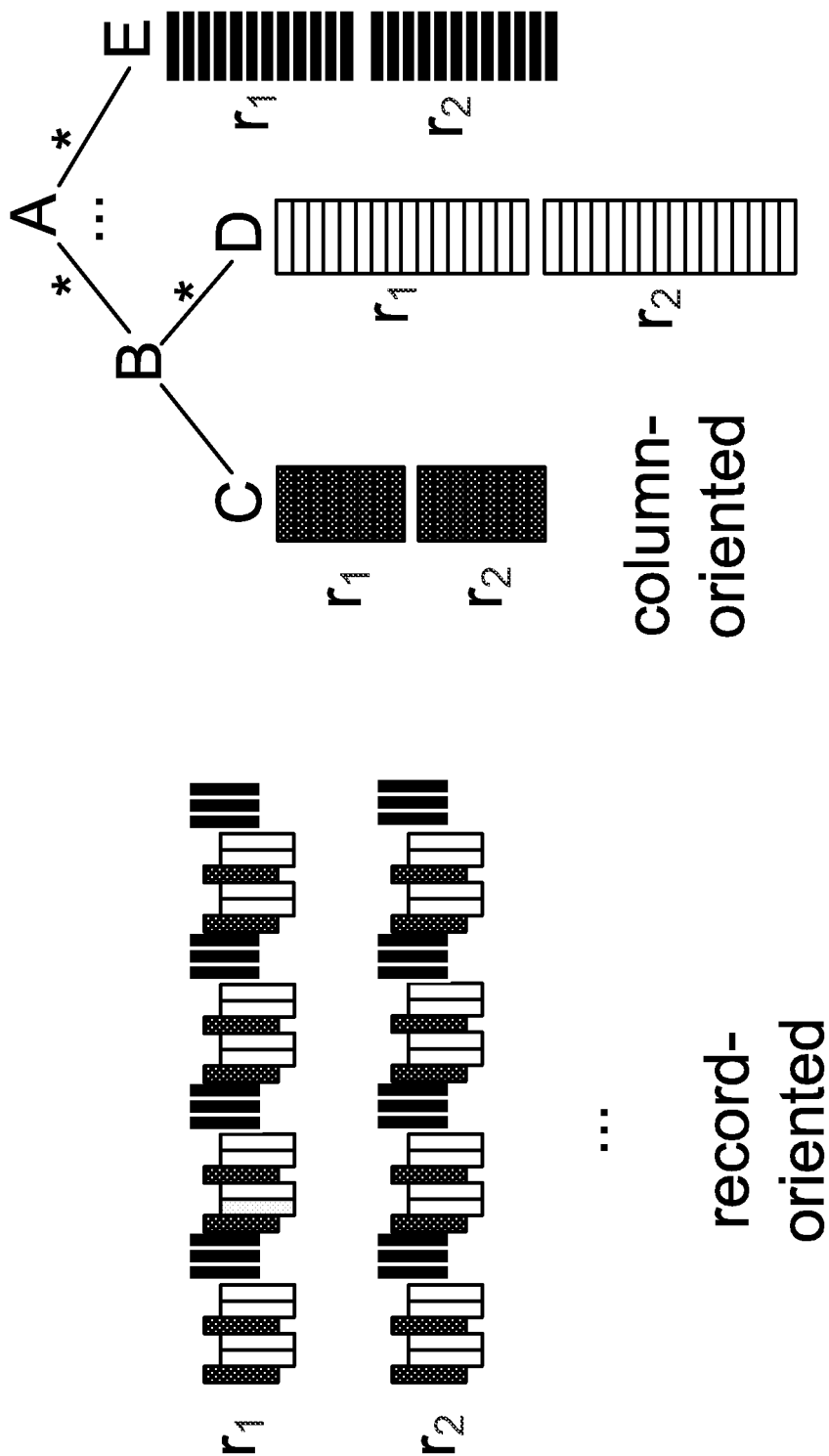
FIG. 1 illustrates record-wise v. columnar representation of nested data.

This document describes techniques, methods, systems, and mechanisms for a data storage and processing service. The described system may generate and process columnar storage representations of nested records. As an illustration, an organization may store data from web pages in records of nested information. The nested information may be compiled in a columnar data storage format that enables efficient queries of the data using a multi-level execution tree. The columnar data may be re-assembled into records for input into analysis programs that operate on record-oriented data.

More specifically, each record may be an instantiation of a schema that defines a formatting of records, where the records are created in accordance with the schema. For example, a schema may identify various fields for storing information about a web page and a structure for organizing fields in a record and their corresponding values. When an instance of a record for describing the characteristics of a web page is generated, the record may include for each field a data element and a corresponding value. The data element may define the semantics of the value in accordance with a definition in the schema. The term data element and field may be used interchangeably in this document. Field may also refer to a combination of a data element and a corresponding value.

A particular record may need not include all of the fields that are defined by a schema. Thus, the schema may serve as a 'template' from which fields may be selected for the particular record. For example, the schema may include a field for defining information about video content in a web page. If a web page does not include video content, then the record corresponding to the web page may not include the field from the schema that defines information about videos on the web page. Thus, some of the fields may be 'optional.'

Some of the fields in a record, however, may be 'required.' For example, a 'required' field in the schema may be a Uniform Resource Locator (URL) of a source location for the document that served the web page. The field may be required because every web page document may be retrieved from a source location (i.e., there is a URL available for every document) and because the field may be required to further process information on the web page (e.g., to determine if the content has changed).

A field may also be 'repeatable.' A field that is in the schema and that is defined as repeatable may be replicated at the location defined by the schema repeatedly in a instantiation of the schema (i.e., in a record). For example, a schema may include a field that is for defining documents that link to the web page. The schema may only specify the field a single time, but may indicate that the field is repeatable (e.g., because several documents may link to a particular web page). Thus, a record for the web page may include multiple fields that identify a value for a linking web page. The repeated fields may be located at a same level and nested beneath a parent field in the record (as discussed in more detail below).

The fields of the schema (and thus the fields in the records) may be nested. In other words, some fields may be children of other fields, which may be referenced as the parent fields, grandparent fields, etc. In some examples, children nodes are those nodes in the schema that are found within a pair of opening and closing curly brackets immediately following the parent node. Other implementations for nesting, however, may be utilized (e.g., the use of a start tag for the field and an end tag for the field). Thus, except for the fields that are at the highest level (e.g., the fields that are not children of any other fields), each field may have a parent field.

Nesting may be helpful for organizing information into conceptually-related chunks of information. Returning to our earlier example, the schema may include a 'Video' field. The 'Video' field may include several children fields that may identify the characteristics of the video (e.g., how long the video is, the format of the video, and the resolution of the video). Thus, when a record is constructed, children nodes may not be placed in the record if their parent nodes are not present. In other words, a record for a web page that does not include a video may not include a 'VideoLength' field because the record does not include a 'Video' field (i.e., the parent of the 'VideoLength' field). Application programs that enable viewing and editing a record may visually nest the dependent children off of the parent children (e.g., indent the children to the right of the parent field).

Analyzing millions of records may be time consuming. In some examples a user is interested in a data from a single field, but each of the records must be accessed in its entirety. For example, a user may request that an analysis program check each of millions of records to identify those records that are associated with web pages that include videos that are longer than ten minutes and that have a 'High' resolution. Because each record may be stored as a separate data structure, each entire record may need to be loaded into a database management system in order to query the record to determine if the record includes the particular combination of video length and resolution.

Such a loading of every single record may be prohibitively expensive, both on the quantity of servers that are required to perform the task and an amount of time necessary to complete the query. Significant time savings can be obtained by storing all of the values for a particular field—selected from across the millions of records—together in a contiguous portion of memory. Such storage of values from several records but for a particular field is called columnar storage. In contrast, the example where information for a particular record is stored contiguously in memory is referred to as record-oriented storage.

Columnar storage for nested records, however, poses unique difficulties. A field in a record may be identified by its path, which may include a listing of the field and the parent fields (e.g., GrandParent.Parent.Child). Because one or more of the fields in the path may be repeating, there may be several instances of a field with the same path name. Thus, when looking at a consecutive listing of columnar data for a particular field, a mechanism is needed to identify which values belong to which records, and for those records that include multiple values for a particular path, what is the respective location of the value in the record. In other words, given a sequence of values in a columnar structure, a mechanism is needed to reconstruct the structure of the record from the values.

The mechanism for reconstructing the structure of a record from columnar data includes storing, for each value in the columnar data, a 'repetition' level and a 'definition' level. Each 'level' is a sequence of bits that represents a number. For example, a 'level' of 3 may be represented by two bits (e.g., '11'). In another example, a 'level' of 5 may be represented by three bits (e.g., '101').

The 'repetition' level that is stored for a particular value indicates the field in the value's path that has most recently repeated. As an illustration, a column of values may be stored for a field with the path 'Video.Resolution.Width.' A repetition level of '1' may indicate that the 'Video' field most recently repeated, while a repetition level of '2' may indicate that the 'Resolution' field most recently repeated. Recently repeating can indicate, from the position of the value in the record from which the value was selected and working upwards towards the beginning of the document, which field in the path 'Video.Resolution.Width' is the first to reach a count of two (e.g., which field is encountered for the second time first).

For example, working upwards from the location of the 'Width' value, each field is encountered a single time. Finding a second instance of each field requires traversing to the depths of the next, adjacent nested field (and possibly to further nestings). Thus, a 'Video' field may be encountered that does not include any 'Resolution' children (e.g., because the 'Resolution' field is optional or a repeating field). Thus, the 'Video' field has been encountered a second time and is thus the most recently repeated field. A repetition level of '1' is assigned to the value.

A repetition level of '0' may indicate that the field does not include a most recently repeated value (e.g., it has been encountered for the first time in the record during a top-down scan). In various examples, a 'required' field in a path does not have a repetition level. For example, if the 'Resolution' field is required for the 'Video.Resolution.Width' path, the range of resolution levels may be either '0' or '1.' 'Resolution' may not have a level because it is always present in the record when the 'Video' field is present. Thus, if 'Resolution' was assigned a level of '2,' it may always be encountered before 'Video' and thus a level of '1' may not ever be assigned. Thus, not including a repetition level for required fields may enable a number of different resolution levels to be reduced, and a number of bits to represent the resolution level may be reduced.

If the field 'Width' in the above example is an 'optional' or 'repeating' field, a record may not always include a value for the 'Width' field. Thus, a column of values for the 'Video.Resolution.Width' path may use a mechanism to designate when a 'Video' or a 'Video.Resolution' path is found in the record but the 'Width' field has not been instantiated in the record. This mechanism may include storing, in the 'Video.Resolution.Width' column of data, a 'Definition' level for each 'Video' or 'Video.Resolution' field in the record regardless whether the 'Width' field is instantiated. The 'Definition' level may indicate how many of the fields in the 'Video.Resolution.Width' path that could be missing (e.g., because the field is optional or repeatable) are actually present.

Thus, if the field 'Video' is present in the record but no corresponding 'Resolution' child is instantiated, a definition level of '1' may be recorded in the 'Video.Resolution.Width' column. If the field 'Video.Resolution' is present in the record, but no corresponding 'Width' child is instantiated, a definition level of '2' may be recorded. If the field 'Video.Resolution.Width' is present in the record, a definition level of '3' may be recorded.

Therefore, whenever the 'Definition' level (which represents the number of fields that could be undefined but are actually defined) is less than the number of fields that could be defined, a missing occurrence of the 'Width' field may be identified. The combination of the 'Repetition' level and the 'Definition' level may enable the structure of the record to be reconstructed.

A column of data for a particular field (e.g., the 'Video.Resolution.Width' field) may include the values for the field from multiple records, corresponding repetition and definition levels (acknowledging that some 'missing' values may have a repetition and a definition level), and header information. In some examples, the values are stored consecutively and adjacent. In other words, if a value for one 'Video.Resolution.Width' field was '700' and the value for a next 'Video.Resolution.Width' field was '800,' a portion of the column as stored in memory may read '700800.' In this example, a header in the column may identify that the each value has a fixed width (e.g., a fixed binary representation to hold the numbers 700 and 800).

In some examples, the stored values are represented by strings. For example, instances of the 'Width' field may include the values 'Small' and 'Medium.' In some examples, the various string values may be a fixed length (e.g., a null value may be added to the beginning or end of the 'Small' value to make the string the same length as the 'Medium' value). In some examples, however, each stored string may include an identifier in a beginning portion of the string that identifies a length of the string. For example, the 'small' value may include an identifier that indicates that the string is five digits long (or a corresponding number of binary bits).

Because the values may be stored consecutively in the columnar stripe, the 'repetition' and 'definition' levels may be stored at the beginning of the columnar stripe. In some examples, the 'repetition' and 'definition' levels are stored in pairs for a particular value (whether instantiated or missing). As an illustration, a repetition level of 3 may be stored in the first four bits of a byte and a definition level of 1 may be stored in the last four bits of the byte. A next byte in the header may include a repetition level and a definition level for the next instance of the field in the record (or the first instance in the subsequent record).

The number of bits used to represent the repetition and definition levels may be based on a maximum level value. For example, if the maximum repetition level is 3, the repetition level may be represented with two bits. If the maximum repetition level is 4 the repetition level may be represented with three bits. The header may include information that identifies the length of the repetition and definition levels.

In various examples, the repetition levels may be stored consecutively in memory and the definition levels may be stored consecutively in memory (e.g., not in pairs). In various examples, the repetition and definition levels may be stored in a group with their corresponding value (if the value is instantiated). In other words, a sequence of information in the columnar stripe may read Value1:RepetitionLevel1:DefinitionLevel1:Value2:RepetitionLevel2:DefinitionLevel2, and so on.

The columnar stripes may be compressed into blocks of information. For example, each columnar stripe may be split into a set of blocks, with each block including its own respective header. A first block may include the first 800,000 values and a second block may include a second 800,000 values from a stripe of 1.6 million values. A block header may include the repetition and definition levels along with additional information that may be used to help analyze the portion of the columnar stripe that is represented by the block, and to reconstruct the columnar stripe.

In some examples, the block header includes an 'Assertion' value that defines a type of data that is found in the block's values. For example, a block for the 'Video.Resolution.Width' field may not include any values that list 'Large' width resolution. Thus, the 'Assertion' value may indicate that the values only include 'Small' and 'Medium' values. If a query is performed for records that include 'High' width resolution videos, then the described block may be avoided by the querying system.

The system described in this document may perform queries on columnar stripes without reconstructing the information in the columnar stripes into records, and without loading information from the columnar stripes into a database (e.g., without using 'Insert' clause). Thus, the data may be accessed in situ, which may provide computational analysis time savings on the order of magnitudes.

The querying system may employ many of the clauses employed for querying relational databases. Additional clauses that are specific to non-relational data, however, may be employed. For example, a WITHIN clause may allow for operations to be performed on multiple instances of a field within a single record or a portion of a record. A relational database, however, may be unable to store more than a single instance of a field in a row (e.g., a representation of a record). Thus, a query on a relational database may be fundamentally unable to perform queries 'within' a record.

As an example of the WITHIN clause, values for a particular field may be multiplied. Supposing that the query instructions request that all values for 'MutualFund.InterestRate' be multiplied together for a particular record (where each record may be for a particular account holder). The querying system may find all of the 'MutualFund.InterestRate' values within the single record and multiply them together.

Another example of a clause that may be specific to non-relational nested data is the OMIT IF clause. This clause may enable a record to be filtered to remove instances of fields if a particular condition is met (e.g., a new columnar stripe or record may be created with specified fields removed). As an illustration, a stripe of values that list employee salaries may be queried and a new stripe that removes employee's with salaries above $90,000 may be generated using the OMIT IF clause.

The querying system may be hosted by a server system and provided over the internet to remote computing devices through application programming interfaces (API). In general, the columnar data may be represented to external users of the remote computing devices as stored within tables of information. The users may generate the tables using API calls and may fill the tables with data from a repository of objects.

The users may use separate API calls to load objects into the repository. For example, the server system may also implement an internet-accessible storage system that enables users to push data to the server system for remote hosting. In this manner, the data storage service may serve as a repository for data aggregated from many geographically dispersed computing devices. For example, internet website logs may be streamed by hundreds of computers to the storage system and be stored as individual objects in one or more "buckets" at the repository. A given bucket may have an access control list that determines which computing devices or user accounts are authorized to upload objects to the bucket or to access objects in a bucket. Similarly, individual objects may have associated access control lists that control which devices or user accounts are able to access or manipulate the object.

A user may explicitly request that the data in objects in a bucket be transferred to a table, or may establish a service that monitors the bucket and transfers the data in newly placed objects into the table. In some implementations, the transfer of data in the objects to the table may include converting the data format of the objects to a different format, generating columnar stripes for the data in the records, and placing the columnar stripes in a different repository. Metadata for the table may be updated to reference the columnar stripes that include the converted data for the imported objects.

Thus, in some implementations, when the querying service receives a request to query a table, the metadata for the table is located and a query is performed on the columnar data that underlies the table. The output of the query may be placed in a different table, provided to the remote device requesting the query, or may be stored in the repository of objects as an object (e.g., an object that includes a collection of records).

1. Introduction

Large-scale parallel computing may be performed using shared clusters of commodity machines. See L. A. Barroso and U. Holzle. *The Datacenter as a Computer: An Introduction to the Design of Warehouse-Scale Machines*. Morgan & Claypool Publishers, 2009. A cluster may host a multitude of distributed applications that share resources, have widely varying workloads, and run on machines with different hardware parameters. An individual computing machine in a distributed application may take much longer to execute a given task than others, or may never complete due to failures or preemption by a cluster management system. Hence, dealing with stragglers (e.g., computing tasks with significant latency) and failures may achieve fast execution and fault tolerance. See G. Czajkowski. Sorting 1PB with MapReduce. Official Google Blog, November 2008. At http://googleblog.blogspot.com/2008/11/sorting-1pb-with-mapreduce.html.

The data used in web and scientific computing is often nonrelational. Hence, a flexible data model may be beneficial in these domains. Data structures used in programming languages, messages exchanged by distributed systems, web traffic logs, etc. may lend themselves to a nested representation. For example, a nested representation of data may include a multiple fields that each include several levels of children fields. Some of the children fields may include corresponding data. Normalizing and recombining such data at web scale may be computationally expensive. A nested data model underlies some of the structured data processing at major web companies.

This document describes a system that supports interactive analysis of very large datasets over shared clusters of commodity machines. Unlike traditional databases, it is capable of operating on in situ nested data. In situ refers to the ability to access data 'in place', for example, in a distributed file system like Google File System (see S. Ghemawat, H. Gobioff, and S.-T. Leung. The Google File System. In *SOSP,* 2003) or another storage layer like Bigtable (see F. Chang, J. Dean, S. Ghemawat, W. C. Hsieh, D. A. Wallach, M. Burrows, T. Chandra, A. Fikes, and R. Gruber. Bigtable: A Distributed Storage System for Structured Data. In *OSDI,* 2006).

The system can execute many queries over such data that may ordinarily require a sequence of MapReduce jobs, but at a fraction of the execution time. See J. Dean and S. Ghemawat. MapReduce: Simplified Data Processing on Large Clusters. In *OSDI,* 2004. The described system may be used in conjunction with MapReduce to analyze outputs of MapReduce pipelines or rapidly prototype larger computations. Examples of using the system include:

Analysis of web logs and crawled web documents;
Install data for applications served by an online marketplace;
Crash data for application products;
Multimedia playback statistics;
OCR results from scans of books;
Spam analysis;
Debugging of map tiles;
Tablet migrations in managed Bigtable instances;
Results of tests run on a distributed build system;
Disk I/O statistics for hundreds of thousands of disks;
Execution logs of MapReduce jobs across several data centers; and
Symbols and dependencies in a codebase.

The described system builds on ideas from web search and parallel database management systems. First, its architecture builds on the concept of a serving tree used in distributed search engines. See J. Dean. Challenges in Building Large-Scale Information Retrieval Systems: Invited Talk. In *WSDM,* 2009. Like a web search request, a query gets pushed down the tree and rewritten at each step. The result of the query is assembled by aggregating the replies received from lower levels of the tree.

Second, the described system provides a high-level, SQL-like language to express ad hoc queries. In contrast to layers such as Pig (see C. Olston, B. Reed, U. Srivastava, R. Kumar, and A. Tomkins. Pig Latin: a Not-so-Foreign Language for Data Processing. In *SIGMOD,* 2008.) and Hive (Hive. http://wiki.apache.org/hadoop/Hive, 2009), the querying system executes queries natively without translating them into MapReduce jobs.

Lastly, the described system uses a column-striped storage representation, which enables it to read less data from secondary storage and reduce CPU cost due to cheaper compression. Column stores for analyzing relational data, (D. J. Abadi, P. A. Boncz, and S. Harizopoulos. Column-Oriented Database Systems. *VLDB,* 2(2), 2009), are not believed to have extended to nested data models. The columnar storage format that is described may be supported by MapReduce, Sawzall (see R. Pike, S. Dorward, R. Griesemer, and S. Quinlan. Interpreting the Data: Parallel Analysis with Sawzall. *Scientific Programming,* 13(4), 2005), and FlumeJava (see C. Chambers, A. Raniwala, F. Perry, S. Adams, R. Henry, R. Bradshaw, and N. Weizenbaum. FlumeJava: Easy, Efficient Data-Parallel Pipelines. In *PLDI,* 2010).

In Section 4, this document describes a columnar storage format for nested data. Algorithms are presented for dissecting nested records into columns and reassembling them.

In Section 5, a query language for processing data in that is stored in the columnar storage format is described. The query language and execution of the language are designed to operate efficiently on column-striped nested data and do not require restructuring of nested records.

In Section 6, an illustration of applying execution trees that are used in web search serving systems to database processing is provided. The benefits for answering aggregation queries efficiently is explained.

In Section 7, experiments conducted on system instances are presented.

Section 2

Example Scenario

Suppose that Alice, an engineer at a web-search company, comes up with an idea for extracting new kinds of signals from web pages. She runs a MapReduce job that cranks through the input data that includes content from the web pages and produces a dataset containing the new signals, stored in billions of records in a distributed file system. To analyze the results of her experiment, she launches the system described in this document and executes several interactive commands:

DEFINE TABLE t AS /path/to/data/*
SELECT TOP(signal1, 100), COUNT(*) FROM t

Alice's commands execute in seconds. She runs a few other queries to convince herself that her algorithm works. She finds an irregularity in signal1 and digs deeper by writing a FlumeJava program that performs a more complex analytical computation over her output dataset. Once the issue is fixed, she sets up a pipeline which processes the incoming input data continuously. She formulates a few canned SQL queries that aggregate the results of her pipeline across various dimensions, and adds them to an interactive dashboard (e.g., a web page about a service that explains the service and details statistics on the service). Finally, she registers her new dataset in a catalog so other engineers can locate and query the dataset quickly.

The above scenario may require interoperation between the query processor and other data management tools. The first ingredient for such interoperation is a common storage layer. The Google File System is one such distributed storage layer that may be used. The Google File System manages very large replicated datasets across thousands of machines and tens of thousands of disks.

Replication helps preserve the data despite faulty hardware and achieve fast response times in presence of stragglers. A high-performance shared storage layer is a key enabling factor for in situ data management. It allows accessing the data without a time-consuming loading phase, which is a major impedance to database usage in analytical data processing (where it is often possible to run dozens of MapReduce analyses before a database management system is able to load the data and execute a single query). For example, when a database management system is used to analyze data, the database may need to be loaded with data using 'Insert' commands. Such loading may not be required by the described system. As an added benefit, data in a file system can be conveniently manipulated using standard tools, e.g., to transfer to another cluster, change access privileges, or identify a subset of data for analysis based on file names.

A second ingredient for building interoperable data management components is a shared storage format. Columnar storage is used for flat relational data but adapting columnar storage to a nested data model allows the technique to be applied to web data. FIG. 1 illustrates the idea that all values of a nested field in a data structure are stored contiguously. For example, in the column-oriented representation of nested data, all values for a particular nested field within a data structure (e.g., the field A.B.C) are stored adjacent to each other and contiguously in memory. Hence, values for the field A.B.C can be retrieved from memory without reading values from the field A.E and values from the field A.B.D.

Additionally, values for the same particular field in different instances of a data structure (e.g., a 'record') may be stored contiguously. For example, the values for field A.B.C for the record 'r1' are stored adjacent to the values for the same field for the record 'r2.' To the contrary, in the 'record-oriented' representation of nested data, values for all fields within a particular record are stored contiguously. In other words, the data values for a particular field are not bunched together.

The challenge that the described columnar storage format addresses is how to preserve all structural information and be able to reconstruct records from an arbitrary subset of fields. This document next discusses the data model from which the fields in the columnar storage format may be filled, and then turn to algorithms for processing the columnar storage and query processing on data in the columnar storage.

Section 3

Data Model

This section describes the data model used by the described system and introduces some terminology used later. The described Protocol Buffers data model originated in the context of distributed systems, and is available as an open source implementation. See (Protocol Buffers: Developer Guide. Available at http://code.google.com/apis/protocolbuffers/docs/overview.html). The data model is based on strongly-typed nested records. Its abstract syntax is given by:

$$\tau = \text{dom} | < A_1 : \tau [* | ?], \ldots, A_n : \tau [* | ?] >$$

where $\tau$ is an atomic type or a record type. Atomic types in dom comprise integers, floating-point numbers, strings, etc. Records consist of one or multiple fields. Field i in a record has a name $A_i$ and an optional multiplicity label. Repeated fields (*) may occur multiple times in a record. They are interpreted as lists of values, i.e., the order of field occurrences in a record is significant. Optional fields (?) may be missing from the record. Otherwise, a field is required (e.g., must appear exactly once).

Figures 2, 3:
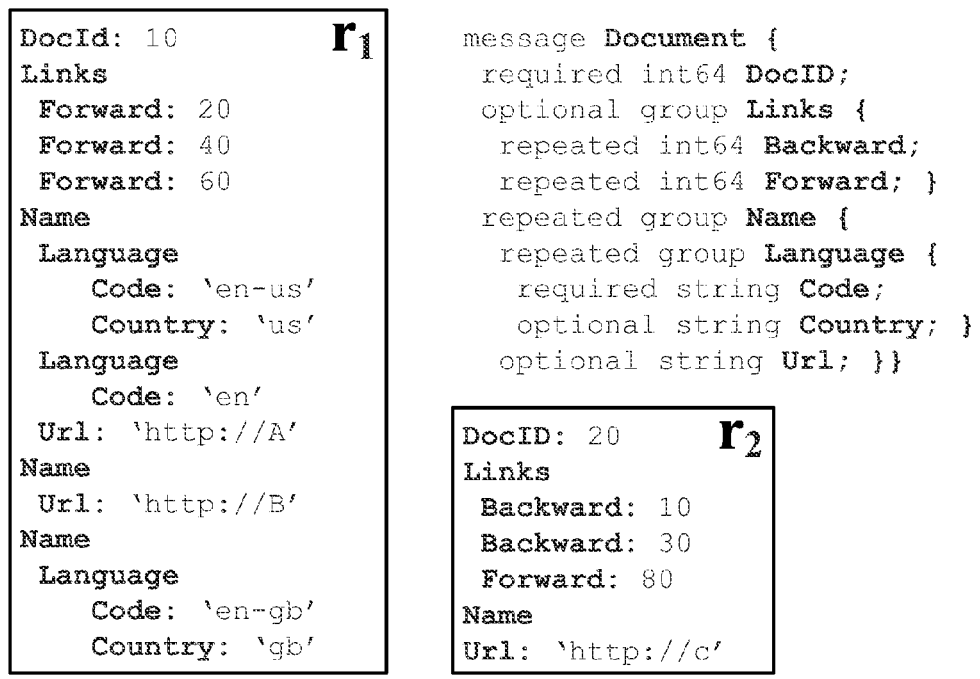
FIG. 2 illustrates two sample nested records and their schema.
FIG. 3 illustrates column-striped representations of the sample nested records.

As an illustration, FIG. 2 depicts a schema that defines a record type 'Document,' which represents a web document. The schema definition uses the Protocol Buffers syntax. A 'Document' has a required integer 'DocId' and optional 'Links,' containing a list of 'Forward' and 'Backward' entries holding 'DocIds' of other web pages. A 'Document' can have multiple 'Names,' which are different URLs by which the document can be referenced. A 'Name' contains a sequence of 'Code' and (optional) 'Country' pairs. FIG. 2 also shows two sample records, r1 and r2, that conform to the schema. The record structure is outlined using indentation. The sample records r1 and R2 in FIG. 2 are used explain the algorithms throughout this document. The fields defined in the schema form a tree hierarchy. The full path of a nested field is denoted using a dotted notation, e.g., Name.Language.Code is the full path name for the 'Code' field depicted in FIG. 2.

The nested data model backs a platform-neutral, extensible mechanism for serializing structured data. Code generation tools produce bindings for different programming languages such as C++ or Java. Cross-language interoperability is achieved using a standard binary on-the-wire representation of records, in which field values are laid out sequentially as they occur in the record. This way, a MapReduce program written in Java can consume records from a data source exposed via a C++ library. Thus, if records are stored in a columnar representation, assembling them fast may assist interoperation with MapReduce and other data processing tools.

Section 4

Nested Columnar Storage

As illustrated in FIG. 1, a goal is to store all values of a given field consecutively to improve retrieval efficiency. In this section, the challenges of lossless representation of record structure in a columnar format (Section 4.1), fast encoding (Section 4.2), and efficient record assembly (Section 4.3) are addressed.

Section 4.1

Repetition and Definition Levels

A consecutive list of values alone do not convey the structure of a record. Given two values of a field that is repeated in a record, a system may not be able to determine at what 'level' the value is repeated (e.g., whether the two values are from different records or are from the same record). Likewise, if an optional field is missing from a record, values alone may not convey which enclosing records were defined explicitly and which were not. The concepts of repetition and definition levels are thus introduced. FIG. 3 includes tables that summarize the repetition and definition levels for atomic fields in the sample records that are depicted in FIG. 1.

Repetition Levels.

Consider the field 'Code' in FIG. 2. It occurs three times in record 'r1.' Occurrences 'en-us' and 'en' are inside the first 'Name' field, while 'en-gb' is in the third 'Name' field. To disambiguate these occurrences in the columnar structure, a repetition level is attached to each value that is to be stored in the columnar structure. The repetition level indicates at what repeated field in the field's path the value has repeated. For example, the field path Name.Language.Code contains two fields that are repeated, 'Name' and 'Language.' Hence, the repetition level of Code ranges between 0 and 2. Level 0 denotes the start of a new record, level 1 denotes a recent repetition at the 'Name' field, and level 2 denotes a recent repetition at the 'Language' field.

As an illustration of determining the level for a field, record 'r1' may be scanned from the top down. The value 'en-us' is first encountered and a check may be performed to identify the field in the Name.Language.Code path that has most recently repeated in the record. In this example, none of the fields have been repeated and thus, the repetition level is 0. The value 'en' is next encountered for the Name.Language.Code path and the field 'Language' is identified as the field that has most recently repeated. For example, scanning upwards from the value 'en,' the first field in the Name.Language.Code path that repeats is 'Language.' Thus, the repetition level is 2 (e.g., because '2' corresponds to the 'Language' field because 'Language' is the second field in the Name.Language.Code path that repeats). Finally, when the value 'en-gb' is encountered, the field 'Name' has repeated most recently (the 'Language' field occurred only once after Name), so the repetition level is 1. In other words, the repetition level for a value may be a number that represents a most recently repeated field. Thus, the repetition levels of Code values in record 'r1' are 0, 2, 1.

Notice that the second 'Name' field in record 'r1' does not contain any values for the field 'Code.' To determine that 'en-gb' occurs as a value for a field nested within the third instance of the field 'Name,' and not in the second instance, a NULL value is added between the values 'en' and 'en-gb' as they are stored in the columnar structure (see FIG. 3). 'Code' is a required child field of the 'Language' field, so the fact that a value for the 'Code' field is missing implies that the 'Language' field is not also not defined. In general though, determining the level up to which nested records exist may require additional information.

Definition Levels.

Each value of a field with path 'p,' especially every NULL value, has a 'definition level' that specifies how many fields in the path 'p' that could be undefined (e.g., because the fields are optional or repeated) are actually present in the record. To illustrate, observe that record 'r1' has no 'Backward' fields for the 'Links' field. Still, the field 'Links' is defined (at a level of 1). To preserve this information, a NULL value with definition level of 1 is added to the 'Links.Backward' column.

In other words, specifying a level of 1 for the 'Links.Backward' path indicates that '1' field that was optional or repeated (i.e., the 'Links' field) was defined in a path that includes two fields that are optional or repeated (i.e., the 'Links' field and the 'Backward' field). Thus, a definition of '1' indicates that the 'Backward' field was not instantiated. Similarly, the missing occurrence of 'Name.Language.Country' in record 'r2' carries a definition level 1, while its missing occurrences in record 'r1' have definition levels of 2 (inside 'Name.Language') and 1 (inside 'Name'), respectively. The encoding procedure outlined above may preserve the record structure losslessly.

Encoding.

As stored in memory, each column that corresponds to a particular field may be stored with a header that includes a contiguous listing of repetition and definition values, followed by a contiguous listing of the substantive values. Each repletion and definition value may be stored as bit sequences (e.g., in a single byte). For example, the first four bits of a byte may be used to represent the repetition level for a particular value and the last four bits may be used to represent the definition level. In some examples, the header may include definitions of lengths of the number of bits so that delimiters may not be used. Thus, bits may only be used as necessary. For example, if the maximum definition level is 3, two bits per definition level may be used.

Thus, a representation of columnar data for a single field (e.g., the 'Name.Language.Code' field) may be stored in memory with a sequence of bytes representing the repetition and definition levels for a corresponding sequence of values, followed by a sequence of values. NULL values, however, may not be stored explicitly as they may be determined by analyzing the definition levels. For instance, any definition level that is smaller than the number of repeated and optional fields in a field's path can denote a NULL. Thus, a system may be able to determine where in the listing of consecutive values a NULL value should be inserted or inferred. In some examples, definition levels are not stored for values that are always defined. Similarly, repetition levels may only be stored if required. For example, a definition level of 0 implies a repetition level of 0, so the latter may be omitted. In fact, referencing the structures illustrated in FIG. 3, no levels may stored for the 'DocId' field.

A representation of columnar data in memory may be broken up into a set of blocks. Each block may include a header that includes the repetition and definition level information, and a subsequent listing of the values for the field. Each header may include a 'constraint' value that indicates an allowable range of values in the block. Thus, the described system may identify which blocks include data that the system is interested in. The constraint can also indicate other properties of the values, e.g., whether the values have been sorted. In general, the 'constraint' may be thought of as an 'assertion' about what kind of values are found in the block. Each block may be compressed.

Section 4.2

Splitting Records into Columns

The above description presented an encoding of the record structure in a columnar format. A challenge is how to produce column stripes with repetition and definition levels efficiently. The base algorithm for computing repetition and definition levels is provided below. The algorithm recurses into the record structure and computes the levels for each field value. As illustrated earlier, repetition and definition levels may need to be computed even if field values are missing. Many datasets are sparse and it may not be uncommon to have a schema with thousands of fields, only a hundred of which are used in a given record. Hence, it may be beneficial to process missing fields as cheaply as possible. To produce column stripes, a tree of field writers is created, whose structure matches the field hierarchy in the schema. The basic idea is to update field writers only when they have their own data, and not try to propagate parent state down the tree unless absolutely necessary. To do that, child writers inherit the levels from their parents. A child writer synchronizes to its parent's levels whenever a new value is added.

An example algorithm for decomposing a record into columns is shown in FIG. 4. Procedure 'DissectRecord' is passed an instance of a 'RecordDecoder,' which is used to traverse binary-encoded records. 'FieldWriters' form a tree hierarchy isomorphic to that of the input schema. The root 'FieldWriter' is passed to the algorithm for each new record, with 'repetitionLevel' set to 0. The primary job of the 'DissectRecord' procedure is to maintain the current 'repetitionLevel.' The current 'definitionLevel' is uniquely determined by the tree position of the current writer, as the sum of the number of optional and repeated fields in the field's path.

The while-loop of the algorithm (Line 5) iterates over all atomic and record-valued fields contained in a given record. The set 'seen Fields' tracks whether or not a field has been seen in the record. It is used to determine what field has repeated most recently. The child repetition level 'chRepetitionLevel' is set to that of the most recently repeated field or else defaults to its parent's level (Lines 9-13). The procedure is invoked recursively on nested records (Line 18).

The document above referenced 'FieldWriters' accumulating levels and propagating them lazily to lower-level writers. This may be performed by each non-leaf writer keeping a sequence of (repetition, definition) levels. Each writer also has a 'version' number associated with it. Simply stated, a writer version is incremented by one whenever a level is added. It is sufficient for children to remember the last parent's version they synced. If a child writer ever gets its own (non-null) value, it synchronizes its state with the parent by fetching new levels, and only then adds the new data.

Because input data may have thousands of fields and millions records, it may not be feasible to store all levels in memory. Some levels may be temporarily stored in a file on disk. For a lossless encoding of empty (sub)records, non-atomic fields (such as Name.Language in FIG. 2) may need to have column stripes of their own, containing only levels but no non-NULL values.

Section 4.3

Record Assembly

Assembling records (e.g., records 'r1' and 'r2') from columnar data efficiently is critical for record-oriented data processing tools (e.g., Map Reduce). Given a subset of fields, a goal is to reconstruct the original records as if they contained just the selected fields, with all other fields stripped away. The key idea is to create a finite state machine (FSM) that reads the field values and levels for each field, and appends the values sequentially to the output records. An FSM state corresponds to a field reader for each selected field. State transitions are labeled with repetition levels. Once a reader fetches a value, the next repetition level is looked at to decide what next reader to use. The FSM is traversed from the start to end state once for each record.

Figure 5:
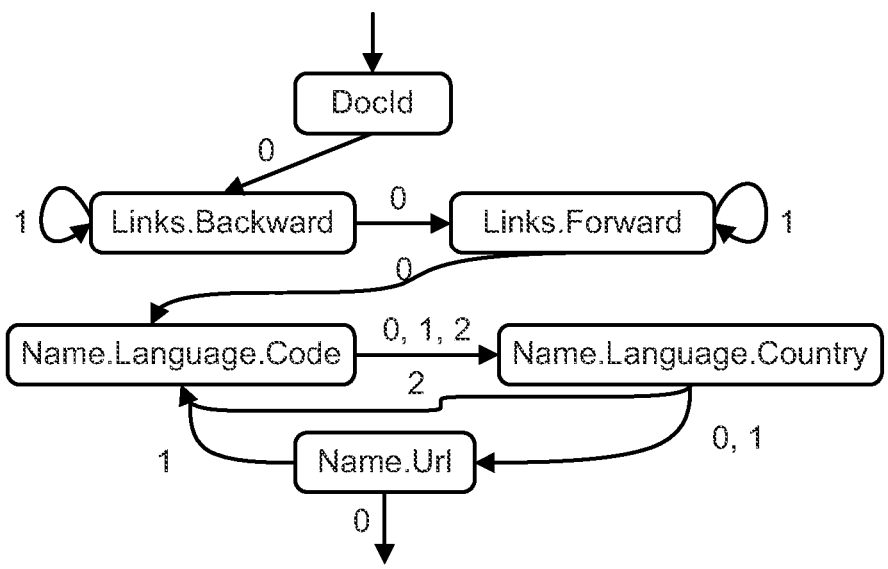
FIG. 5 illustrates an automaton for performing complete record assembly.

FIG. 5 shows an FSM that reconstructs the complete records in our running example using as input the blocks described in Section 4.1. In this example, the nodes are labeled with fields and the edges are labeled with repetition levels. The start state is 'DocId.' Once a 'DocId' value is read, the FSM transitions to the 'Links.Backward' state. After all repeated 'Backward' values have been drained, the FSM jumps to 'Links.Forward'; etc.

To sketch how FSM transitions are constructed, let 'l' be the next repetition level returned by the current field reader for field 'f.' Starting at 'f' in the schema tree (e.g., the schema in FIG. 2), its ancestor is found that repeats at level 'l' and select the first leaf field 'n' inside that ancestor. This provides an FSM transition ('f'; 'l')→n. For example, let 'l'=1 be the next repetition level read by 'f'='Name.Language.Country.' Its ancestor with repetition level '1' is Name, whose first leaf field is 'n'='Name.Url.'

Figure 6:
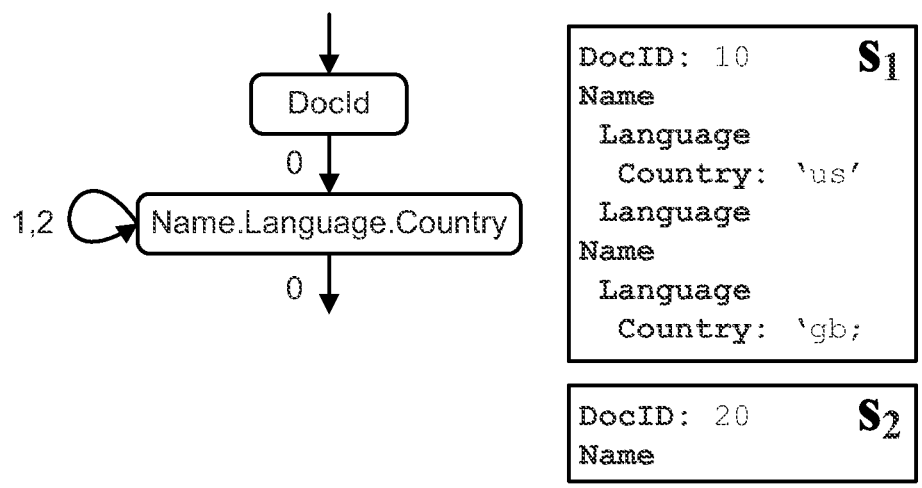
FIG. 6 illustrates an automaton for assembly records from two fields, and the records that the automaton produces.

If only a subset of fields need to be retrieved, a simpler FSM that is cheaper to execute may be constructed. FIG. 6 depicts an FSM for reading the fields 'DocId' and 'Name.Language.Country.' The figure shows the output records 's1' and 's2' produced by the automaton. Notice that the encoding and the assembly algorithm preserve the enclosing structure of the field 'Country.' This may be important for applications that need to access, e.g., the Country appearing in the first Language of the second Name. In XPath, this may correspond to the ability to evaluate expressions like /Name[2]/Language[1]/Country.

Construct FSM Procedure.

FIG. 7 shows an algorithm for constructing a finite-state machine that performs record assembly. The algorithm takes as input the fields that should be populated in the records, in the order in which they appear in the schema. The algorithm uses a concept of a 'common repetition level' of two fields, which is the repetition level of their lowest common ancestor. For example, the common repetition level of 'Links.Backward' and 'Links.Forward' equals 1. The second concept is that of a 'barrier', which is the next field in the sequence after the current one. The intuition is that each field is attempted to be processed one by one until the barrier is hit and requires a jump to a previously seen field.

The algorithm consists of three steps. In Step 1 (Lines 6-10), the common repetition levels are processed backwards. These are guaranteed to be non-increasing. For each repetition level encountered, the left-most field in the sequence is picked—that is the field that is to be transitioned to when that repetition level is returned by a 'FieldReader.' In Step 2, the gaps are filled (Lines 11-14). The gaps arise because not all repetition levels are present in the common repetition levels computed at Line 8. In Step 3 (Lines 15-17), transitions for all levels are set that are equal to or below the barrier level to jump to the barrier field. If a 'FieldReader' produces such a level, the nested record may continue to be constructed and there may be no need to bounce off the barrier.

Assemble Record Procedure.

An Assemble Record procedure (illustrated in FIG. 8) takes as input a set of 'FieldReaders' and (implicitly) the FSM with state transitions between the readers. In other words, the algorithm operates on an FSM and columnar data and outputs constructed records. Variable reader holds the current 'FieldReader' in the main routine (Line 4). Variable Reader holds the last reader whose value is appended to the record and is available to all three procedures shown in FIG. 7. The main while-loop is at Line 5. The next value is fetched from the current reader. If the value is not NULL, which is determined by looking at its definition level, the record being assembled is synchronized to the record structure of the current reader in the method 'MoveToLevel,' and the field value is appended to the record. Otherwise, the record structure may be adjusted without appending any value—which may be done if empty records are present. On Line 12, a 'full definition level' is used. Recall that the definition level factors out required fields (only repeated and optional fields are counted). Full definition level takes all fields into account.

Procedure 'MoveToLevel' transitions the record from the state of the 'lastReader' to that of the 'nextReader' (see Line 22). For example, suppose the 'lastReader' corresponds to 'Links. Backward' in FIG. 2 and 'nextReader' is 'Name.Language.Code.' The method ends the nested record Links and starts new records Name and Language, in that order. Procedure 'ReturnsToLevel' (Line 30) is a counterpart of 'MoveToLevel' that only ends current records without starting any new ones.

In their on-the-wire representation, records are laid out as pairs of a field identifier followed by a field value. Nested records can be thought of as having an 'opening tag' and a 'closing tag', similar to XML (actual binary encoding may differ). A description of 'starting' a record refers to writing opening tags, while 'ending' a record refers to writing closing tags.

Section 5

Query Language

Figure 9:
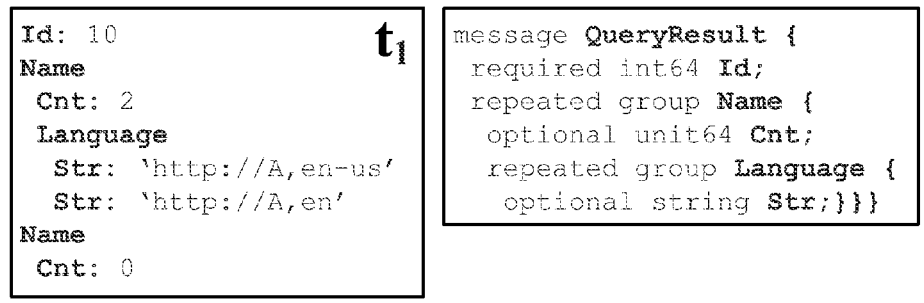
FIG. 9 depicts a sample query that performs projection, selection, and within-record aggregation.

The described system may employ a query language that is based on SQL and is designed to be efficiently implementable on columnar nested storage. Aspects of the query language are described herein. Each SQL-like statement (and algebraic operators it translates to) takes as input one or multiple nested tables (e.g., a set of compressed blocks of columnar data that represents a table, as described in Section 4.1) and their schemas, and produces a nested table (e.g., a modified instance of the columnar data) and its output schema. FIG. 9 depicts a sample query that performs projection, selection, and within-record aggregation. The query is evaluated over the table t={r1, r2} from FIG. 2. The fields are referenced using path expressions. The query produces a nested result although no record constructors are present in the query.

To explain what the query does, consider the selection operation (the WHERE clause). Think of a nested record as a labeled tree, where each label corresponds to a field name. The selection operator prunes away the branches of the tree that do not satisfy the specified conditions. Thus, only those nested records are retained where 'Name.Url' is defined and starts with 'http.' Next, consider projection. Each scalar expression in the SELECT clause emits a value at the same level of nesting as the most-repeated input field used in that expression. So, the string concatenation expression emits 'Str' values at the level of 'Name.Language.Code' in the input schema.

The COUNT expression illustrates within-record aggregation. The aggregation is done WITHIN each 'Name' subrecord, and emits the number of occurrences of 'Name.Language.Code' for each 'Name' as a non-negative 64-bit integer (uint64). Thus, the WITHIN statement enables intra-row aggregation. In other words, records of the same name may be aggregated in a same record or beneath a same child. In contrast, SQL, which may not be able to operate on nested data, may be unable to operate on intra-row records.

The language supports nested subqueries, inter and intra-record aggregation, top-k, joins, user-defined functions, etc. Some of these features are discussed in the experimental data section. As one additional example, the described query language includes an OMIT IF statement that can filter an intra-row group of values. For example, each of thousands of records may include several repeated 'Cost' fields that each include a numerical value. An user of the query language may want to throw out all records where a sum of the values in the fields exceeds the number '20.' Thus, the user may employ an OMIT IF statement to generate a list of the records where the summed 'Cost' in each record is twenty or less.

Section 6

Query Execution

Tree Architecture.

Figure 10:
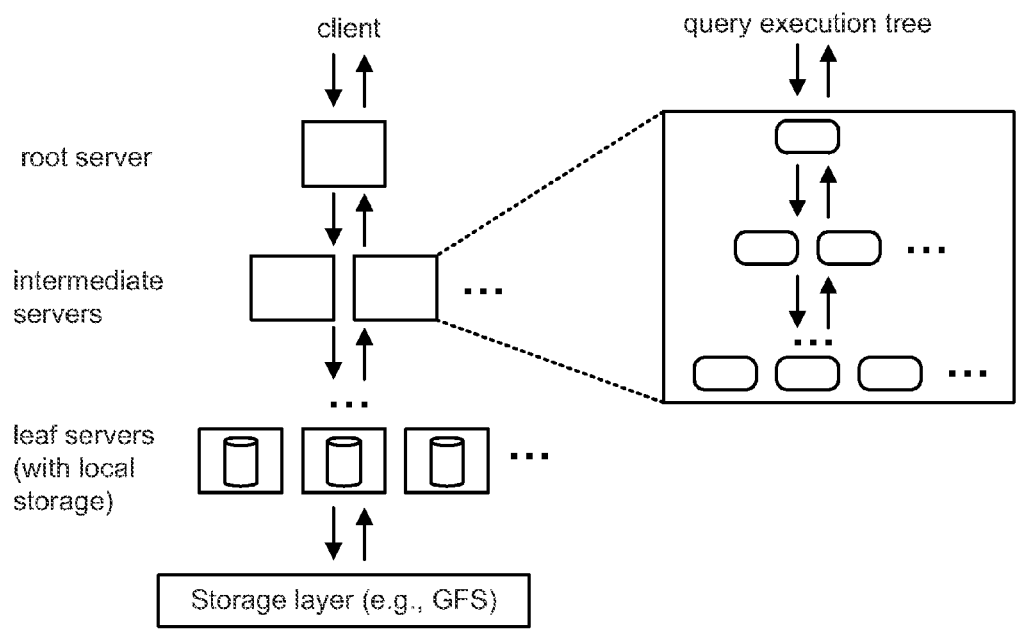
FIG. 10 illustrates a system architecture and execution inside a server node.

The described system uses a multi-level serving tree to execute queries (see FIG. 10). A root server receives incoming queries, reads metadata from the tables, and routes the queries to the next level in the serving tree. The leaf servers communicate with the storage layer or access the data on local disk. Many of the queries that operate in the described system are single-scan aggregations; therefore, this document focuses on explaining those and uses them for experiments in the next section. Consider a simple aggregation query below:

SELECT A, COUNT(B) FROM T GROUP BY A

When the root server receives the above query, it determines all tablets, i.e., horizontal partitions of the table, that comprise the table 'T' and rewrites the query as follows:

SELECT A, SUM(c) FROM ($R_1^1$ UNION ALL ... $R_n^1$) GROUP BY A

Tables $R_1^1$ UNION ALL ... $R_n^1$ are the results of queries sent to the nodes 1, ..., n at level 1 of the serving tree:

$R_i^1$=SELECT A, COUNT(B) AS c FROM $T_i^1$ GROUP BY A $T_i^1$ is a disjoint partition of tablets in 'T' processed by server 'i' at level '1.' Each serving level performs a similar rewriting. Ultimately, the queries reach the leaves, which scan the tablets in 'T' in parallel. On the way up, intermediate servers perform a parallel aggregation of partial results. The execution model presented above is well suited for aggregation queries returning small and medium-sized results, which are a very common class of interactive queries.

Query Dispatcher.

The described system is a multi-user system, e.g., several queries may be executed simultaneously. A query dispatcher schedules queries based on their priorities and balances the load. Another role is to provide fault tolerance when one server becomes much slower than others or a tablet replica becomes unreachable.

The amount of data processed in each query is often larger than the number of processing units available for execution, which are called slots. A slot corresponds to an execution thread on a leaf server. For example, a system of 3,000 leaf servers each using 8 threads has 24,000 slots. So, a table spanning 100,000 tablets can be processed by assigning about 5 tablets to each slot. During query execution, the query dispatcher computes a histogram of tablet processing times. If a tablet takes a disproportionately long time to process, the system reschedules the tablet on another server. Some tablets may need to be redispatched multiple times.

The leaf servers read stripes of nested data in columnar representation. The blocks in each stripe are prefetched asynchronously; the read-ahead cache typically achieves hit rates of 95%. Tablets are usually three-way replicated. When a leaf server cannot access one tablet replica, it falls over to another replica.

The query dispatcher honors a parameter that specifies the minimum percentage of tablets that must be scanned before returning a result. As described below, setting such parameter to a lower value (e.g., 98% instead of 100%) can often speed up execution significantly, especially when using smaller replication factors.

Each server may have an internal execution tree, as depicted on the right-hand side of FIG. 7. The internal tree corresponds to a physical query execution plan, including evaluation of scalar expressions. Optimized, type-specific code is generated for most scalar functions. A basic execution plan consists of a set of iterators that scan input columns in lockstep and emit results of aggregates and scalar functions annotated with the correct repetition and definition levels, bypassing record assembly entirely during query execution.

Some queries by the described system, such as top-k and count-distinct, return approximate results using well-known single-scan algorithms. See Hailing Yu, Hua-gang Li, Ping Wu, Divyakant Agrawal, Amr El Abbadi, "Efficient processing of distributed top-k queries", DEXA 2005, pp. 65-74.

Section 7

Experimental Data

This section presents an experimental evaluation of the described system on several datasets, and examines the effectiveness of columnar storage for nested data. The properties of the datasets used in the study are summarized in FIG. 11. In uncompressed, non-replicated form the datasets occupy about a petabyte of space. All tables are three-way replicated, except one two-way replicated table, and contain from 100K to 800K tablets of varying sizes. This section begins by examining the basic data access characteristics on a single machine, then show how columnar storage benefits MapReduce execution, and finally focus on the described system's performance. The experiments were conducted on system instances running in two data centers next to many other applications, during regular business operation. Table and field names used below are anonymized.

Local Disk.

Figures 11, 12:
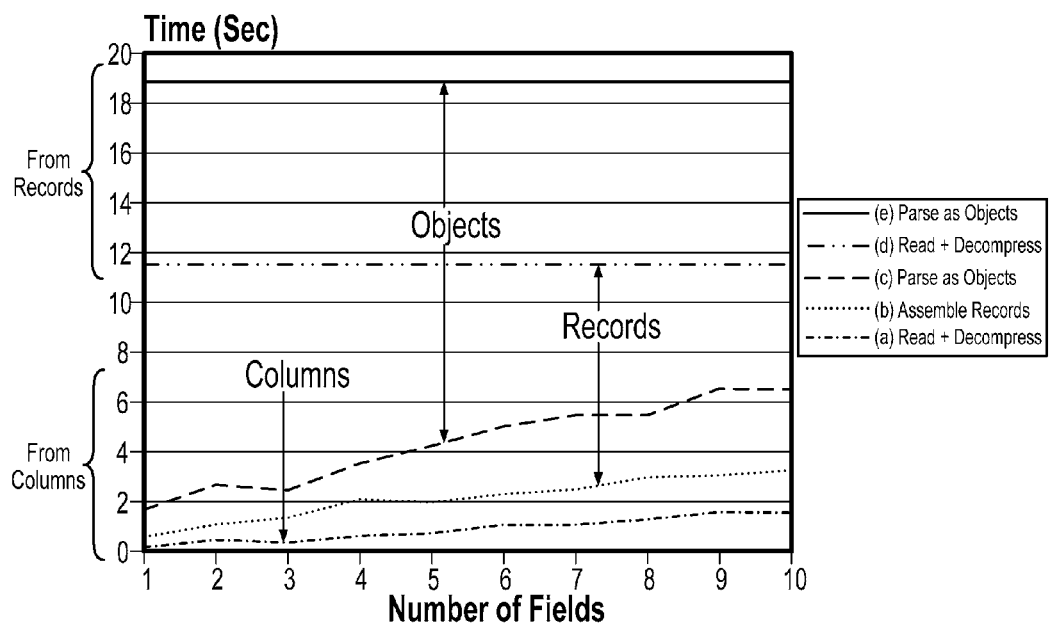
FIG. 11 is a table illustrating the datasets used in the experimental study.
FIG. 12 is a graph that illustrates the performance breakdown that may occur when reading from a local disk.

In the first experiment, performance tradeoffs of columnar vs. record-oriented storage were examined by scanning a 1 GB fragment of table T1 containing about 300K rows (see FIG. 12). The data is stored on a local disk and takes about 375 MB in compressed columnar representation. The record-oriented format uses heavier compression yet yields about the same size on disk. The experiment was done on a dual-core Intel machine with a disk providing 70 MB/s read bandwidth. All reported times are cold; OS cache was flushed prior to each scan.

FIG. 12 shows five graphs, illustrating the time it takes to read and uncompress the data, and assemble and parse the records, for a subset of the fields. Graphs (a)-(c) outline the results for columnar storage. Each data point in these graphs was obtained by averaging the measurements over 30 runs, in each of which a set of columns of a given cardinality was chosen at random. Graph (a) shows reading and decompression time. Graph (b) adds the time needed to assemble nested records from the columns. Graph (c) shows how long it takes to parse the records into strongly typed C++ data structures.

Graphs (d)-(e) depict the time for accessing the data on record-oriented storage. Graph (d) shows reading and decompression time. A bulk of the time is spent in decompression; in fact, the compressed data can be read from the disk in about half the time. As Graph (e) indicates, parsing adds another 50% on top of reading and decompression time. These costs are paid for all fields, including the ones that are not needed.

When few columns are read, the gains of columnar representation may be about an order of magnitude. Retrieval time for columnar nested data may grow linearly with the number of fields. Record assembly and parsing may be expensive, each potentially doubling the execution time. Similar trends were observed on other datasets. A natural question to ask is where the top and bottom graphs cross, i.e., record-wise storage starts outperforming columnar storage. In experience, the crossover point may lie at dozens of fields but varies across datasets and depends on whether or not record assembly is required.

Map Reduce and the Described System.

Next an execution of MapReduce and the described system are illustrated on columnar vs. record-oriented data. In this case, a single field is accessed and the performance gains are the most pronounced. Execution times for multiple columns can be extrapolated using the results of FIG. 12. In this experiment, the average number of terms in a field 'txtField' of table 'T1' is counted. MapReduce execution is done using the following Sawzall program:

numRecs: table sum of int;
numWords: table sum of int;
emit numRecs←1;
emit numWords←CountWords(input.txtField);

The number of records is stored in the variable 'numRecs.' For each record, 'numWords' is incremented by the number of terms in 'input.txtField' returned by the 'CountWords' function. After the program runs, the average term frequency can be computed as numWords=numRecs. In SQL, this computation is expressed as:

$Q_1$: SELECT SUM(CountWords(textile))/COUNT(*) FROM T1

Figure 13:
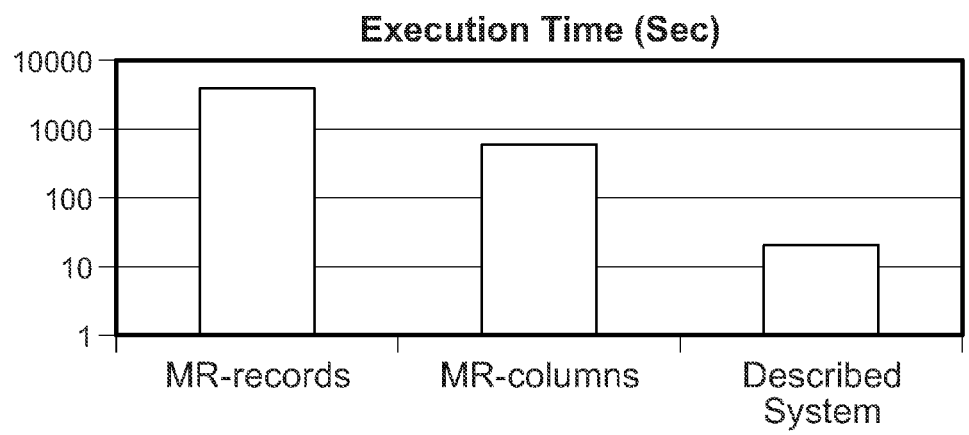
FIG. 13 is a graph that illustrates execution of both MapReduce and the described system on columnar v. record-oriented storage.

FIG. 13 shows the execution times of two MapReduce jobs and the described system on a logarithmic scale. Both MapReduce jobs are run on 3000 workers (e.g., servers). Similarly, a 3000-node instance of the present system is used to execute Query $Q_1$. The described system and MapReduce-on-columns read about 0.5 TB of compressed columnar data vs. 87 TB read by MapReduce-on-records. As FIG. 12 illustrates, MapReduce gains an order of magnitude in efficiency by switching from record-oriented to columnar storage (from hours to minutes). Another order of magnitude is achieved by using the described system (going from minutes to seconds).

Serving Tree Topology.

In the next experiment, the impact of the serving tree depth on query execution times is illustrated. Two GROUP BY queries are performed on Table T2, each executed using a single scan over the data. Table T2 contains 24 billion nested records. Each record has a repeated field item containing a numeric amount. The field item.amount repeats about 40 billion times in the dataset. The first query sums up the item amount by country:

$Q_2$: SELECT country, SUM(item.amount) FROM T2
GROUP BY country

Figure 14:
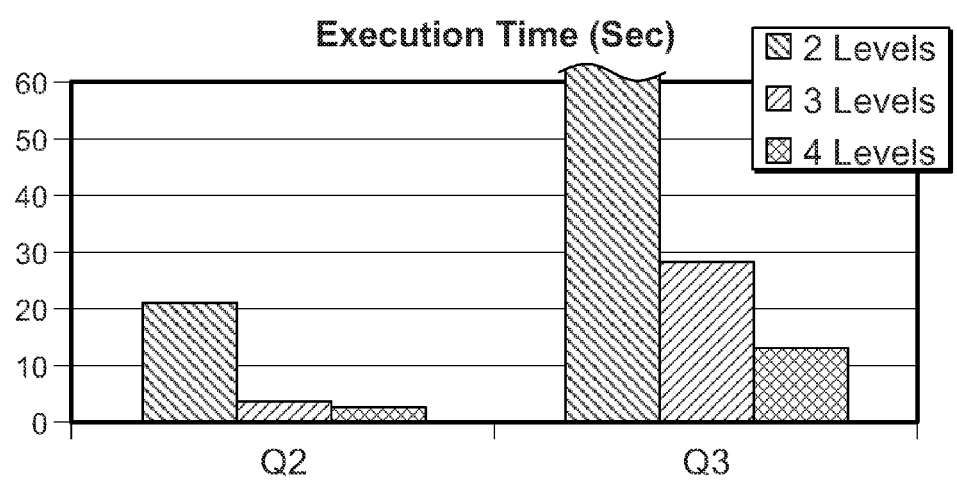
FIG. 14 is a graph that illustrates the execution time as a function of serving tree levels for two aggregation queries.

It returns a few hundred records and reads roughly 60 GB of compressed data from disk. The next query performs a GROUP BY on a text field domain with a selection condition. It reads about 180 GB and produces around 1.1 million distinct domains:

$Q_3$: SELECT domain, SUM(item.amount) FROM T2
WHERE domain CONTAINS '.net'
GROUP BY domain FIG. 14 shows the execution times for each query as a function of the server topology. In each topology, the number of leaf servers is kept constant at 2900 so that the same cumulative scan speed may be assumed. In the 2-level topology (1:2900), a single root server communicates directly with the leaf servers. For 3 levels, a 1:100:2900 setup is used, i.e., an extra level of 100 intermediate servers. The 4-level topology is 1:10:100:2900.

Query $Q_2$ runs in 3 seconds when 3 levels are used in the serving tree and does not benefit much from an extra level. In contrast, the execution time of $Q_3$ is halved due to increased parallelism. At 2 levels, $Q_3$ is off the chart, as the root server needed to aggregate near-sequentially the results received from thousands of nodes. This experiment illustrates how aggregations returning many groups may benefit from multi-level serving trees.

Per-Tablet Histograms.

Figure 15:
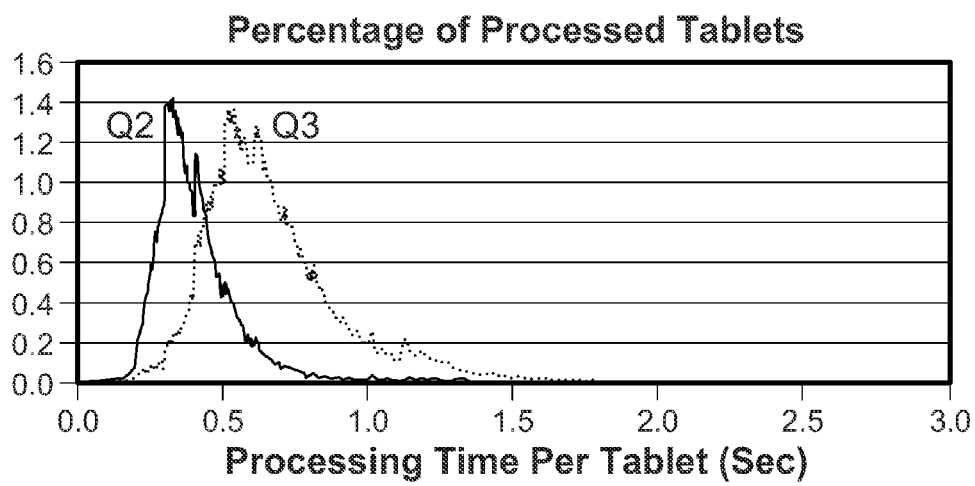
FIG. 15 is a graph that illustrates histograms of processing times.

The FIG. 15 shows how fast tablets get processed by the leaf servers for a specific run of $Q_2$ and $Q_3$. The time is measured starting at the point when a tablet got scheduled for execution in an available slot, i.e., excludes the time spent waiting in the job queue. This measurement methodology factors out the effects of other queries that are executing simultaneously. The area under each histogram corresponds to 100%. As FIG. 15 indicates, 99% of $Q_2$ (or $Q_3$) tablets are processed under one second (or two seconds).

Within-Record Aggregation.

As another experiment, the performance of Query $Q_4$ is examined when run on Table T3. The query illustrates within-record aggregation: it counts all records where the sum of a.b.c.d values occurring in the record are larger than the sum of a.b.p.q.r values. The fields repeat at different levels of nesting. Due to column striping only 13 GB (out of 70 TB) are read from disk and the query completes in 15 seconds. Without support for nesting, running this query on T3 would be expensive.

$Q_4$: SELECT COUNT(c1>c2) FROM
(SELECT SUM(a.b.c.d) WITHIN RECORD AS c1, SUM (a.b.p.q.r) WITHIN RECORD AS c2 FROM T3)

Scalability.

The following experiment illustrates the scalability of the system on a trillion-record table. Query $Q_5$ shown below selects top-20 aid's and their number of occurrences in Table T4. The query scans 4.2 TB of compressed data.

$Q_5$: SELECT TOP(aid, 20), COUNT(*) FROM T4
WHERE bid={value1} AND cid={value2}

Figure 16:
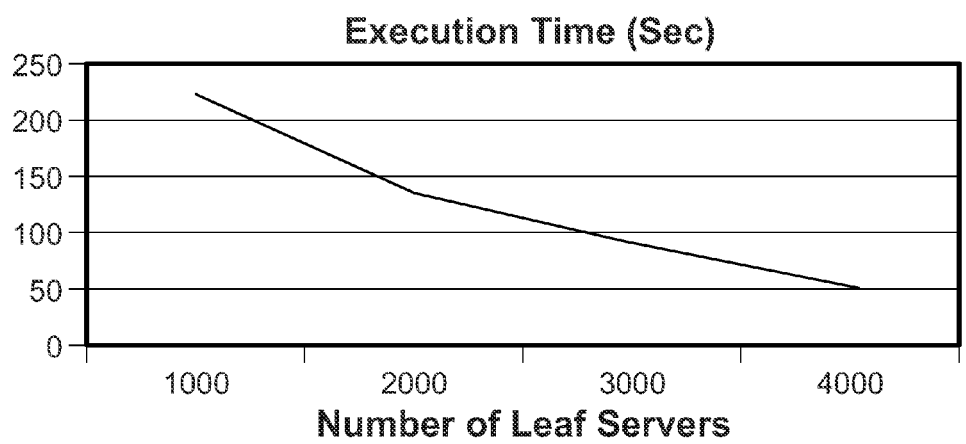
FIG. 16 is a graph that illustrates execution time when the system is scaled from 1000 to 4000 nodes using a top-k query.

The query was executed using four configurations of the system, ranging from 1000 to 4000 nodes. The execution times are in FIG. 16. In each run, the total expended CPU time is nearly identical, at about 300K seconds, whereas the user-perceived time decreases near-linearly with the growing size of the system. This result suggests that a larger system can be just as effective in terms of resource usage as a smaller one, yet allows faster execution.

Stragglers.

Stragglers may be tasks (e.g., processing a tablet) that are not performed, for example, because the machine performing the task has an operational problem or the machine is not being aggressive enough in handling the task given higher-priority tasks. Query $Q_6$ below is run on a trillion-row table T5. In contrast to the other datasets, T5 is two-way replicated. Hence, the likelihood of stragglers slowing the execution is higher since there are fewer opportunities to reschedule the work.

$Q_6$: SELECT COUNT(DISTINCT a) FROM T5

Figure 17:
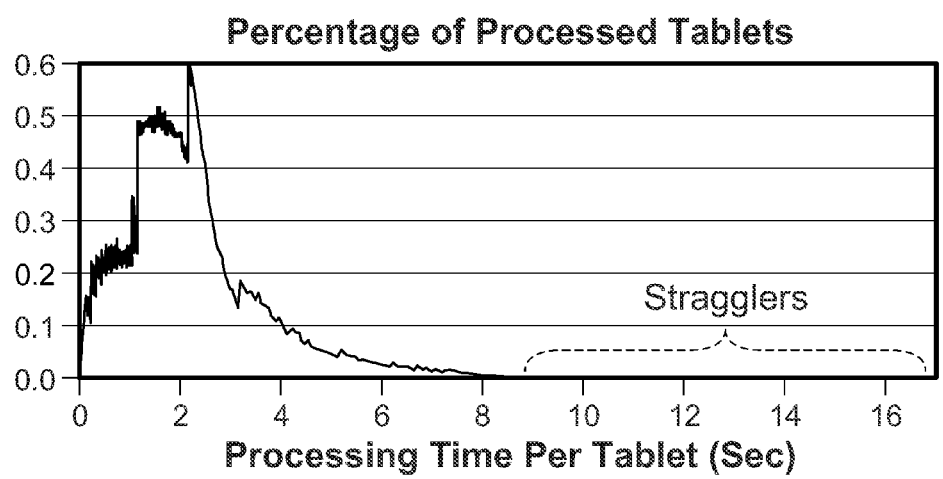
FIG. 17 is a graph that illustrates a percentage of processed tables as a function of processing time per tablet.

Query $Q_6$ reads over 1 TB of compressed data. The compression ratio for the retrieved field is about 10. As indicated in FIG. 17, the processing time for 99% of the tablets is below 5 seconds per tablet per slot. However, a small fraction of the tablets take a lot longer, slowing down the query response time from less than a minute to several minutes, when executed on a 2500 node system. The next section summarizes experimental findings.

Section 8

Observations

Figure 18:
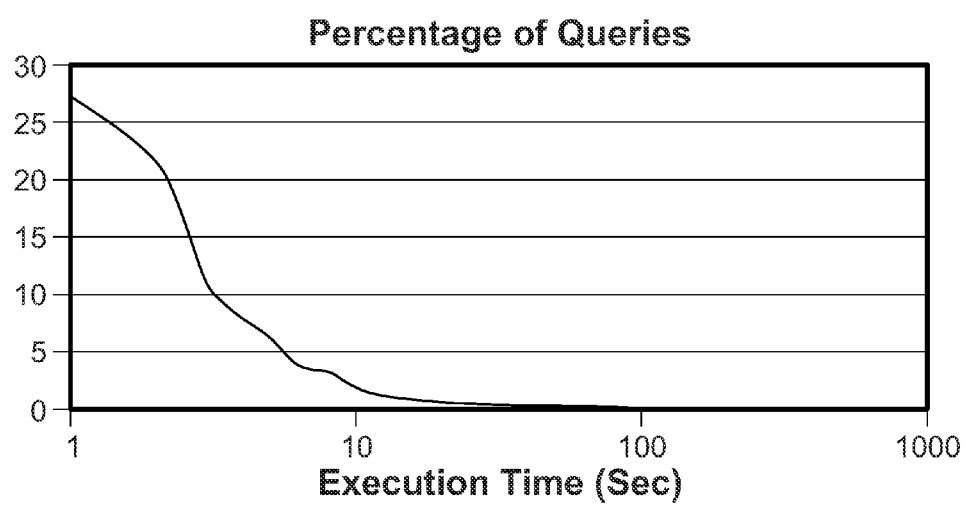
FIG. 18 is a graph that illustrates query response time distribution in a monthly workload.

FIG. 18 shows the query response time distribution in a typical monthly workload of the described system, on a logarithmic scale. As FIG. 18 indicates, most queries are processed under 10 seconds, well within the interactive range. Some queries have achieved a scan throughput close to 100 billion records per second in a busy cluster, and even higher on dedicated machines. The experimental data presented above suggests the following observations:

Scan-based queries can be executed at interactive speeds on disk-resident datasets of numerous records;

Near-linear scalability in the number of columns and servers may be achievable for systems containing thousands of nodes;

MapReduce can benefit from columnar storage just like a DBMS;

Record assembly and parsing are expensive. Software layers (beyond the query processing layer) may be optimized to directly consume column-oriented data;

MapReduce and query processing can be used in a complementary fashion, one layer's output can feed another's input;

In a multi-user environment, a larger system can benefit from economies of scale while offering a qualitatively better user experience;

If trading speed against accuracy is acceptable, a query can be terminated much earlier and yet see most of the data; and The bulk of a web-scale dataset can be scanned fast, although getting to the last few percent may increase the amount of processing time.

Figure 19:
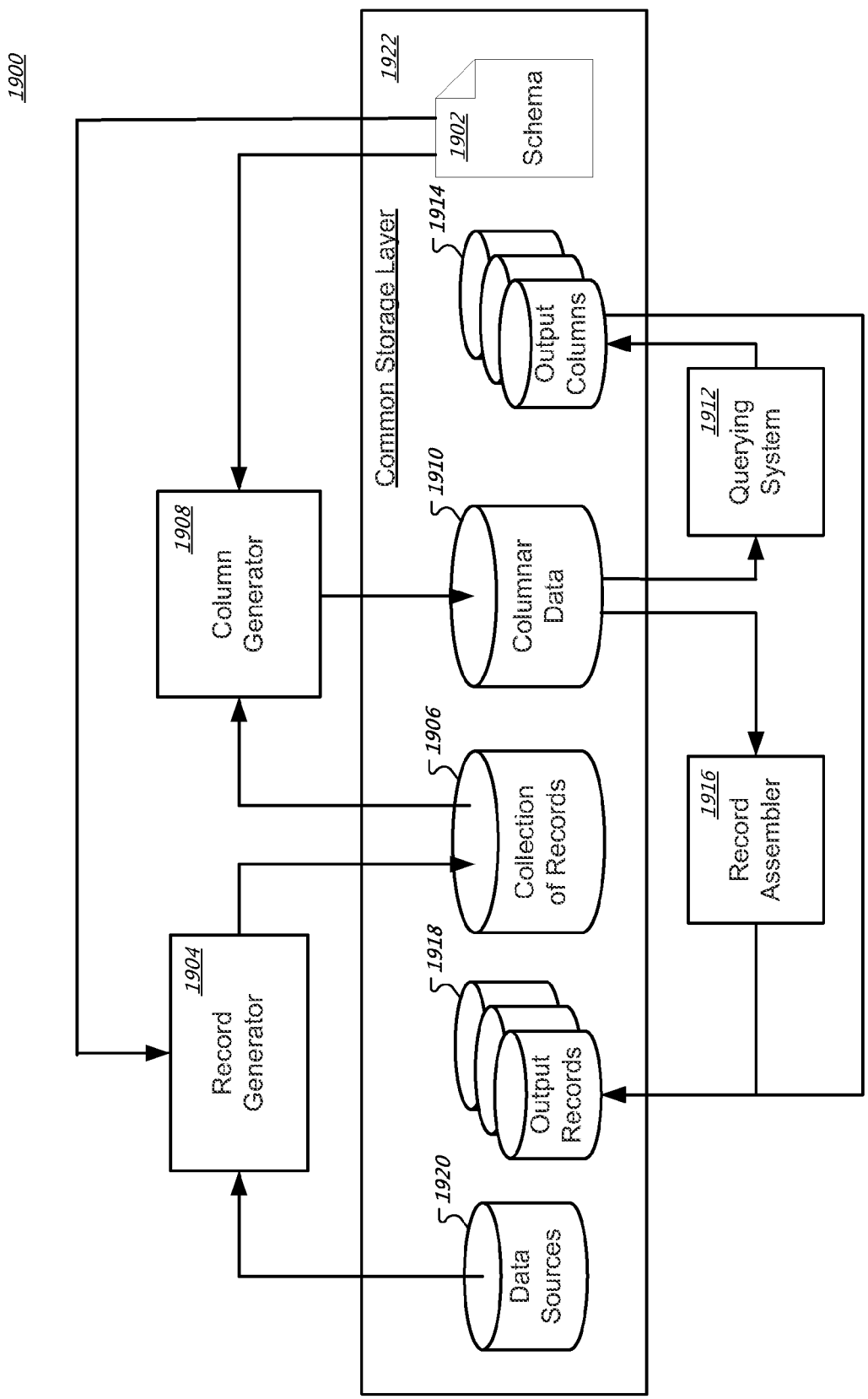
FIG. 19 is a block diagram of a system for generating and processing columnar storage representations of nested records.

FIG. 19 is a block diagram of a system for generating and processing columnar storage representations of nested records. The record generator 1904 generates records of nested data from data sources 1920 and a schema 1902. The column generator 1908 receives as input the records 1906 and the schema 1902 and outputs column stripes that represent the data in the records 1906, but in a columnar format. The columnar data 1910 may be queried in situ by the querying system 1912 in order to produce different sets of output columns 1914. The columnar data 1910 may also be assembled back into record form by the record assembler 1916. The records 1918 that are output by the record assembler may each include a sub-set of fields from the original records in the collection 1906. The output records 1918 may be operated on by a record-based data analysis program (e.g., MapReduce).

More specifically, the data sources 1920 may include substantially unstructured data. Substantially unstructured indicates that the data may include elements that denote structure, but the entire spectrum of information may not be similarly structured. As an illustration, the data sources 1920 may include the source code for each of millions of websites. Although each website includes some degree of structure, the content of each website is not generated based on a common schema. Standards may generally govern a format of the site, but content and placement of fields is not specified among each and every website by a single schema. In some examples, the information in data sources 1920 is not stored in the common storage layer 1922, but is pulled directly from external sources on the internet.

The schema 1902 defines a common structuring for information that may be contained in the data sources. As described earlier in this document, the schema 1902 can require certain fields of information and may permit other fields of information to be stored as optional.

The record generator 1904 receives as input the schema 1902 and information from the data sources 1920. The record generator 1904 takes the information from the data sources 1920 and structures all or portions of the information into individual instances of records that comply with the schema 1902. For example, while the data sources 1920 may include substantially unstructured data from web pages, the record generator 1904 may select pieces of information from each web page to include for particular records 1906.

Thus, each of the records 1906 may include data that is structured according to the schema 1902. The structured data may include fields, which may denote a semantics of data values and a structural relationship of the data values. Accordingly, the schema may be referenced to obtain additional definition information for the data value (e.g., what the digitally stored data value represents in the real world or on a web page and relationships to other values).

Each record 1906 may include nested fields and data values. A nested record may include more than one field of the same name or path. The fields with the same name or path, however, can be structurally located in different locations in a particular record. For example, a single field that is defined by the schema may be able to repeat multiple times. Further, fields may have children fields (i.e., nested fields). Thus, at a top level of a record a particular field may repeat, and each repetition of the field may or may not include a particular child field. In other words, the record may include instances of the child field in some portions of the record, but not in other portions of the records.

The collection of records 1906 may be translated into columnar data 1910 to speed up processing of information in the records. For example, if the amount of records in the collection 1906 numbers in the billions, and each record could include hundreds of different fields, an analysis of the records may be time-intensive where information on a small number of fields is desired. This is because each record in the collection 1906 is stored with other information from the record. That is, each record is grouped together in a consecutive portion of memory (e.g., as illustrated in the 'record-oriented' depiction of nested data in FIG. 1).

In contrast, columnar data 1910 includes columns that each store information for a single field in the schema 1902 (e.g., as illustrated in the 'column-oriented' depiction of nested data in FIG. 1). Thus, if the field is a byte long, the column for the field may be on the order of billions of bytes (e.g., one byte for each record) as opposed to billions of records (e.g., where each record may be a megabyte in size). The operations of the column generator 1908 are described in more detail in Section 4.2 "Splitting Records into Columns." The storage format for the columnar data 1910 is described in more detail in Section 4.1 "Repetition and Definition Levels."

The columnar data 1910 may be queried directly using the querying system 1912. In other words, the columnar data 1910 may be queried without loading the data into a database. The querying system, when executing a query, may receive as an input a table of columnar data. In some examples, the querying system also receives as input the schema 1902. The columnar stripes may be stored together with the schema to make the data self-describing. The querying system allows operations to be performed on the columnar data in order to generate columns of output information 1914. The output columns 1914 may include a subset of the values represented in the columnar data 1910, as determined by a particular query. In some examples, the querying system outputs records 1918 instead of, or in addition to, the columns 1914.

For example, the querying system 1912 may receive a first query and, in response, may parse through select columns of data and generate a set of output columns that provides a title of all web pages that have one or more videos and a number of the videos for each web page. The querying system may receive a second query and in response output a second set of output columns that provides a URL of every web page that was generated within the last fifteen minutes. Other information from the columns 1910 may not be included in a set of output columns that corresponds to a particular query 1914.

Data that is stored as columnar data 1910 may need to be accessed by an analytical service that does not operate on columnar data but operates on records. Thus, the record assembler 1916 may receive as input the columnar data and assemble records from the columnar data. The process of assembling records is described in more detail in Section 4.3 "Record Assembly."

Although the records may already be available in the collection 1906, the record assembler 1916 enables generating a set of records that includes a subset of the fields of the records in the collection 1906. For example, the records in the collection may include thousands of different fields. A user may want to run a record-oriented analysis program that only requires knowledge from two of the fields, but for all of the records. Thus, the record assembler 1916 may generate a set of records that only includes information on the requested fields. This way, multiple sets of output records 1918 can be developed for different analysis or for different analysis programs. An analysis on smaller records may be faster than an analysis that must traverse the larger records that may be found in collection 1906.

The above description of the operation of the system 1900 illustrates an example where the collection of records 1906 includes records that are formatted in accordance with the schema 1902, and where the columnar data 1910 is generated from this single set of similarly-structured data. In various examples, multiple schemas 1902 may be used to generate a collection of records that includes many sets of differently structured records 1906. Each record, however, may identify in a header the type of schema that was used in the record's generation. Similarly, a column stripe may be generated for each field in each of many sets of similarly-structured records. Each column stripe may indicate not only the name of the field, but also the schema from which the columnar data is associated (i.e., the schema used to format the records from which the columnar data was generated).

Figure 20:
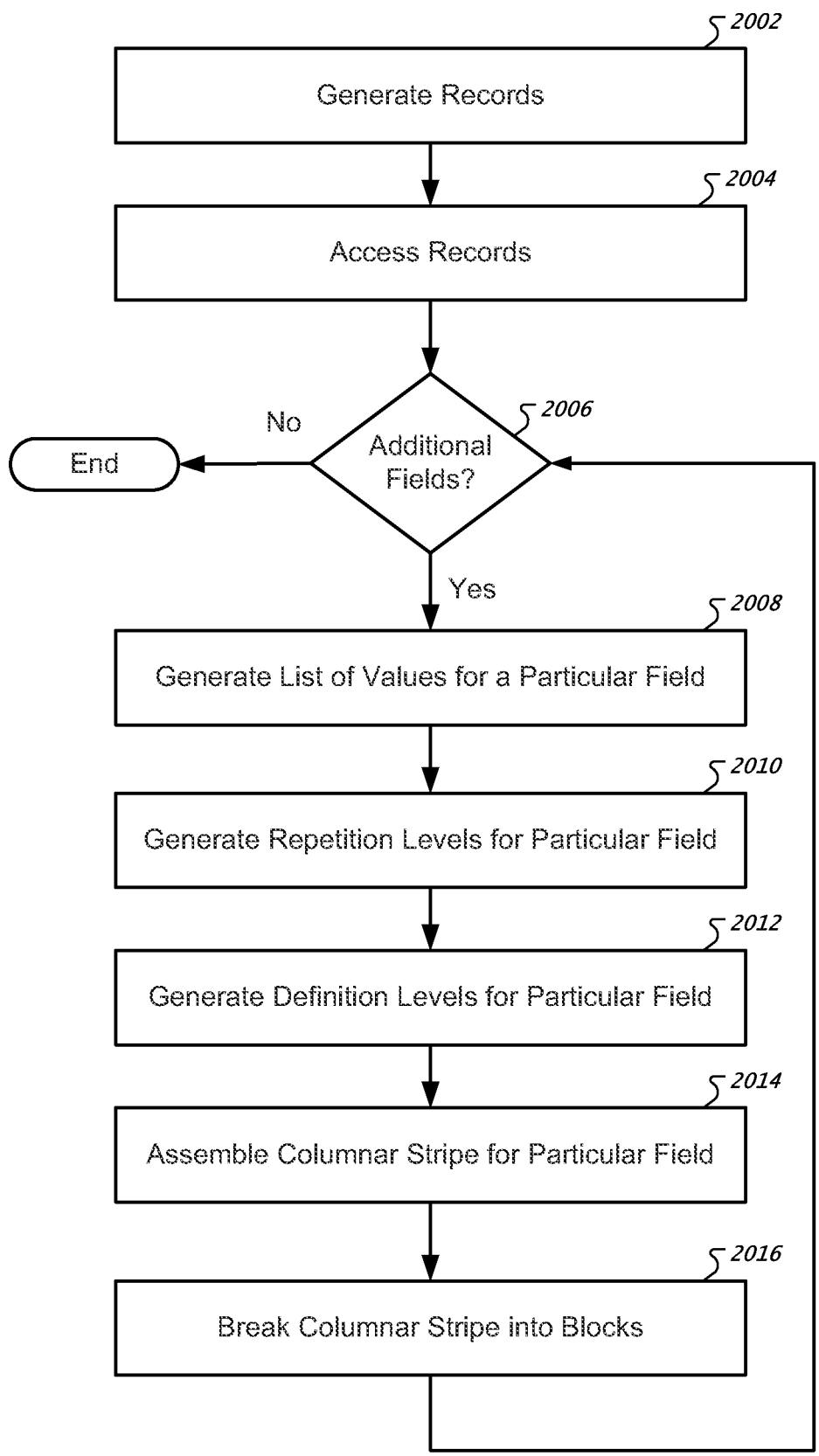
FIG. 20 is a flow chart of an example process for generating columnar data.

FIG. 20 is a flow chart of an example process for generating columnar data. The process may be performed by components of the system 1900.

In box 2002, a set of records is generated. The generation of the records may be performed by the record generator 1904. Unstructured data (e.g., from data sources 1920) may be compiled into a standardized record format that is defined by schema 1902. The records may be stored in the collection 1906.

In box 2004, the records in the collection 1906 are accessed. For example, the column generator 1908 receives as input the data from the collection of records 1906.

In box 2006, a determination is made whether a column stripe is to be generated for an additional field. For example, a stripe is to be generated for each field in the set of records that are stored in the collection 1906 (and thus each record in the schema 1902 or a subset thereof). In this illustration, no stripes have been made so far, and thus there are fields for which a stripe is to be generated. Accordingly, the process proceeds to box 2008 in order to perform operations for a particular field. If all stripes had been generated (e.g., a stripe had been generated for every field in the collection of records 1906), the process may end.

In box 2008, a list of values for the particular is generated. For example, each of the records may be traversed and a list of values for the particular field is generated.

In box 2010, repetition levels for the particular field are generated. For example, the column generator 1908 may determine a repetition level for each of the values in the list by determining a most recently repeated field in the path for the field.

In box 2012, definition levels for the particular field are generated. For example, the column generator 1908 may determine a definition level for each value (including values that are 'missing,' as described in more detail above).

In box 2014, a columnar stripe is assembled for the particular field. In various examples, the repetition and definition levels are placed in paired groupings in the header of the stripe. The list of values may be placed in the body of the stripe.

In box 2016, the columnar stripe is broken into blocks that may be compressed. Each block may include a set of values and their corresponding repetition and definition levels. Subsequently, a determination in box 2006 of whether columnar stripes are to be generated for additional fields is performed. If no additional columnar stripes are to be generated, the process ends.

The process depicted in FIG. 20 is an example process for generating columnar stripes. Variations on the process are contemplated. For example, the operations of the boxes may not be performed sequentially as depicted in the flowchart. Stripes for multiple fields may be generated at a single time. The repetition level and definition level may be generated as each value is obtained from a record. The columnar stripe may not be generated as a whole. Instead, each block may be generated from the stripe and independently compressed. Thus, the flowchart may represent a conceptual mechanism for understanding the generation of stripes, but is not intended to be limiting. A process for generating columnar data is depicted in the algorithm of FIG. 4, which may not correspond to the operations described in relation to FIG. 20.

Web Service for Data Processing

Figure 21:
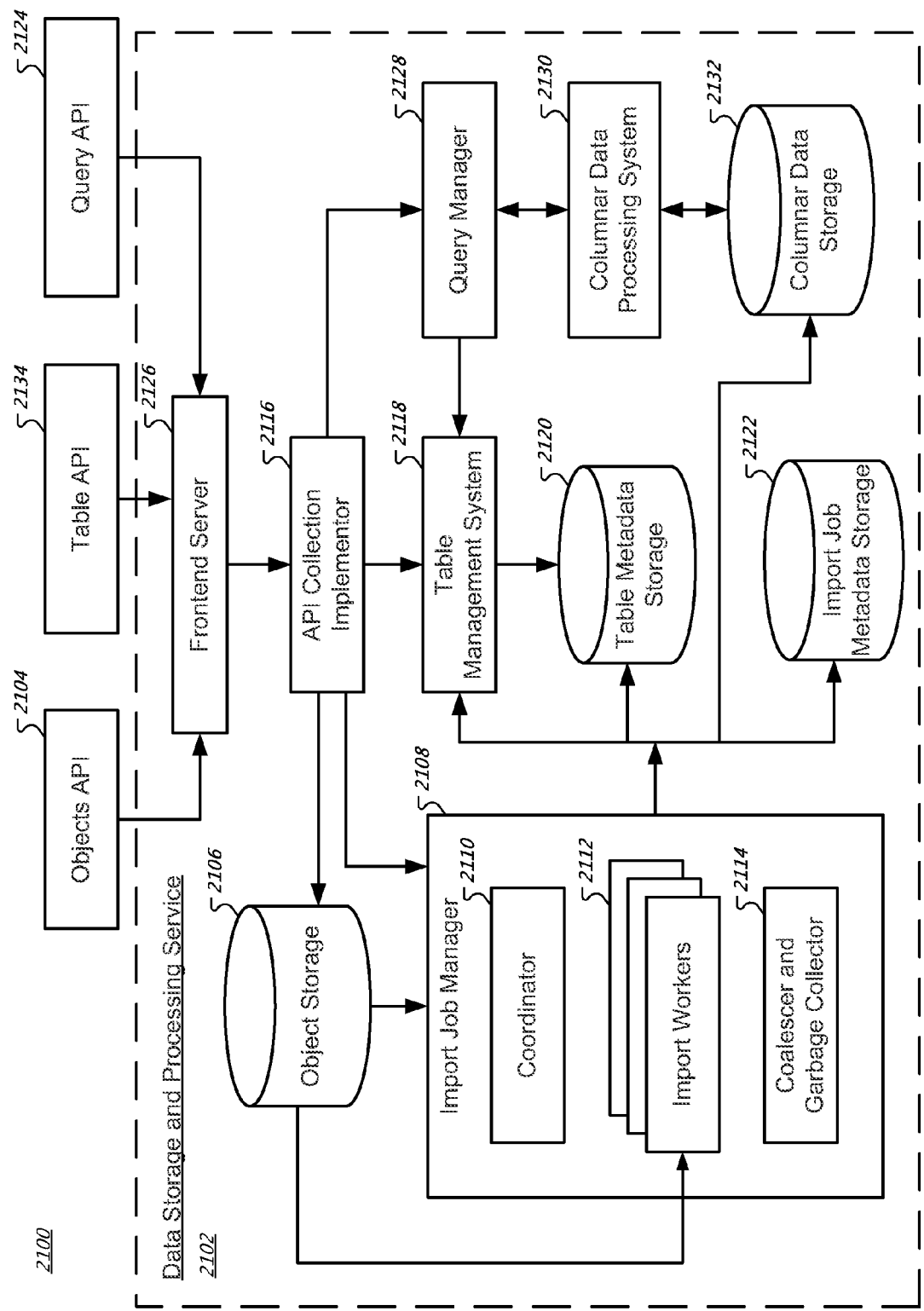
FIG. 21 is a block diagram illustrating an example of a system that implements a web service for data storage and processing.

FIG. 21 is a block diagram illustrating an example of a system 2100 that implements a web service for data storage and processing. In general, the columnar data processing system 2130 in the lower-right side of FIG. 21 represents components of the system illustrated in FIG. 19 (which illustrates a block diagram of a system for generating and processing columnar storage representations of nested records). As described in more detail throughout this document, the columnar data processing system 2130 may execute efficient queries on columnar data that is stored in repository 2132. The remaining components of the data storage and processing service 2102 support a web service that stores data, allows external users (e.g., individuals accessing the service 2102 over the internet) to import that data into tables, and, from the user's perspective, perform queries over those tables. The data underlying those tables may be stored as columnar data and the queries over the tables may be implemented by the querying capabilities of the columnar data processing system 2130. These external users use Application Programming Interfaces (API) 2104, 2134, and 2124 to upload data to the data storage and processing service 2102, import select portions of the uploaded data into tables, and perform queries on the tables. The data that is stored in the tables may be replicated among multiple data centers.

External users may use the Objects API 2104 to upload data into the object storage 2106, potentially aggregating in a single service data that streams regularly from many computing devices. External users may define tables and transfer the data that is located in the object storage 2106 to the tables. The transfer can be performed upon user request or automatically by the service 2102 as new data is uploaded to the object storage 2106. The bulk data that is referenced in tables may be stored as columnar data in storage 2132, while the metadata for the tables may be stored separately in the table metadata storage 2120. The external users may run efficient queries on the tables using the Query API 2124. The queries on the tables may be implemented as queries on the underlying columnar data in storage 2132, and the processing of the queries on the columnar data in storage 2132 may be performed by the columnar data processing system 2130, as described throughout this document.

The object storage 2106 that is provided to external users through the Objects API 2104 is described in detail first. The object storage 2106 hosts data that may be accessible through the Objects API 2104 to numerous external users. As an illustration, more and more log data that is generated by websites is being hosted in the cloud by remote services that specialize in data hosting, as opposed to the websites themselves storing the log files on their own networks. Such cloud-based storage may be particularly beneficial when data that is continuously generated by many geographically dispersed computers needs to be aggregated in one place, available to multiple different users, and occasionally analyzed.

The object storage 2106 may include objects from a variety of users that are grouped into buckets. Each bucket may be a flat container that groups objects and provides a unique namespace for the group of objects. An external user may own a collection of buckets and assign access settings to each bucket. Thus, objects in one bucket may be private to a few users while objects in another bucket may be publicly accessible on the internet. The buckets may have a universally unique name among all buckets owned by external users. In some examples, the buckets exist in a flat namespace such that the buckets are not nestable.

Each object may be stored as an opaque collection of bytes. In other words, the object storage 2106 may receive through the Objects API 2104 different types of data, but may treat the received data as a chunk of data without regard to the format of the data. Each object may have corresponding metadata that is stored in a separate table or database. Each object may be assigned to one bucket, and each object in a bucket may have a name that is unique to the bucket. Thus each object may have a globally unique name when addressed with reference to the object's parent bucket. Like buckets, each object may have its own access control list, enabling sharing data over a network (e.g., the internet) between a variety of users with different permissions.

The interface provided by the Objects API 2104 to exchange data may be a RESTful (REpresentational State Transfer) HTTP interface that employs industry standard, or proprietary, protocols. As an illustration, external users may employ GET, PUT, POST, HEAD, and DELETE actions to interact with objects that are stored in the object storage 2106. The Objects API 2104 provides a sequential interface for writing and reading data to objects in the object storage 2106. In some examples, the Objects API 2104 provides read-only access to some of the objects. Thus, a user may delete and replace objects, but may not incrementally modify objects. In some examples, the data storage and processing service 2102 may not be configured for external customers to perform SQL-like queries on the objects directly. The data in the objects may be first placed into structured tables before such queries are performed.

As an illustration, HTTP API requests may be received at the frontend server 2126 from a remote computerized device that is associated with an external user. The frontend server 2126 forwards the request to an API collection implementor 2126. The API collection implementor stores API libraries, processes the request based on the stored libraries, and generates corresponding requests to the appropriate components of the data storage and processing service 2102. Because API requests for the objects API 2104 pertain to object storage 2106, the API collection implementor 2116 forwards a request to the object storage 2106.

The data storage and processing service 2102 provides the ability to transfer data that is stored in objects into tables and run efficient queries on the tables using the columnar data processing system 2130. For example, users can append data to tables, create new tables, and manage sharing permissions for tables. The data in the tables may be stored as columnar data in the columnar data storage 2132. Accordingly, when data is placed in a table, the data storage and processing service 2102 transfers data from the object storage 2106 to the columnar data storage 2132. The import job manager 2108 manages the process of transferring the data and performs conversion operations on the data.

Each table represents a structured data set that a user may query through the Query API 2124. Users can create tables, import data into tables, share tables, run queries over the tables, and use the tables in data analysis pipelines. The external user exposure to a table may be an object that is stored in the object storage 2106 as a delegate object. A delegate object may be an object that provides an interface to a set of data and operations that are not stored in the object storage 2106. In other words, delegate objects may allow tables to be mapped into the namespace for the object storage 2106. Thus, each table's name may reside in the global object namespace and may be unique. A delegate object for a table may hold metadata that identifies the owner of the table, the access control list for the table, and the table identifier (which links the delegate object to additional table metadata, and is described in more detail below).

Thus, in one implementation, an external user sees tables as objects residing within buckets. The user may view a list of all tables in a bucket and may delete a table by deleting the corresponding delegate object, much in the same way that the user may view a list of objects and delete objects. When an external user makes a request that references a table via its object name, a reference to underlying table data is extracted from the delegate object and is used to service the request. For example, a delete operation on a table may trigger cleanup operations on the corresponding metadata in the table metadata storage 2120 and underlying columnar data in the columnar data storage 2132.

A table is created in response to a request through the Table API 2134. The table management system 2118 may create a table at a key of a database in the table metadata storage 2120, and then create a delegate object in the object storage 2106 to reference the key. The table metadata storage 2120 may hold metadata for the tables that are referenced by delegate objects. For example, a table identifier in a delegate object references a key in a row of the table metadata storage 2120. The table metadata storage 2120 stores, for the table and under the key, any combination of: (1) the table identifier, (2) a table revision number, (3) a table name, (4) a data reference set, (5) a schema description, and (6) data statistics.

The table name may be a back pointer to one or more buckets and objects that the table is associated with. Storing the table name may facilitate garbage collection and help avoid conflicts if the table is deleted and a new table with the same external (object) name is later created. The data reference set may include path references to the columnar data 2132 that backs the table (e.g., that stores the bulk data for the tables). The schema description may allow for efficient schema validation during data management operations. The data statistics may identify information about the table, for example, a number of rows, a size of data referenced by the table, and a last updated timestamp.

In some examples, a table is filled with data from objects in the object storage 2106 in response to a demand by a user (e.g., a Table API call). For example, the import job manager 2108 may receive an ad-hoc request from a data owner to import the data from a set of objects from the data storage 2106 into a table. In other examples, a data owner may generate a job that is executed by the import job manager 2108, and that establishes a continuous import service that takes objects that are newly placed in a bucket and "auto-imports" the data in the objects into a table. After the data from the objects is imported into the table, the objects may be automatically deleted without user input.

The import job manager 2108 receives requests to import data from an object into a table, and in response performs several operations to transfer data to the columnar data storage 2132. The job manager 2108 creates job metadata to track the import and launches a coordinator 2110. The job metadata is stored in the import job metadata storage 2122.

In particular, the import job manager 2118 may aggregate the content of objects, perform data format transformations, shard the data into appropriately sized chunks, move the data into a different storage layer, and place the chucks of data in the columnar data storage 2132 for access by the columnar data processing system 2130. In some examples, the import job manager 2108 transforms the object data into columnar data. In other examples, the import job manager 2108 places non-columnar chunks of data in the columnar data storage 2132, and the columnar data processing system 2130 converts the non-columnar chunks of data to a columnar format.

The coordinator 2110 is invoked by the import job manager 2108 to analyze an import job and launch an appropriate number of workers to process the data in a reasonable amount of time. The coordinator 2110 analyzes the input data objects and decides how to assign the data objects among individual workers 2112 that process the input data objects. The coordinator 2110 spawns individual worker instances and observes worker progress. The coordinator 2110 ensures that the data handled by each worker is not too small or large.

In some circumstances, use of a single coordinator and many workers may enable the import job manager 2110 to scale with data size and a number of input data objects. If a failure is detected or a worker is inefficient, the worker may be restarted or the worker's tasks may be reassigned. Each worker instance 2112 may sequentially read input data objects, perform appropriate format conversions, and store the data in sharded bundles of columnar data 2132. In some examples, worker instances are assigned to run in the same clusters where the input data is located (because cross-datacenter traffic can be inefficient and expensive).

The workers convert data from a given set of inputs into a sharded set of columnar data bundles, and appends the bundles to the appropriate table. Input data may be any schematized data format that the system understands. Input data may be text or binary form, and the schema may be incorporated in the data format or specified along with the data. Example input data may be: (1) a record data type (a self-contained and self-describing structure for record-stored data), (2) a column data type (a self-contained and self-describing structure for column-stored data), (3) text based formats for which the data storage and processing service 2102 knows the schema (field separated or fixed field length formats such as Apache, AppEngine, or W3C logs), or (4) text based formats that can be described by name/type value pairs (field separated or fixed field length, and the user specifies the name/type pairs and separators or field sizes).

The coalescer and garbage collector 2114 may periodically scan tables for issues to fix. The coalescer may monitor contents of the columnar data storage 2132 and detect columnar data bundles that are too small and may be coalesced into larger bundles. The garbage collector detects columnar data bundles that are not referenced by any tables and may be deleted. Similarly, dangling table metadata may be cleaned up, for example, when a table is generated but the table creation process fails before a corresponding delegate object is generated in the object storage 2106.

Once a table has been created and data has been imported into the table (e.g., by generating table metadata, generating the delegate object in the data storage 2106, and generating corresponding columnar data 2132), user queries may be run on the tables. The queries may be SQL-like and may be received from external users through the Query API 2124. The frontend server 2126 receives the Query API requests and forwards the requests to the API collection implementor 2116, which passes the queries to the query manager 2128.

The query manager 2128 takes SQL-like queries and an authenticated token for the external user, verifies that the external user can access the tables referenced in the query, and hands the request off to the columnar data processing system 2130 and table management system 2118 for executing the query. As described earlier in the document, the columnar data processing system 2130 may query columnar data 2132 and output result data (e.g., columns of result data). The result data may be placed in a table defined by the query, returned to the external user in a format defined by data format templates, or placed in an object defined in the API call.

The API collection implementor 2116 handles API calls through the Objects API 2104, Table API 2134, and the Query API 2124. Example API functions are detailed later in this disclosure. The collection of APIs may enable SQL-like summaries to be performed on large quantities of data that is imported into tables from the object storage 2106. The source objects in object storage 2106 may be aggregated from numerous web sources, each source having permission to place data in the same bucket of object storage 2106. Thus, the illustrated data storage and processing service 2102 can provide an aggregation and data import pipeline for the columnar data processing system 2130 described earlier in this document. The columnar data processing system 2130 can provide fast queries and aggregations of large datasets.

Figure 22:
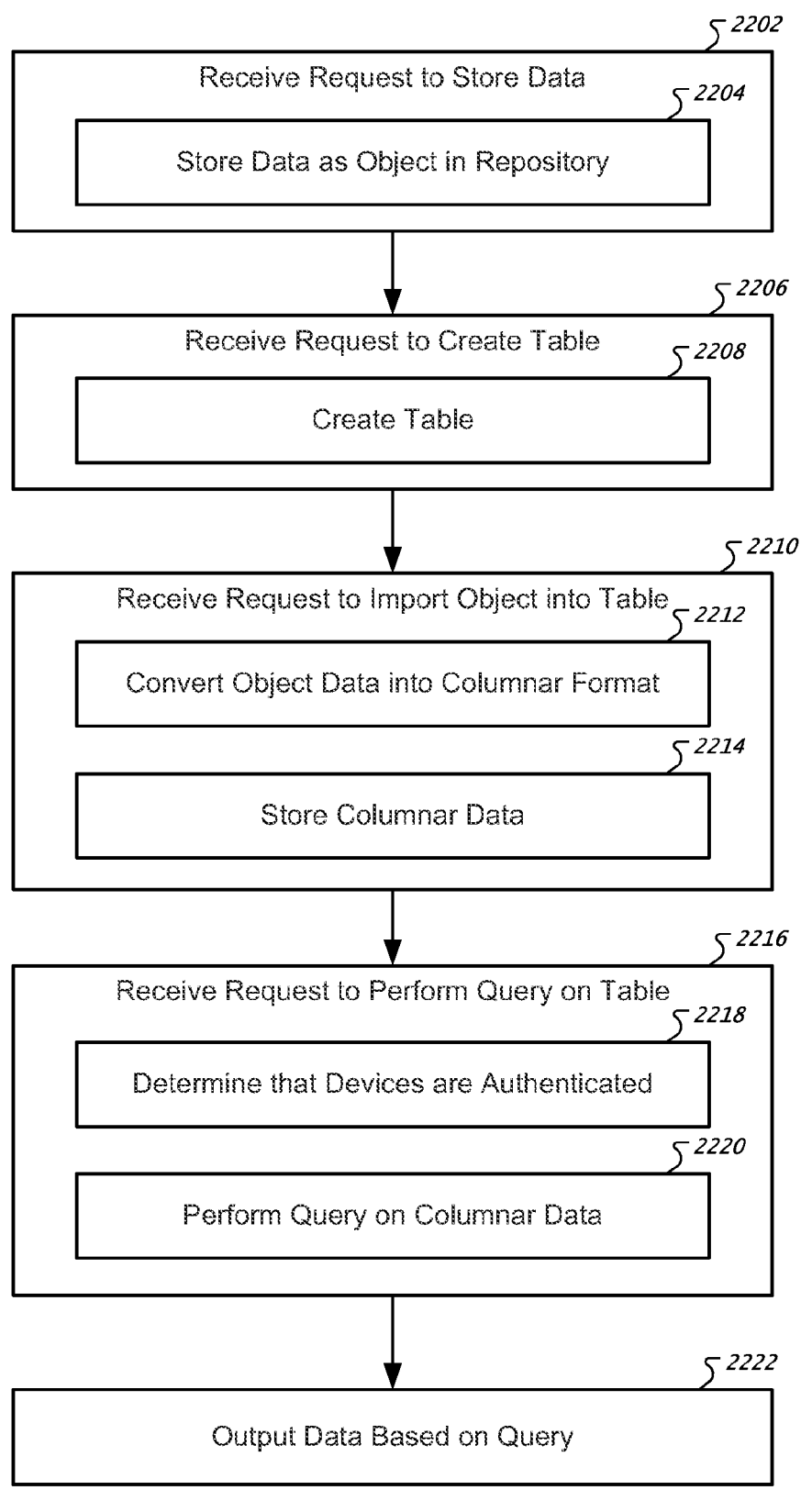
FIG. 22 is a flowchart showing an example of a process for performing data storage and processing.

FIG. 22 is a flowchart showing an example of a process 2200 for performing data storage and processing. The process 2200 may be performed by the system illustrated in FIG. 21, and more particularly the data storage and processing service 2102.

In box 2202, a request to store data is received at a server system. For example, a server system that provides the data storage and processing service 2102 may implement an API that enables remote computing devices to upload data to the server system, for example, over the internet. The server system may receive a function call to upload data through the API and from a remote computing device. The function call may identify data to upload and a name for the data. The name for the data may identify a storage location for data (e.g., a bucket).

In some examples, the request may be received from a computing device that does not access the data storage and processing service 2102 over the internet. For example, a third party may physically ship one or more physical storage devices (e.g., CDs, DVDs, hard discs, or RAID enclosures) to a business entity that operates the data storage and processing service 2102. Employees of the business entity may load the data that is included in the physical storage device into the object storage 2106 using a computing device that is connected to the data storage and processing service 2102 over a local network. The local transfer of data to the object storage 2106 may not use the API.

In box 2204, the identified data is stored as an object in a repository at the server system. The repository may include a collection of "buckets" that are each configured to include one or more objects. Each bucket may have a name that is unique among the collection of buckets, and the objects in each bucket may have names that are unique to the bucket. Thus, each object may be addressable by a unique name path (e.g., bucketName.objectName). Each bucket may be owned by one or more external customers.

Storing the data (e.g., a record, collection of records, file, or collection of files) as an object may include determining that the remote device that is uploading the data is authorized to place objects in the identified bucket. For example, an external customer may create a bucket and assign specific user accounts as authorized to place data in the bucket and view the contents of the bucket. If a remote device logged in under one of the specific accounts requests to place data in the bucket, the request may be granted. Similar requests by non-authorized user accounts may be rejected.

In box 2206, a request is received to create a table. For example, the data storage and processing service 2102 may receive from a remote computing device an API function call requesting to create a table. A table may be a structured data set that a user may query. The request may define a name for the table, and define the fields for the table. For example, the request may include a schema that defines a structure for a type of record, and the table may be generated to store data for records of the type.

In box 2208, the table is created. For example, metadata for the table may be added under a row in a database. A delegate object that references the table row may be placed in the object repository. For example, if the API call requests to generate a table named bucketName.TableName, a delegate object that is named TableName may be placed in the bucket bucketName. The TableName delegate object may include an access control list for the table and a table identifier (e.g., an identifier of the database row that stores metadata for the table).

In box 2210, a request to import data in the object into the table is received. For example, the data storage and processing service 2102 may receive from a remote computing device an API function call requesting that data in the object be loaded into the table or appended to the end of a table that already includes data. In some examples, the request is received from a continuous import service. The continuous import service may periodically monitor a bucket and when the bucket includes new objects (e.g., when external customers place new objects in the bucket) the continuous import service requests that data in the new objects be appended to the table. In some examples, an API function call that establishes the continuous import service was received earlier. The customer-facing view of the continuous import service may be a delegate object.

In box 2212, the data in the object is converted into columnar format. For example, the object may include a set of records, and the records may be converted into a set of columnar stripes, where each stripe (or set of blocks of a stripe) describes a single attribute field of the records. The columnar stripes may include the repetition and definition levels described throughout this document.

In box 2214, the columnar data is stored in a repository. In some examples, the repository for the columnar data is different than the repository for the objects. For example, the repositories may be different storage layers implemented at a server system implementing the data storage and processing service 2102. Metadata that references the columnar data may be stored in the table database. Thus, a query of the table may include referencing the metadata in the table database to identify columnar data that corresponds to particular attribute fields for the data in the table.

In some examples, the request identifies several objects for which data is to be loaded into the table. The data content of the objects may be aggregated, data format transformations may be performed, the data may be sharded into appropriately sized chunks of columnar data, and the chucks of columnar data may be placed in the repository for columnar data.

In box 2216, a request is received to perform a query on the table. For example, the data storage and processing service 2102 may receive an API function call from a remote computing device requesting that a SQL-like query be run on the table. In some examples, the query operates on the table and one or more other tables. For example, the query may collect data having particular characteristics from each of two tables and place the aggregated data in a third table.

In box 2218, a determination is made whether the remote computing device requesting the query is authenticated to access the one or more tables specified in the query. For example, the delegate object for each table may have an access control list that identifies user accounts that may run queries on the table corresponding to the delegate object, delete the table, and add data to the table. If a remote computing device associated with a user account attempts to run a query on several tables, the data storage and processing service 2102 determines if the user account is authorized to query each of the tables.

In box 2220, a query is performed on columnar data. For example, queries are performed on the columnar data underlying the tables specified in the query request. A query manager 2128 may generate, based on the query received from the remote computing device, component queries that are performed on particular columns of data for the tables specified by the query. For example, the query may request data within a particular range for a single attribute in a table. The query manager 2128 may generate a component query on a collection of blocks of a columnar stripe that is associated with the single attribute, and may run other component queries on columnar stripes for other of the attributes in the query.

In box 2222, data is output based on the query. For example, the query may identify a table that the results of the query are to be placed in. Accordingly, the query manager 2128, table management system 2118, and columnar data processing system 2130 may place the result data in a table. Also, the query may identify one or more objects in which to place the results of the query. Thus, the results of the query may be placed in one or more objects in the object storage 2106. The API call requesting that the data be placed in the object may specify a data format for storage of the data in the object. Accordingly, outputting the data as one or more objects may include converting output columns of columnar data stored in the columnar data storage 2132 into a different type of data format for storage in the object storage 2106 (e.g., a record-based type of data format).

In some examples, the schema may be extensible. In other words, a third party may request minor changes to the schema (e.g., by editing the schema through an API or uploading a new schema that includes minor changes). The minor changes can include adding new optional fields to the schema. In some examples, however, the user may not be able to add new required fields or remove existing required fields from the schema. The schema may be updated without rebuilding or regenerating the entire data set. As such, a new columnar stripe may be added for a newly added optional field without modification of the existing columnar stripes.

In some examples, a third party user may be able to change field names and add aliases for field names. For example, a schema may include a field that is named "Time." A third party user may decide to change the name of the field to "LocalTime." As such, newly submitted data records may include "LocalTime" fields, while data records that are already stored by the data storage and processing service 2102 may include "Time" fields. The data storage and processing service 2102 may recognize the fields "Time" and "Local Time" as aliases of each other. As an example, the data storage and processing service 2102 may store an index that matches field names to a unique identifier for a data element. The index may associate both the "Time" and "Local Time" aliases to a unique identifier for a field (e.g., the identifier "1A452BC"). As such, the unique identifier may be associated with and designate a single columnar stripe that all the data values for the "Time" and "Local Time" fields. In some examples, the data records stored in the object storage 2106 also identify fields with unique identifiers and do not identify fields with names that can change.

Also, the data may be directly output to the remote computing device, additionally or instead of placing the data in a table or an object. For example, a remote computing device requesting the query may in response receive the results of the query. The results of the query may be in various formats (e.g., CSV or data for reconstructing a display of the output table).

Replication and Query Processing

In various examples, the data that is stored by the data storage and processing service 2102 is replicated among geographically dispersed server devices. For example, an object that is stored in object storage 2106 may be replicated among server devices in data centers that are hundreds of kilometers apart from each other. Thus, a localized server failure, power outage, or natural disaster may not influence the availability of the object. Similarly, after the data in the object has been imported into a table, the columnar stripes that underlie the table and that reside in the columnar data storage 2132 may be replicated among geographically dispersed server devices. The table metadata that is stored in the table metadata storage 2120 may also be replicated among geographically dispersed server devices. This replication of columnar data and table metadata is described hereinafter.

Figure 23:
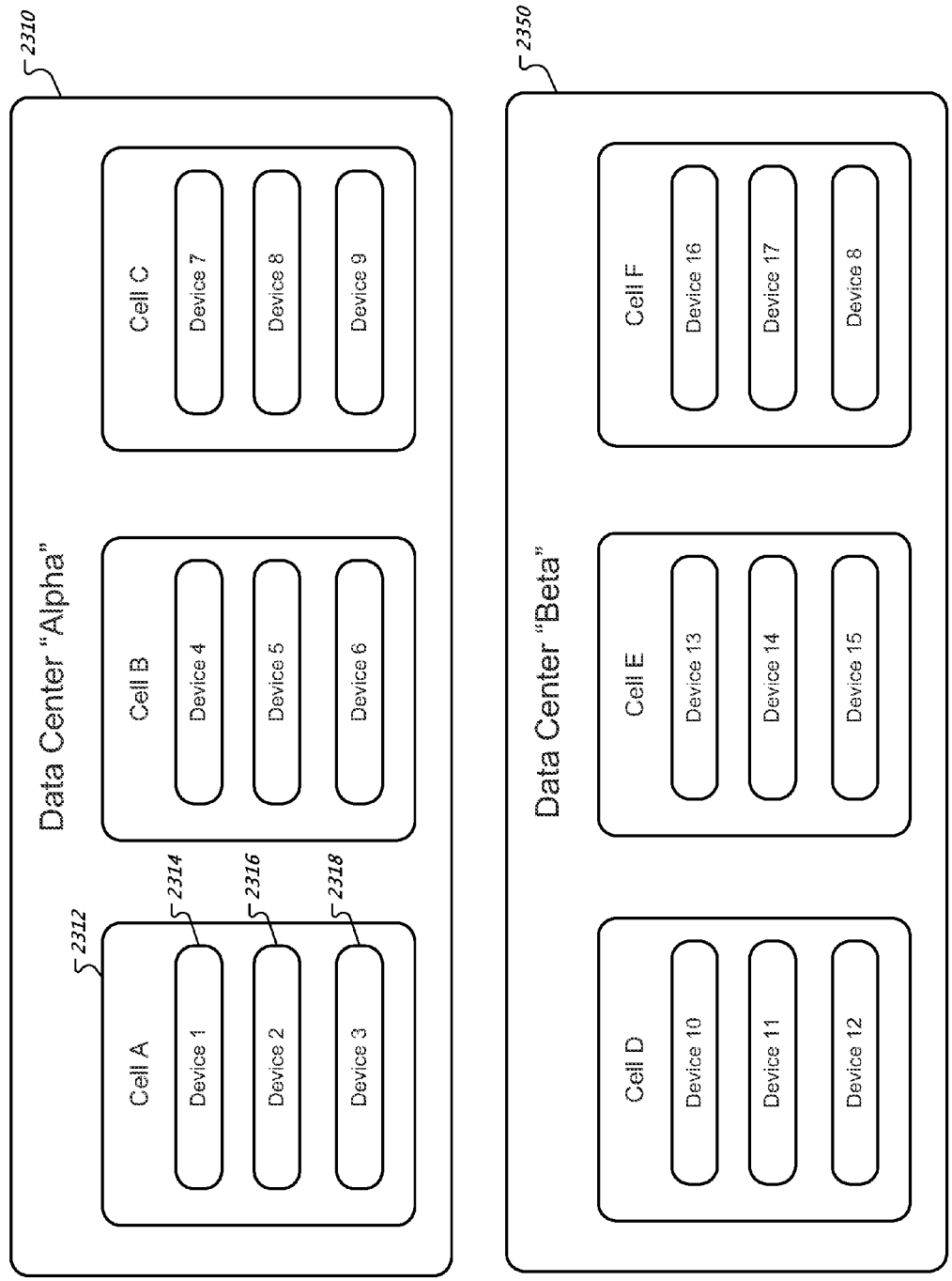
FIG. 23 shows a schematic diagram of an example computing system infrastructure.

FIG. 23 shows a schematic diagram of an example computing system infrastructure. In this illustration, an organization operates multiple data centers, although only two data centers 2310 and 2350 are shown in the figure for illustrative purposes. Each data center may be separated by a geographical distance of, for example, at least fifty kilometers or at two hundred kilometers. Each data center includes numerous computing devices (e.g., servers, groups of servers, or individual CPUs). The computing devices are logically grouped into cells. For example, Cell A 2312 is shown as including three computing devices 2314, 2316, and 2318, although the cell may include additional computing devices.

Each computing device in a data center may belong to a single cell (e.g., no computing device may be assigned to more than one cell and service more than one cell at particular times). The devices that are assigned to a specific cell, however, may dynamically change so as to balance resource allocation among the cells of a data center. An individual or group of individuals (e.g., a project team) at the organization may reserve one or more cells at one or more data centers, for example, to support data processing that the team requires to offer a web service. A reserved cell may exclusively support the reserving team and may not be available to other teams while reserved. As described with further detail below, a team may reserve a collection of cells from different data centers, and may implement a data replication process among the cells.

As indicated previously, the data that is replicated among the cells may be the columnar data that is described with respect to columnar data storage 2132. The system may replicate the columnar data in order to ensure that the columnar data is persistent in the event that a particular device or data center crashes, in order to support load balancing among the data centers, and/or in order to reduce latency in providing a customer with a result to a query by processing data at a data center that is geographically near to the customer.

Figure 24:
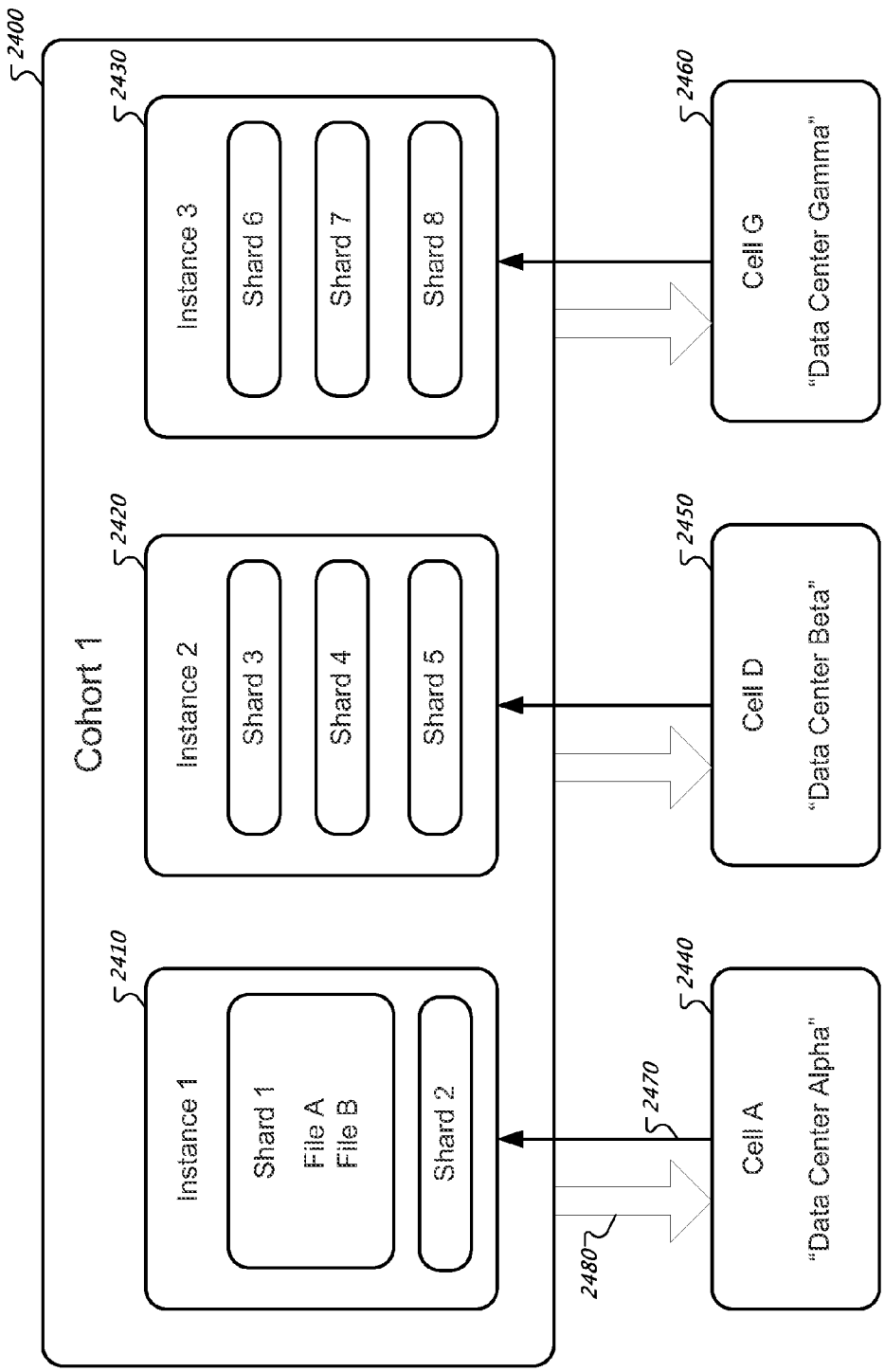
FIG. 24 shows a schematic diagram of an example of data naming structure that may be used to support data replication.

FIG. 24 shows a schematic diagram of an example of a data naming structure that may be used to support replication of data. In this example, a block of columnar data may be assigned a logical address. The logical address may be distinct from physical addresses of the replicated copies of the columnar data, and may not reference specific machines or locations at which the columnar data is replicated. The logical address may take the form Cohort:Instance:Shard:File, where each portion of the "Cohort:Instance:Shard:File" logical address indicates a logical set of data that can be replicated among multiple cells. For example, a cohort may be a rather sizable logical collection of data that is replicated among multiple cells. The "file" portion of the address, however, may represent a logical name for a single block of columnar data. The use of the term "logical" herein indicates a naming structure that is abstracted from the physical address of the data, and that can reference data that is replicated among multiple physical locations. As such, a logical set of data may be associated with multiple actual copies of the set of data at multiple respective cells.

The logical collection of data denoted a cohort may include multiple "instances" that represent logical portions of the sizable collection of data. Each of the instances in the cohort may be replicated among the multiple cells that replicate the data in the cohort. For example, cohort 2400 is assigned instances 2410, 2420, and 2430. Each instance represents a partition of the data that is stored by the cohort and that is replicated among the different cells that store the data in the cohort.

Although each cell that stores data in a cohort may store a copy of all instances that, put together, comprise the cohort, each instance may be assigned one of the cells as its writing cell. For example, cell 2440 is assigned as the writing cell for instance 2410, cell 2450 is assigned as the writing cell for instance 2420, and cell 2460 is assigned as the writing cell for instance 2430. A writing cell may be the initial cell that writes to its corresponding instance. Once the instance has been written to by its respectively assigned writing cell, however, the writing cell updates the other cells with the instance of the cell. Along the same line, the writing cell receives updates to its non-writing instances from the other cells in the cohort.

In other words, although Cell 2440 may be the writing cell for Instance 2410, cell 2440 may store replicated data from instances 2420 and 2430. As such, the writing cell for an instance may be the cell that first updates information for that instance of data. As a result, while multiple cells may store data from a cohort, the cell that first writes an update to a file in the cohort may be determined by which instance that file is logically stored within. This process is illustrated in FIG. 24 by the narrow, solid arrows (e.g., arrow 2470) and the large, hollow arrows (e.g., arrow 2480). The small arrows represent the writing of data from the cell to its assigned instance. The large arrows represent the replication of updates from the other cells and of other instances back to that particular cell. For example, cell A 2440 writes to cell 2410 but receives replicated data from cells 2420 and 2430.

Each instance may be written to as a direct result of a querying operation by only its assigned writing cell. All other cells that store the instance may copy the information that resulted from the querying operation from the assigned writing cell. These other cells may not copy the information that resulted from the querying operation until that information has been written to the appropriate data structures of the assigned writing cell. As such, even though all cells that replicate data in a cohort may store a copy of an instance from that cohort, a single one of the cells that is assigned to the instance may be designated as a first cell to write to its locally-stored copy of the instance. As described in greater detail below, the other cells may thereafter update their versions of the instance.

Each instance includes multiple shards. A shard represents a logical portion of the logical files that are stored in the instance. The use of shards permits the system to scale its replication process by assigning multiple replication jobs to multiple respective shards at a given moment.

As mentioned above, the cohort:instance:shard:file naming structure provides a logical address for data that is distinct from a physical address for the data. For example, a cohort may be serviced by three cells: a first cell in North America, a second cell in Europe, and a third cell in China. The development team that has reserved the cells assigned to the cohort may determine that customers would be better served if a cell in India were used to support the cohort instead of the cell in China. As such, the cell in India may be brought online and the cell in China may be brought offline. Aside from the period in which data is transitioned from the cell in China to the cell in India, the overall number of cells that support the cohort may not change. Further, the cohort:instance:shard:file name for data that was initially written by the China cell may remain the same even after writing responsibilities have been transferred to the Indian cell. Indeed a particular file named according to the cohort:instance:shard:file protocol may be stored at the three cells that back the Cohort.

Figure 25:
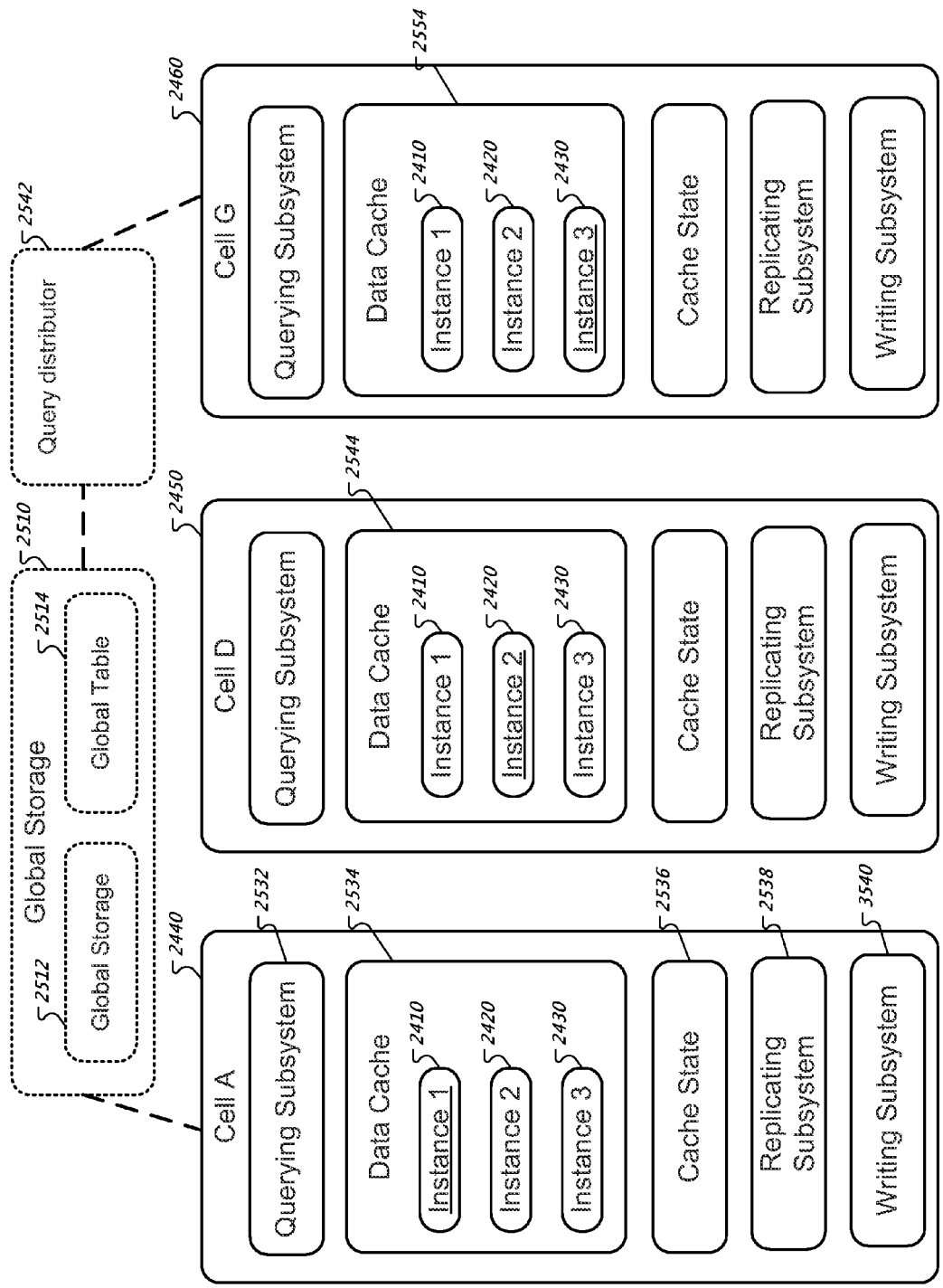
FIG. 25 shows a schematic diagram of components that may be used to provide the data processing service.

FIG. 25 shows a schematic diagram of components that may be used to provide the data processing service. The figure shows system components for servicing a single cohort (e.g., Cohort 2400). In this example, the columnar data that backs the table is stored in cohort 2400, which is stored by cells A, D, and G. Each cell can include its own data cache, which may be provided by local storage systems of the individual cells, and the data cache can store the replicating data. For example, each cell may execute an instance of the local storage system. The local storage system may be a scalable distributed file system, such as the Google File System. Thus, the files or columnar data described throughout this document may be replicated among data caches 2534, 2544, and 2554 of cells 2440, 2450, and 2460, respectively.

As discussed with reference to FIG. 24, each cell's data cache can store all instances that are assigned to the cohort. Each cell, however, may be designated to write to one instance (or more than one instance when, for example, another one of the cells is brought off line for servicing). In FIG. 25, the writing cell that is designed to write to a particular instance is identified by the underline of the label for each particular instance. For example, cell A 2440 writes to instance 2410, cell D 2450 writes to instance 2420, and cell G 2460 writes to instance 2430.

In this disclosure, the designation "writing cell" for a particular instance indicates that the cell has been established, at least temporarily, by the overall storage system as a first cell in the cohort to write to the particular instance. Thus, during a particular period of time (e.g., one minute, one hour, or one day), all initial writing operations to a particular instance may be performed by the writing cell, and the updated data may thereafter be replicated to the other cells. Writing operations during the same period of time to other instances may be performed by their other writing cells. As such, the writing and replication operations are distributed among the cells of the cohort.

The cell that writes to a particular instance may not write to other instances in the cohort, even though the cell may store the other instances. For these other stored instances, the cell updates the data in the stored instances with data from the writing cells for the respective instances. For example, Cell D 2450 updates instance 2410 from Cell A 2440 and updates instance 2430 from Cell G 2430. For a particular instance, all cells in a cohort except for the writing cell may receive updates to the particular instance from the writing cell.

A single instance of a querying subsystem (e.g., subsystem 2532) can execute at each cell in the cohort. In other words, the different cells or data centers may execute different manifestations of the querying subsystem. Stated even another way, each occurrence of the querying subsystem (e.g., occurrence 2532) can perform data processing operations on a single data cache (e.g., data cache 2530). As such, all columnar data that is accessed during a data processing procedure may be stored within a single data cache at the same data center at which the data processing procedure executes. In this illustration, querying subsystem 2532 represents a manifestation of the columnar data processing system 2130 (FIG. 21) and the data cache 2534 represents a copy of the columnar data storage 2132 (FIG. 21).

The system also may include a global storage system 2510. The global storage system may be a storage system that includes its own internal mechanisms for replicating data across data centers and cells. The cells that support the global storage system may be different than the cells in which the columnar data processing operations are supported. The data centers that store the columnar data and the data backing the global storage system 2510, however, may be at least partly in common.

The described data processing system may not use the global storage system 2510 for all storage and data processing operations because the columnar data processing service may be optimized to operate on data that is stored within a single data center, for example, by a single data cache 2534. Moreover, the columnar data processing service may use greater internal data processing throughput (e.g., data processing and communication among computing devices of a storage system) than external throughput (e.g., communication throughput between a storage system and a device of an external user through an application program interface). Storage systems that are localized to cells may provide better operational characteristics for a processing system that uses greater internal throughput than external throughput.

The global storage system 2510 can include global file storage 2512 (e.g., for providing persistent storage for data). The global storage system 2510 can also include a global table 2514. The global table 2514 is used to store customer projects, datasets, and tables, for example. The information that is stored in the global table 2514 is described in greater detail below.

Each cell also may include a cache state (e.g., cache state 2536). Each cache state may identify the state of the data that is stored by the user-generated tables (e.g., in the columnar data) in all of the data caches of a cohort. For example, each cell may have, in its respective cache state, information that identifies the present state of each instance in the cohort for each cell assigned to the cohort. The information may also identify the present state of each file in the cohort (e.g., each block of columnar data), and may identify whether the file is up to date (e.g., whether the cell still needs to receive an update from the writing cell for the instance that stores the file). The cache state information may replicate quickly between cells. The underlying data (e.g., the columnar data), however, may not replicate as quickly. As such, in some instances, each cell may query the information in its cache state to identify whether to replicate data from another cell. In other instances, each cell distributes updates for its assigned writing instance to other cells.

Each cell can include a writing subsystem (e.g., writing subsystem 3540). The writing subsystem handles writing operations to the instance that is assigned to the cell at which the writing subsystem executes. The writing subsystem can either parse the received query to identify values that are to be added to the instance that is assigned to the cell, or can receive such values from the querying subsystem 2532 and write the values to the local copy of the instance. In some examples, the writing subsystem modifies portions of the instance by appending values specified by the query into certain blocks stored by the instance. In some examples, the writing subsystem modifies portions of the instance by replacing certain blocks in the instance with newly-formed blocks that include the values specified by the query.

Each cell can include a replicating subsystem (e.g., replicating subsystem 2538) that handles the replication processes for the cell. As described with respect to FIGS. 29 and 30A-C, the replicating system can either (i) compare copies of instances stored by the cell to copies of the instances stored by other cells to determine if the other cells have stored more up-to-date copies of the instances (as described with respect to FIG. 29), or (ii) can, after the local manifestation of the writing subsystem 3540 updates an instance, distribute the updates to copies of the instance at other cells (as described with respect to FIGS. 30A-C).

A query distributor 2542 can receive a query that is structured to select data from a table, and can distribute the query to one of the cells (e.g., one of cells 2440, 2450, and 2460) based on the replication state of the data stored by the cells and various other criteria, such as distances between a remote computing device that submitted the query and the cells.

Figure 26:
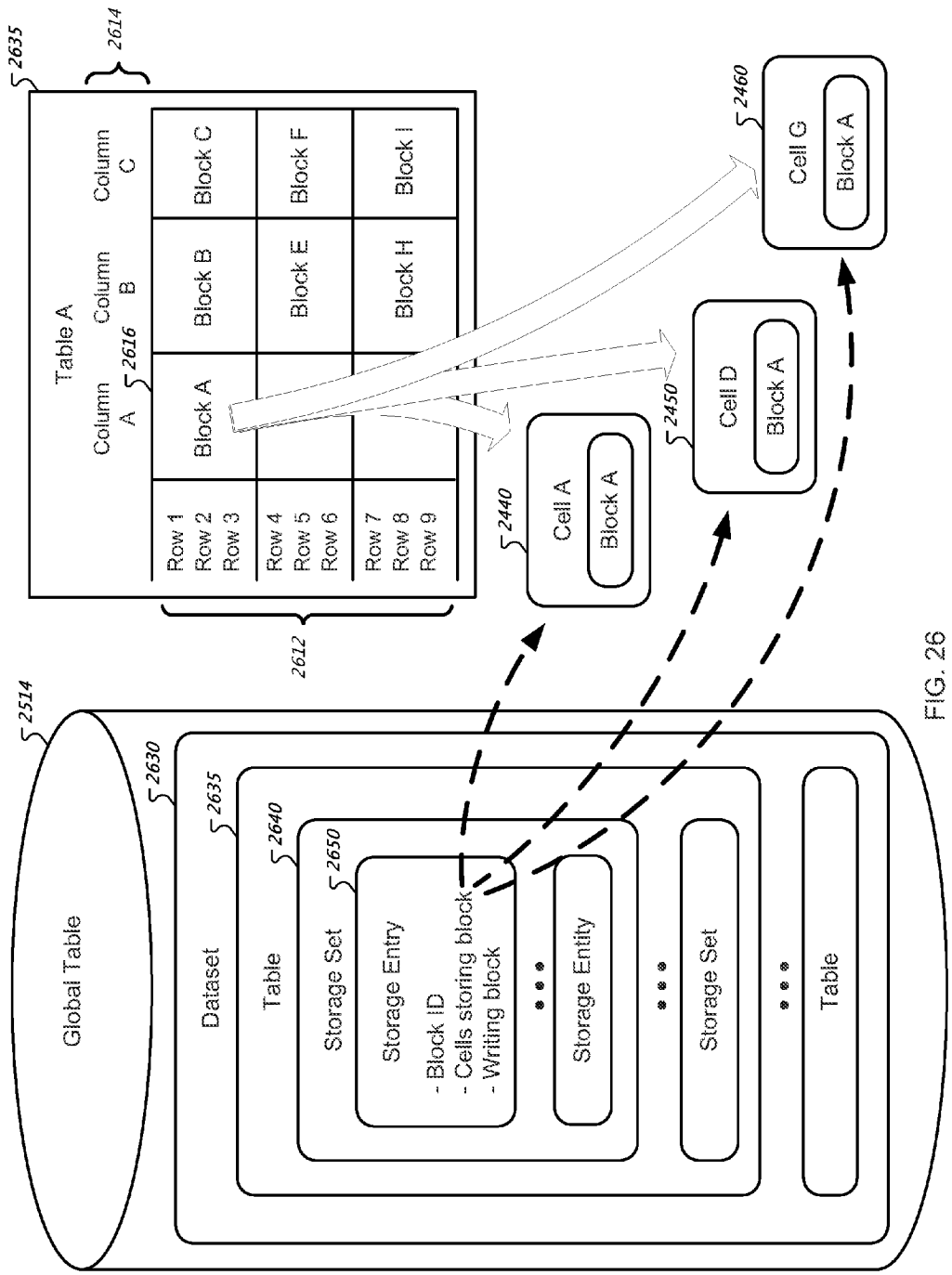
FIG. 26 shows a schematic diagram of an example of the components stored within the global table and how these components relate to a user-generated table.

FIG. 26 shows a schematic diagram of an example of the components stored within the global table and how these components relate to a user-generated table. User-generated table 2635 conceptually illustrates a table as the table may be understood and perceived, at least in part, by external users of the web service. The user-generated table 2635 represents tables described throughout this disclosure, for example, the tables described with reference to FIG. 21 and the table API 2134, the table management system 2118, and the table metadata storage 2120.

The user-generated table 2635 may be backed by columnar data. The user-generated table 2635 may be created by the data processing system in response to a method call received through an API. The method may be called in response to the external user providing user input for calling the method on a remote device, or may be called by an automated system that the external user had set up to access the data processing service through the external user's account.

User-generated table 2635 includes multiple rows 2612 and multiple columns 2614. For example, each row may represent a product that is sold by an online retailer and each column may represent a feature of the products (e.g., price, quantity available, and description). As described above, each column of data that backs the table may be segmented into blocks. The blocks for different columns may represent the same collections of rows. For example, the data in the table may be broken into subsets of the rows (e.g., rows 1-3, 4-6, and 7-9), but with multiple attributes for each subset of rows (e.g., each subset of rows includes data for columns A, B, and C). Each subset of rows may be separated into blocks that each represents data for a single attribute. Accordingly, each block can represent values for a subset of rows for a single attribute.

As described earlier, each block may be stored within a particular instance in a cohort as a logical file. As such, a block may be replicated among the multiple cells of a cohort that store that instance. FIG. 26 illustrates that Block A 2616 is stored by Cell A 2440, Cell D 2450, and Cell G 2460, as described in greater detail with respect to FIG. 25.

The global table 2514 stores data that identifies the nested structure of user data. The user data may be stored in the nested relationship Project:Dataset:Table:Storage_Set:Storage_Entity. Each level of the naming structure may provide a unique namespace. As an illustration, a customer may have one or more projects (not shown in FIG. 26). Each project can group many different datasets and provide a separate billing unit for each dataset. As such, different departments at a customer organization may use different projects so that the provider of the data processing service can bill the departments separately for data processing usage.

Each project can include one or more datasets. A dataset is a collection of tables to which an access control list can be attached. As such, an external user may group multiple tables under a dataset so that the user can provide other users access to the entire set of tables without having to grant the other users access to each table individually.

At least from the perspective of external users, data processing is performed on tables within each dataset (e.g., table 2635). As described later in this disclosure, users can create tables, add data to tables, and query tables. Each table includes multiple storage sets (e.g., storage set 2640). A storage set can be a container for multiple storage entries. A storage entry may be a representation in the global table 2514 of a block. For example, storage entry 2650 is a representation of Block A 2616. Each storage entry can include an identification of its respective block (e.g., a logical address of the block in the form Cohort:Instance:Shard:Block), an identification of each cell that is storing the block, and an identification of the cell that is designated as a writing cell for the block.

An example structure for a StorageSet follows:

```
CREATE TABLE StorageSet {
    required string datasetId;
    required string tableId;
    required string storageSetId;
    enum State {
        TENTATIVE = 1,
        COMMITTED = 2,
        GARBAGE = 3
    }
    required State state;
} PRIMARY KEY(datasetId, tableId, storageSetId) IN TABLE
ProcessingServiceTable,
ENTITY GROUP KEY (datasetId) REFERENCES
ProcessingServiceDatasets;
```

Example metadata for a StorageEntry follows:

```
CREATE TABLE StorageEntry {
    // All the keys in StorageSet.
    required string storageEntryId;
    enum StorageType {
        LOCAL_STORAGE_REPLICATED = 1,
        CACHED_BLOB = 2
        ...
    }
    required StorageType type;
    // Common storage labels.
```

-continued

```
    optional string cohort;
    optional string instance;
    // Type specific info.
    // LOCAL_STORAGE_REPLICATED
    optional string shard;
    repeated string relative_file
    optional string relative_pattern;
    // CACHED_GLOBALBLOB
    repeated message<BlobRef>blobref;
} PRIMARY KEY(datasetId, tableId, storageSetId,
} PRIMARY KEY(datasetId, tableId, storageSetId,
storageEntryId) IN TABLE StorageSet,
ENTITY GROUP KEY (datasetId) REFERENCES
ProcessingServiceDatasets;
```

Figure 27:
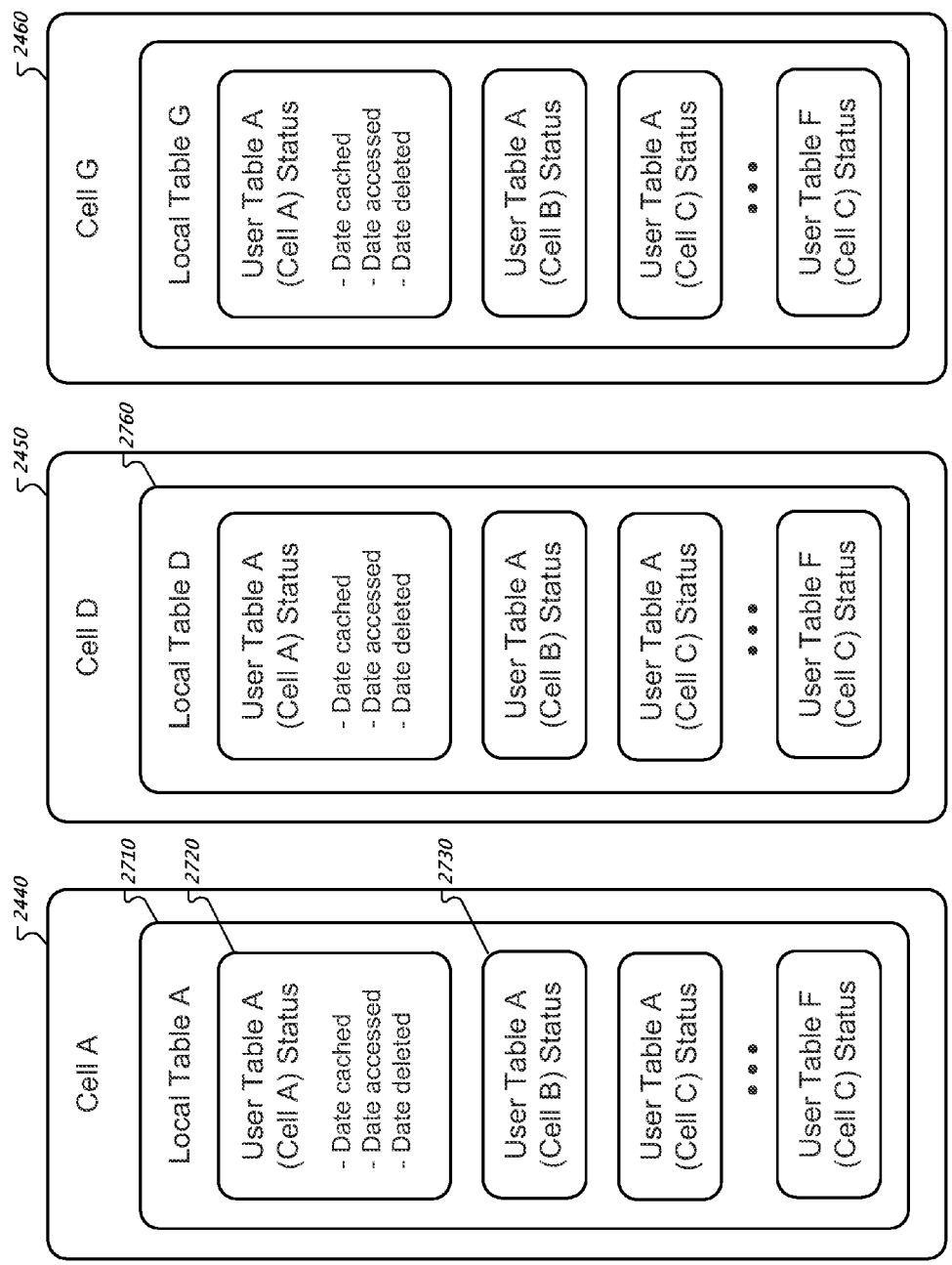
FIG. 27 is a schematic diagram showing examples of locally stored tables.

FIG. 27 is a schematic diagram showing examples of locally stored tables. Each such local table may be stored at a data center, or alternatively at a cell. In other words, each data center may have a single table, or each cell in the data center that is used for the data processing service may have its own table. Each local table can identify the state of data that is stored at the respective cell. Each local table can further identify the state of data that is stored at the other cells in the cohort.

As an illustration, local table A 2710 stores the cache state information (e.g., the cache state 2536) for cell A 2440. The cache state information may include status information for each table that is stored by the data cache of cell A 2440 (e.g., "User Table A (Cell A) Status" 2720 and "User Table B (Cell A) Status"). The cache state information may also include information for each table that is stored by the data cache of the other cells in the cohort (e.g., "User Table A (Cell D) Status" and "User Table B (Cell D) 2730").

The status information for each user table may include the date that the columnar blocks supporting the table were cached, a most-recent date that the columnar blocks supporting the table were accessed, and a date that the table was deleted. In some implementations, the data identifies the date cached, accessed, and deleted for individual blocks in a table. The status information may indicate whether each columnar block is up to date, for example, as a result of a determination whether the date that a particular block was cached is more recent than a date that the particular block was cached at the writing cell (assuming that such a determination is taking place for a cell that is not the writing cell). In some implementations, the system does not permit updating a block once created. Rather, in order to effectively update a block, the system may have to delete the existing block and add a new block that includes the updated data. In some implementations, the above-described information is stored by the global table 2514.

Figure 28:
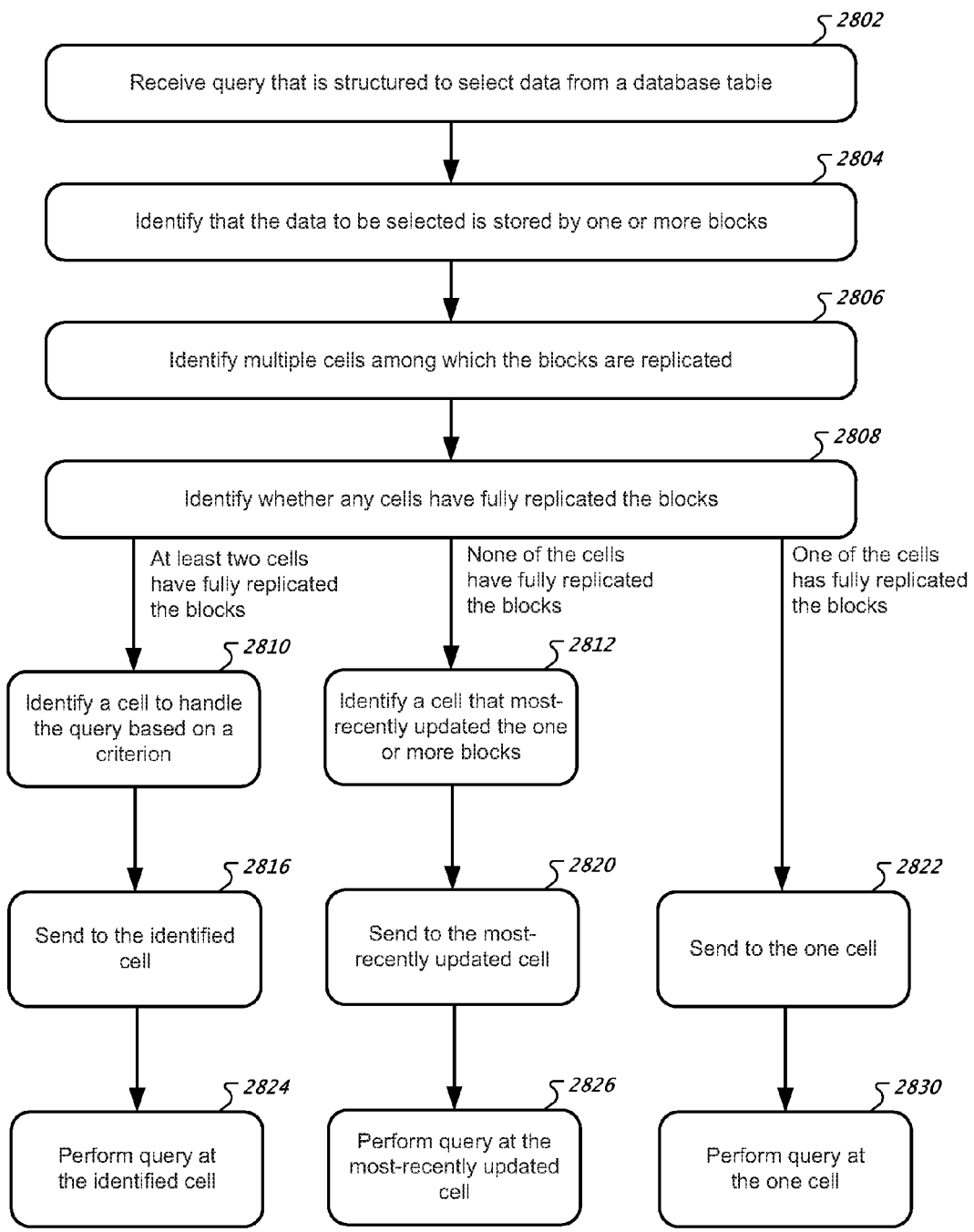
FIG. 28 is a flowchart showing an example of a process for reading data from a table with a query.

FIG. 28 is a flowchart showing an example of a process for reading data from a table with a query.

In box 2802, a computing system receives a query that is structured to select data from a database table. For example, the query may be received as part of an API call, as discussed in greater detail throughout this disclosure. The computing system may be a frontend computing system that receives the API calls. The computing system may include computing devices at a datacenter at which one or more of the cells that store the columnar data are physically located. The query may be a request to insert one or more data values into a database table.

In box 2804, the computing system identifies that the data that is to be selected from the database table is stored by one or more blocks. The computing system may identify an instance in which the one or more blocks are stored, for example, by obtaining from the global table a list of blocks that back a table identified by the query and identifying the instance that stores the blocks. For example, the computing system can access the global table 2514, identify the query-identified table from a list of tables, can identify a list of the storage entries that support the user-identified table, and can obtain a list of the blocks for each storage entry. The obtained list of blocks may include the logical address of each block (e.g., cohort:instance:shard:file) and/or the physical address of each block (e.g., cell:filename).

As discussed throughout this disclosure, the identified instance may be one of multiple partitions of data that comprise a cohort. The terms cohort and instance are not intended to limit the scope or type of data storage structure, and may alternatively be referred to within this disclosure as a logical collection of data (e.g., a cohort) and a logical partition of the logical collection of data (e.g., an instance).

In box 2806, the computing system identifies multiple cells among which the blocks are replicated. For example, the computing system may identify, in the storage entry for each of the blocks, the cells of computing devices at which each of the blocks are replicated. Because all blocks in a table may be replicated among the same cells, the computing system may only have to identify this information from one of the storage entries. Because the replication process may be structured so that each data center has a single cell that supports the replication process, this disclosure at times may refer to the replication on a data center-by-data center basis, rather than a cell-by-cell basis, even though the replication may be among cells of the data center rather than all computing devices that comprise the data center.

In box 2808, the computing system identifies whether any cells have fully replicated the one or more blocks. In other words, the computing system identifies whether any of the cells have copies of the one or more blocks in their most up-to-date form (e.g., so that no other cell more-recently stored a copy of any of the cells in a different form). In some examples, the storage entry for each block may include, for each cell that stores the corresponding block, a flag or other indication of whether the cell stores a copy of the block that is fully up-to-date.

In some examples, the computing system analyzes data stored by the storage entry for each block to determine which of the blocks may be fully up-to-date. For example, the computing system may compare a date cached timestamp for the copy of the block that is stored by the writing cell for that block to the date cached timestamps for each of the other cells that replicate the block. If a block at one of the other cells has a date cached timestamp that is more recent than the date cached timestamp for the copy of the block at the writing cell, then the computing system may indicate that such the block at the one of the other cells is up-to-date. If all of the one or more blocks for a cell are identified as being up-to-date, the computing system may indicate that the one or more blocks are fully replicated.

In some examples, the writing cell may not be identified as being fully up-to-date, for example, when the writing cell is being taken offline and replaced by another writing cell. Data may be transferred from the old writing cell to the new writing cell, and, during the transfer, updates to the instance that is assigned to the writing cell may be written to the new writing cell. Thus, neither of these cells may be fully up to date and an indication of such a status may be stored with reference to one or both of these cells.

Stated another way, in some examples, the computing system can access the metadata for each of the blocks in the list and determine whether each block is a most-recent version of the block. In some examples, the metadata for locally-stored blocks have flags that identify if the blocks are up to date. In some examples, the computing system can compare metadata for each locally-stored block. The creation date of each locally-stored block can be compared to the creation date that is stored in the global table.

In box 2810, in response to identifying that at least two cells have fully replicated the blocks, the computing system identifies a cell to handle the query based on a criterion. As a first example, the computing system may determine which of the at least two cells is geographically closest to an estimated geographical position of the remote computing device (e.g., as determined using an IP address of the remote computing device or a GPS determination by the remote computing device). In other words, if the blocks at a local data center are up to date, the computing system requests that that the query be performed on the table at the local data center.

As a second example, the computing system may determine which of the at least two cells is temporally closest to remote computing device based on a shortest trip time for a message transmitted between the remote computing device and each of the at least two cells. As an illustration, the remote computing device may PING each of the at least two cells, and the cell associated with the shortest PING may be selected as the cell to which the query is sent.

As a third example, the computing system may determine which of the at least two cells has been determined to have the most-available computing capacity. For instance, the computing system may implement a load balancing procedure to identify which of the cells is underutilized. The computing system may select the local cell by requesting that an external process identify, based on various metrics, a cell from a collection of cells. The metrics can include load balancing and estimated latency in providing the computing system of the external user with a response.

In box 2816, the computing system sends the query to the identified data center, and, in box 2824, a local copy of the querying system (e.g., querying subsystem 2532) executes the query on locally stored data (e.g., data cache 2534).

In box 2812, in response to identifying that none of the cells have fully replicated the blocks, the computing system identifies a cell that most-recently updated the blocks. As discussed, above, the computing system may determine that the storage entries for the blocks from which data is to be selected indicate that none of the cells are fully up-to-date. This may be the result, for example, when the blocks are stored by an instance, and the writing cell for that instance is being transitioned to another writing cell. In this case, some of the one or more blocks may be stored by the old writing cell and some of the one or more blocks may be stored by the new writing cell. In such a circumstance, the computing system may send the query to the cell that most-recently updated the one or more blocks. The computing system may determine such a cell by identifying which of the cells has a most recent date cached timestamp for any of the one or more blocks.

In another illustration, because data can take time to replicate among the cells in a cohort, querying the most-recent writing cell can ensure that the system is querying the most-recent version of the table. Stated another way, the cell that most-recently wrote to the table may be the writing cell for the instance that stores the table. The writing cell for such an instance may have the most up to date information for the table.

In box 2826, the most-recently updated cell may perform the query. Performing the query at the most-recently updated cell may include requesting that the most-recently updated cell copy any necessary blocks from the old writing cell so that the most-recently updated cell has a fully updated set of blocks. Performing the query at the most-recently updated cell may include requesting that the most-recently updated cell request partial performance of the query at the most-recently updated cell (on the blocks stored at the most-recently updated cell), and partial performance of the query at the old writing cell (on the blocks stored at the old writing cell).

In box 2822, in response to identifying that one of the cells has fully replicated the blocks, the computing system sends the query to the one cell. The one cell may then perform the query on locally-stored data.

The above description may refer to a read-only querying operation. A writing query operation may determine the cell that is assigned as the writing cell for the instance that includes the table data, and may request that the writing cell perform the query, as described with respect to FIGS. 30A-C.

The above description refers at times to data centers for illustrative purposes, but it should be understood that querying operations across geographically distributed data centers may use a single cell at each of the data centers. As such, the operations may be performed by a single cell at each of the described data centers. For example, the table data may be stored by a single cell at each of the data centers and the query may ultimately be executed by the querying subsystem at a single cell.

Figure 29:
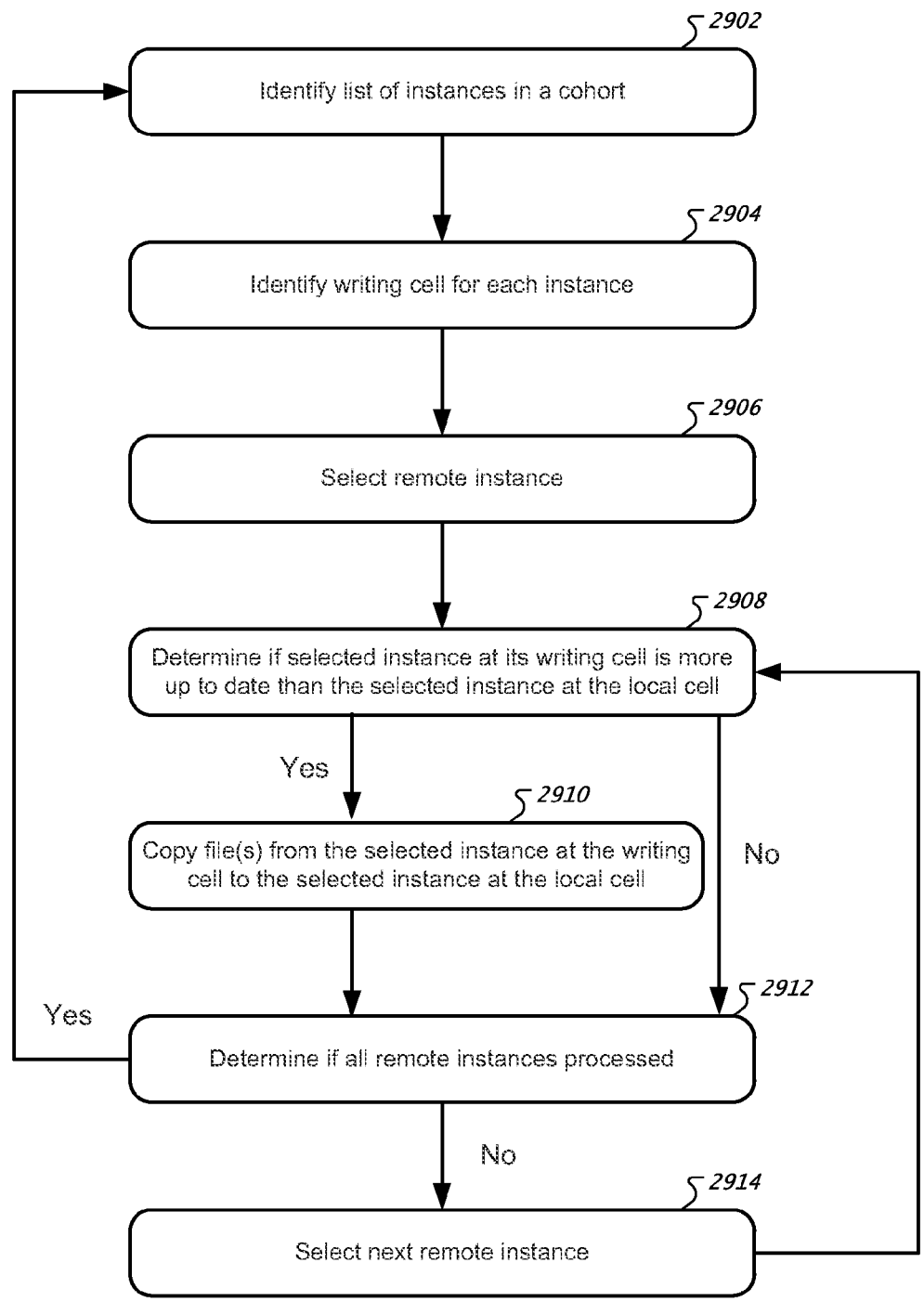
FIG. 29 is a flowchart showing an example of a process for inbound replication of data.

FIG. 29 is a flowchart showing an example of a process for inbound replication of data. The process of FIG. 29 may be performed by each of multiple cells identified in a cohort to ensure that that the data in the each of the cells remains up to date. At any given time, each of the instances in a cohort may be assigned to a cell. For example, in a cohort with three cells and four instances, all cells may store all four instances, while one of the cells is the writing cell to four instances and two of writing cells write to only a single instance. As such, it is possible that a cell is assigned as the writing cell to multiple instances or that a cell is not assigned as the writing cell to any instances.

As discussed above, each cell may include a local table that identifies the state of the data that is stored by all cells in a given cohort. This state information may replicate quickly among the cells, but the underlying data that backs the user-generated tables may not be able to replicate so quickly. As such, a single cell may handle the writing operations for its assigned instance. That cell, however, also may store multiple other instances for which it is not the writing cell. The replication process for these other instances is described below. This replication process may be handled by a cache manager (e.g., cache manager 2538).

In box 2902, the cache manager at a particular cell identifies a list of instances in a cohort to which the particular cell is assigned. In the example of FIG. 24, the cache manager of Cell A 2440 may identify that instances 2410, 2420, and 2430 are assigned to cohort 2400 and thus are stored by Cell A 2440.

In box 2904, the cache manager may identify a writing cell for each instance. In the example of FIG. 24, the cache manager of Cell A 2440 may identify that Cell A is the writing cell for instance 2410, that Cell D is the writing cell for instance 2420, and that cell G is the writing cell for instance 2430.

In box 2906, the cache manager may select a remote instance. In other words, the cache manager may select one of the instances for which the cell that includes the cache manager is not a writing cell. In the example of FIG. 25, the cache manager 2538 is executed by Cell A 2440 which is the writing cell for instance 2410. As such, the cache manager 2538 may select one of instances 2420 or 2430.

In box 2908, the cache manager determines if the selected instance, at its writing cell, is more up to date than the selected instance at the local cell. In the example of FIG. 25, the cache manager 2538 may determine if the instance 2420 that is stored at Cell D is more up to date than the instance 2420 that is stored at Cell A 2440. The cache manager 2538 may perform this determination by comparing the "date cached" identifier stored for each file in the local table of Cell D 2450 (e.g., Local Table D 2760) to the "date cached" identifier stored for each file in the local table of Cell A 2440 (e.g., Local Table A 2710).

Because Cell D 2450 may be the only writing cell for instance 2420, if the time cached between the two files is different and the most-recent time is for the writing cell, the cache manager 2538 can determine that instance 2420 in Cell A may have to be updated with the information from Cell D 2450. If the writing cell for the selected instance is more up to date than the local instance, the operations of box 2910 are performed.

In box 2910, the cache manager copies one or more files from the selected instance at the writing cell to the selected instance at the local cell. As an example, each file that has a newer "date cached" identifier at the writing cell may be copied to the local cell. In some implementations, the system may not update files, but may delete old files and upload new files that include the updated information in order to update information. In such an example, the local cell may delete files that are no longer stored at the writing cell and may add files that were newly added to the writing cell.

If the cache manager does not determine that the selected instance at the writing cell is more up to date than the selected instance at the local cell, then the operations of box 2912 are performed.

In box 2912, the cache manager determines if all remote instances have been processed. If not, the cache manager selects (in box 2914) the next remote instance from the identified list of instances and performs the operations of box 2908. If all remote instances have been processed, the cache manager repeats the process by performing the operations of box 2902.

Figure 30B:
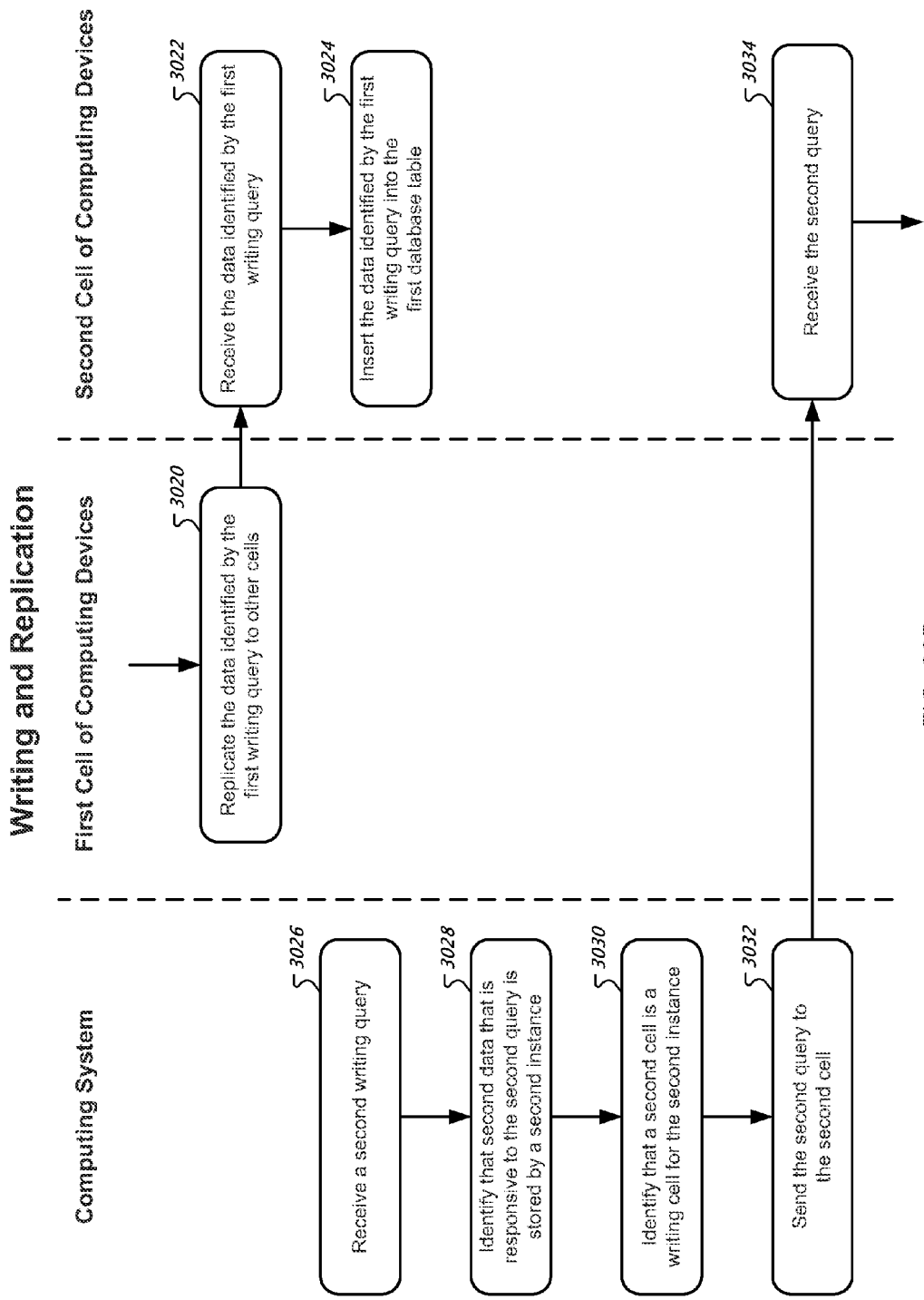
Figure 30C:
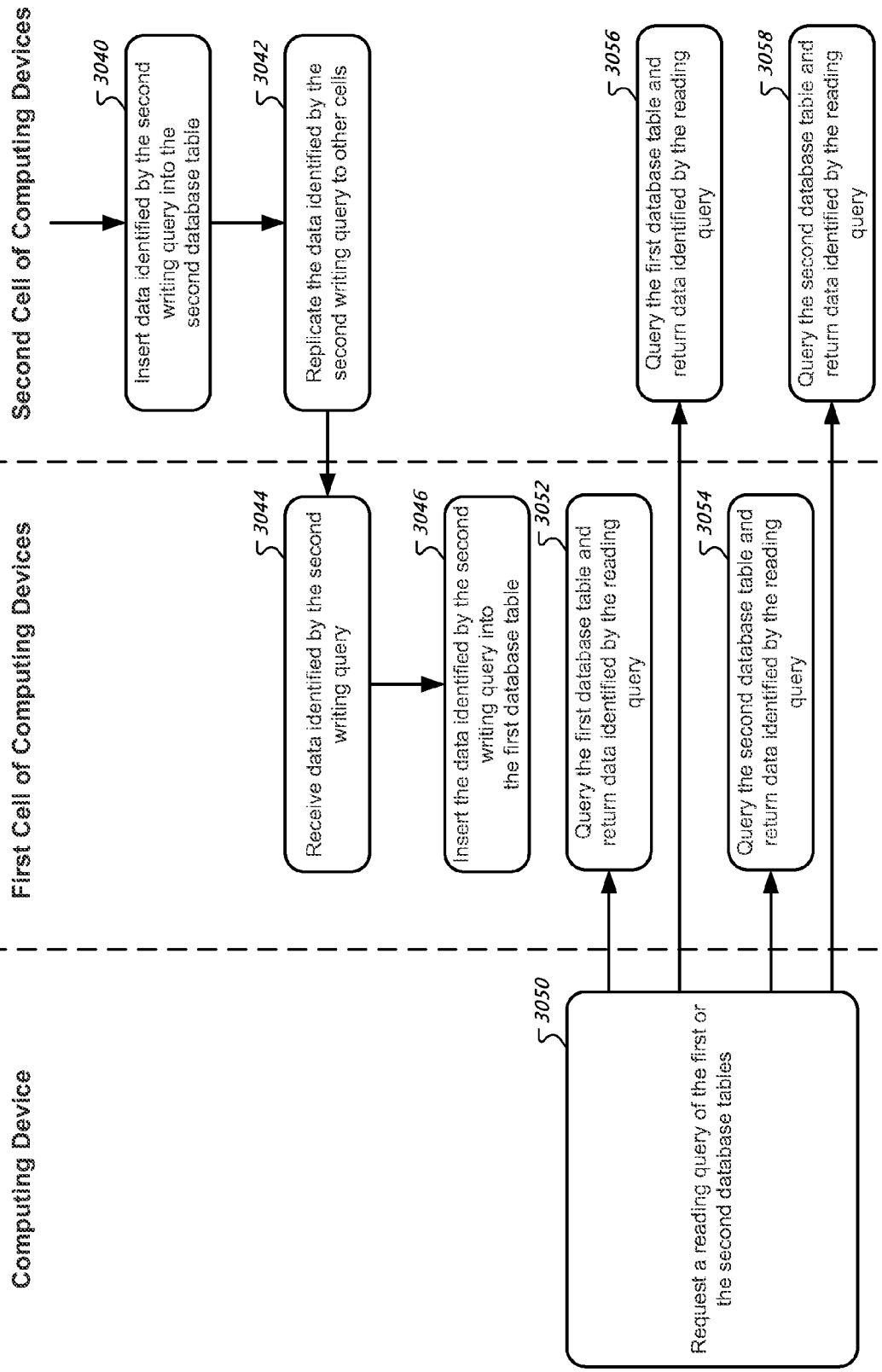

FIGS. 30A-C show a swim-lane diagram illustrating an example of a process for writing and replicating data.

In box 3002, a computing system receives a first writing query. For example, the computing may receive from a remote computing device, a first request to insert one or more first data values into a first database table. As an illustration, the frontend server 2126 (FIG. 21) may receive a query through the query API 2124 as having been sent from a remote computing device of a third-party organization. The receipt of the query "from" the remote computing device may indicate that the query was received as having been sent from the remote computing device. The query may be transmitted through intervening computing systems.

In box 3004, the computing system identifies that data that is responsive to the first query is stored by a first instance. For example, the frontend server 2126 may analyze the query to identify a database table to which the query is structured to write. The frontend server 2126 may access the global table 2514 to retrieve information that indicates an instance in which the table is stored.

In box 3006, the computing system identifies that a first cell is a writing cell for the first instance. For example, the frontend server 2126 may access the global table 2514 in order to identify which of the multiple cells, among which the instance is replicated, serves as the writing cell for the instance. As described throughout this document a logical collection of data (referred to herein as a cohort) may be replicated among multiple cells, but the writing responsibilities for portions of the logical collection of data may be divided among the multiple cells. For example, one cell may initially write to a first partition of the logical collection of data (referred to herein as an instance) and another cell may initially write to a second partition of the logical collection of data.

The computing system may dispatch all queries that the computing system receives during a time period (e.g., 1 hour or 1 day), and that are structured to write to the first instance, to the cell that is assigned to write to the first instance. The system may not dispatch such queries to any other of the cells and any other of the cells may not be designated to write to the first instance during the time period. At least fifty queries, and maybe hundreds or thousands of queries, that are structured to write to the first instance may be received during the timer period from a variety of remote computing devices.

In box 3008, the computing system sends the query to the writing cell. For example, the computing system may send the first request to insert the one or more first data values into the first database table for receipt by computing devices at a particular data center that are assigned to the first cell. The sending of the query or the first request may include sending a query or first request that has changed in form, but that includes instructions that are similar or identical to the original query or the first request that was received from the remote computing device. The sending of the query "to" the writing cell may indicate that the query was sent for receipt by the writing cell. The query may be transmitted through intervening computing systems.

In box 3010, the first cell of computing devices receives the first query. For example, the first datacenter may receive, from the computing system, the first query or the first request.

In box 3012, the first cell of computing devices inserts the data identified by the first writing query into the first database table. For example, the first cell may insert the one or more first data values into a copy of the first database table that is stored by the first data center. As an illustration, multiple computing devices included in the first cell may generate new blocks of columnar data that add to the old blocks of columnar data the values identified by the query. The multiple computing devices included in the first cell may replace old blocks of columnar data with the newly-generated blocks of columnar data. The data values identified by the query may be included in the query or may be included in another database table that was identified by the query, for example.

In box 3020, the first cell of computing devices replicates data identified by the first writing query to other cells. For example, the cache manager at the cell (e.g., cache manager 2538) may send the updated one or more blocks of columnar data for receipt by each of the other cells among which the blocks of columnar data are replicated. In another example, the first cell sends the query for receipt by each of the other cells, and each of the other cells executes the query.

In box 3022, a second cell of computing devices receives the data identified by the first writing query. For example, the second cell may receive the updated one or more blocks of columnar data, or may receive the query.

In box 3024, the second cell of computing devices inserts the data identified by the first writing query into the first database table. For example, the second cell of computing devices may insert the one or more first data values into a copy of the first database table that is stored by the second data center. The second cell of computing devices may do this by replacing certain blocks of columnar data with the updated blocks of columnar data that the second cell received from the first cell. In such an example, the second cell of computing devices does not generate the updated blocks of columnar data and instead just receives such updated blocks of columnar data from the first cell. Alternatively, the second cell may execute the query that the second cell received from the first cell, and insert values identified by the query into the copy of the first database table that is stored by the second cell.

Boxes 3026 through 3044 illustrate a process of receiving a second writing query and writing data initially to the second cell of computing devices, whereby the second cell of computing devices replicates the data to the first cell of computing devices. The operations of boxes 3026 through 3044 are similar to those of boxes 3002 through 3024, except that the second writing query is structured to write to a second instance that is assigned the second cell as a writing cell. Boxes 3026-3044 have been included in the diagram of FIGS. 30A-C to illustrate that different queries are dispatched to different cells of computing devices based on the logical storage location of the data to which the queries are structured to write.

Although queries are dispatched to specific cells for initial writings of the data to the database tables, each of the data centers may eventually end up with an up-to-date set of data, such that all cells among which an instance and its parent cohort are replicated may eventually store the same versions of one or more blocks of data.

Moreover, each of the cells among which the data is replicated may be capable of executing reading queries on the data. This is process is illustrated by boxes 3050 through 3058, which illustrate that a remote computing device's submission of a query that is structured to write to either a first database table or a second database table may be received by either the first cell or the second cell, and the local querying subsystem (e.g., querying subsystem 2532) may execute the query. The cell that executes a reading query may be selected as described by FIG. 28.

In some implementations, all data that is stored by the first database table is stored within the first instance, and all data that is stored by the second database table is stored within the second instance. For example, all columnar data blocks that back a table may be stored within a same instance. Blocks that back a same table may not be split between different instances, in some implementations.

In some implementations the first cell is designated as an only cell of the multiple cells to write to a first instance of data concurrently as a second cell is designated as an only cell of the multiple cells to write to a second instance of data. For example, during a same time period, all queries that write to the first instance may be designated for routing to the first cell and all queries that write to the second instance may be designated for routing to the second cell.

The following portion of the disclosure describes some examples of data structures that may be stored in the global table and examples of API method calls that the web service data processing system may support (and therefore receive).

Dataset Resource

A dataset can contain zero or more tables. There may not be an identified limit to the number of tables or the total data size of a dataset. Dataset access control lists (ACLs) can apply to datasets, tables, and table data. Jobs may be dependent on a mix of dataset and project ACLs. The project owner may have delete rights to any dataset within the project, but may not be guaranteed any other rights to any dataset in that project.

The following illustrates an example data structure in JSON for a dataset.

```
{
    "kind": "processingservice#dataset",
    "id": string,
    "selfLink": string,
    "projectId": string,
    "datasetId": string,
    "friendlyName":string,
    "description": string,
    "access": [
        {
            "role": string,
            "userByEmail": string,
            "groupByEmail": string,
            "domain": string,
            "allAuthenticatedUsers": boolean
        }
    ],
    "creationTime": long,
    "lastModifiedTime": long
}
```

The following illustrates the property names for the dataset structure, a type of the value for the property, whether the property is mutable, and a description of the property.

The property "kind" can have a value "processingservice#dataset" and may not be mutable. This property can be the resource type.

The property "id" can have a value "string" and may not be mutable. The fully-qualified unique name of this dataset may be in the format projectId:datasetId. The dataset name without the project name may be given in the datasetId field. When creating a new dataset, one may leave this field blank, and instead specify the datasetId field.

The property "selfLink" can have a value "string" and may not be mutable. It may reference a URL that can be used to access this resource again. This URL can be used in Get or Update requests to this resource.

The property "project ID can have a value "string" and may be mutable on creation. The property can be the ID of the container project. The default may be the current project.

The property "datasetId" can have a value "string" and may be mutable on creation. The property can be a unique ID for this dataset, without the project name. This may be an optional field. If this is not specified when a dataset is created, an ID may be assigned for the dataset. The dataset ID may be unique within the project. The dataset ID may be a string of 1-1024 characters satisfying the regular expression [A-Za-z0-9_]

The property "friendlyName" can have a value "string" and may be mutable, but requires owner rights. This property can be an optional descriptive name for this dataset, which may be shown in any data processing service user interfaces for browsing the dataset. The property datasetId, however, may be used for making API calls. The default is an empty string.

The property "description" can have a value "string" and may be mutable, but requires owner rights. This property can be an optional arbitrary string description for the dataset. This might be shown in the data processing service user interface for browsing the dataset. The default is an empty string.

The property "access" can have a value "list" and may be mutable, but requires owner rights. This property can be optional and may describe users' rights on the dataset. The same role can be assigned to multiple users, and multiple roles can be assigned to the same user. Default values assigned to a new dataset may be as follows: OWNER—Project owners, dataset creator; READ—Project readers; and WRITE—Project writers. If any of these roles are specified when creating a dataset, the assigned roles may overwrite the defaults listed above. To revoke rights to a dataset, a user can call datasets.update( ) and omit the names of anyone whose rights should be revoked. However, every dataset may have at least one entity granted OWNER role. Each access object may have only one of the following members: userByEmail, groupByEmail, domain, or allAuthenticatedUsers.

The property "access.role" can have a value "string" and may be mutable, but requires owner rights. This property describes the rights granted to the user specified by the other member of the access object. The following string values are supported: READ—User can call any list( ) or get( ) method on any collection or resource. WRITE—User can call any method on any collection except for datasets, on which they can call list( ) and get( ). OWNER—User can call any method. The dataset creator is granted this role by default.

The property "access.userByEmail" can have a value "string" and may be mutable, but requires owner rights. This property describes a fully qualified email address of a user to grant access to. For example: fred@example.com.

The property name "access.groupByEmail" can have a value "string" and may be mutable, but requires owner rights. This property describes a fully-qualified email address of a mailing list to grant access to.

The property "access.domain" can have a value "string" and may be mutable, but requires owner rights. This property describes a domain to grant access to. Any users signed in with the domain specified may be granted the specified access. Example: "example.com".

The property "access.allAuthenticatedUsers" can have a value "boolean" and may be mutable, but requires owner rights. If True, any authenticated user may be granted the assigned role. The default is False. Be aware that all users everywhere may be granted the access.role right to all tables in a database with this ACL.

The property "creationTime" can have a value "long" and may not be mutable. This property describes the date when this dataset was created, in milliseconds since the epoch.

The property "last ModifiedTime" can have a value "long" and may not be mutable. This property describes the date when this dataset or any of its tables was last modified, in milliseconds since the epoch.

processingservice.datasets.list

This method can list all the datasets in the specified project to which the caller has read access; however, a project owner can list (but not necessarily get) all datasets in his project.

Required ACLs: To call this method, the user may have to have one of the following rights: project.READ/WRITE/OWNER may enable the user to list all datasets in the project. dataset.access.READ/WRITE/OWNER may return any datasets that the user has explicit access to.

REST Request: GET https://www.companyapis.com/processingservice/v2beta1/projects/{projectId}/datasets[?pageToken={page_token}]&[maxResults={max_results}]

The parameter "pageToken" can have the type "integer." A page token can be used when requesting a specific page in a set of paged results.

The parameter "maxResults" can have the type "integer." This parameter can be the maximum number of rows to return. If not specified, it may return up to the maximum amount of data that may fit in a reply.

Response:

```
{
    "kind": "processingservice#datasetList",
    "etag": string,
    "nextPageToken": string,
    "datasets": [
        {
            "id": string,
            "projectId": string,
            "datasetId": string,
            "friendlyName": string
        }
    ]
}
```

The following illustrates the property names for the dataset structure, a type of the value for the property, and a description of the property.

The property "kind" can have the value "processingservice#datasetList." The property can be the resource type.

The property "etag" can have the value "string." The property can be a hash of the page of results.

The property "nextPageToken" can have the value "string." The property can be a token to request the next page of results. It may be present only when there is more than one page of results.

The property "datasets" can have the value "list." The property can be an array of one or more summarized dataset resources. The property may be absent when there are no datasets in the specified project.

The property "datasets.id" can have the value "string." The property can be the fully-qualified unique name of this dataset in the format projectId:datasetId.

The property "datasets.projectId" can have the value "string." The property can be the ID of the container project.

The property "datasets.datasetId" can have the value "string." The property can be the unique ID for this dataset. This can be the ID value without the project name.

The property "datasets.friendlyName" can have the value "string." The property can be a descriptive name for this dataset.

processingservice.datasets.get

This method can return the dataset specified by datasetID. The user may specify the unqualified datasetId value and not the fully-qualified id value of the dataset.

Required ACLs: To call this method, the user must have one of the following rights dataset.access.READ; dataset.access.OWNER; project.READ; project.OWNER.

REST Request: GET https://www.companyapis.com/processingservice/v2beta1/projects/{projectId}/datasets/{datasetId}

Response: The response returns a dataset resource or an error message. If the requested dataset does not exist, it returns an HTTP 404 error.

processingservice.datasets.insert

This method may create a new empty dataset.

Required ACLs: To call this method, the user may have one of the following rights: Write or Owner rights on the containing project.

REST Request: POST https://www.companyapis.com/processingservice/v2beta1/projects/{projectId}/datasets The request passes in an object with the following members (see the dataset resource for further detail:

```
{
    "projectId": string, // Required
    "datasetId": string, // Required
    "friendlyName":string, // Optional
    "description": string, // Optional
    "access": [ // Optional
        {
            "role": string, // Required. One of the following four also
                required.
            "userByEmail": string,
            "groupByEmail": string,
            "domain": string,
            "allAuthenticatedUsers": boolean
        }
    ]
}
```

Response: The response may return a copy of the new dataset resource if successful, or an error message if not successful.

processingservice.datasets.update

This method can update information in an existing dataset, specified by datasetId. Properties not included in the submitted resource may not be changed. If a user includes a member without a value, it may be reset to null. Note that if a user includes the access property without any values assigned, the request may fail as the user may have to specify at least one owner for a dataset.

WRITE access on the dataset to may be required to modify any member except access. OWNER access on the dataset may be required to modify the access member. The specified access list may completely overwrite the existing access list. If a user specifies an empty access list, access may be revoked to everyone except the user; the user cannot remove all owners from a dataset.

Required ACLs: To call this method, the user may have to have the following rights: dataset.access.OWNER.

REST REQUEST: PUT https://www.companyapis.com/processingservice/v2beta1/projects/{projectId}/datasets/{datasetId}

Request data: The user can pass in the following data object with any values that the user wishes to modify. The user can omit any properties that the user wishes do not wish to change.

```
{
    "friendlyName":string, // Optional
    "description": string, // Optional
    "access": [ // Optional
        {
            "role": string, // Required. One of the following four also
                required.
            "userByEmail": string,
            "groupByEmail": string,
            "domain": string,
            "allAuthenticatedUsers": boolean
        }
    ]
}
```

Response: Returns a copy of the updated dataset resource if successful, or an error message if not.

processingservice.datasets.delete

This method deletes the dataset specified by datasetId value. Before a user can delete a dataset, the user may have to delete all its tables, either manually or by specifying delete- Contents. Immediately after deletion, the user can create another dataset with the same name.

Required ACLs: To call this method, the user must have one of the following rights: dataset.access.OWNER; project.OWNER.

REST Request: DELETE https://www.companyapis.com/processingservice/v2beta1/projects/{projectId}/datasets/{datasetId}[?deleteContents={delete_contents}]

The parameter "deleteContents" can have the type "Boolean." The parameter is optional and, if true, deletes all the tables in the dataset. If False and the dataset contains tables, the request may fail. The default is False.

Response: The method returns an HTTP 202 (not found) response if successful, or an error message.

Job Resource

A job is an operation performed at the request of a user on a dataset. Jobs include SQL queries, table import requests, and table export requests, for example. The resource contains a different configuration member depending on what kind of job this is. The JSON data structure for a job follows:

```
{
"kind": "processingservice#job",
"id": string,
"selfLink": string,
"projectId": string,
"jobId": string,
"configuration": {
    "query": { // Run query, or
        "query": string,
        "destinationTable": {
            "projectId": string,
            "datasetId": string,
            "tableId": string
        },
        "createDisposition": string,
        "writeDisposition": string,
        "defaultDataset": {
            "datasetId": string,
            "projectId": string
        }
    },
    "load": { // Import data into a table
        "sourceUris": [
            string,
            ...
        ],
        "schema": {
            "fields": [
                {
                    "name": string,
                    "type": string,
                    "mode": string,
                    "fields": [
                        { ... optional nested "schema" objects ... }
                    ]
                }
            ]
        },
        "destinationTable": {
            "projectId": string,
            "datasetId": string,
            "tableId": string
        },
        "createDisposition": string,
        "writeDisposition": string
    },
    "extract": { // Export to Company Storage
        "sourceTable": {
            "projectId": string,
            "datasetId": string,
            "tableId": string
        },
        "destinationUri": string
    }
},
```

```
"status": {
    "state": string,
    "errorResult": {
        "domain": string,
        "code": string,
        "errorMessage": string
    },
    "errors": [
        {
            "domain": string,
            "code": string,
            "errorMessage": string
        }
    ]
},
"statistics": {
    "startTime": long,
    "endTime": long
}
}
```

The property "kind" can have a value "processingservice#job" and may not be mutable. The property can be the resource type.

The property "id" can have a value "string" and may not be mutable. The property can be the fully-qualified job name, in the format projectId:jobId. When creating a new job, the user may not specify this value, and may instead specify the jobId field. The unqualified job ID can be retrieved from the jobId field.

The property "selfLink" can have a value "string" and may not be mutable. The property can be an URL that can be used to access this resource again. The user can use this URL in get( ) requests for this resource.

The property "projectId" may have a value "string" and may not be mutable. The property is the ID of the project that contains this job. This is the project that may be billed for the job.

The property "jobId" may have a value "object" and may be mutable at creation. The property may reference a unique ID for this job within the project. This value may be optional when the user creates a new job. If the user does not specify a value here, a random ID may be chosen. The property may have to be a string of 1-1024 characters satisfying the regular expression [A-Za-z0-9\-].

The property "configuration" may have a value "object" and may be mutable at creation. The property may reference an object that specifies the details of this job. When inserting a new job, the user may include only one of the following child objects, depending on what type of job it is. load—Create and populate a new table from a CSV file. query—Run a query. extract—Export a Processingservice table to Company Storage as a CSV file.

The property "configuration.query" may have a value "object" and may be mutable at creation. The property can be an object that must be present only when sending a query. If the query returns one or more result rows, results may be stored in the table specified by the destination Table property.

The property "configuration.query.query" may have a value "string" and may be mutable at creation. The property can be a query string, following the Processingservice query syntax of the query to execute. Table names may have to be qualified by dataset name in the format projectId:datasetId.tableId unless the user specifies the defaultDataset value. If the table is in the same project as the job, the user can omit the project ID. Example: SELECT f1 FROM myprojectId:myDatasetId.myTableId.

The property "configuration.query.destinationTable" may have a value "object" and may be mutable at creation. The property can be an optional object describing a destination table where results may be saved. The user may specify whether to create a new or overwrite an existing table by specifying createDispensation and writeDispensation.

The property "configuration.query.destinationTable.projectId" may have a value "string" and may be mutable at creation. The property can be the project ID of the dataset where the table should be created.

The property "configuration.query.destinationTable.datasetId" may have a value "string" and may be mutable at creation. The property can be the datasetId of the dataset in which to create the result table. This may not be qualified by the project ID. The user may have to have write access on this dataset. If the specified dataset does not exist, the method may return an error.

The property "configuration.query.destinationTable.tableId" may have a value "string" and may be mutable at creation. The property may reference the tableId of the table to hold the results. This can be an existing table or not, depending on the query.createDisposition value.

The property "configuration.query.createDisposition" may have a value "string" and may be mutable at creation. This property may be optional and can be whether to create a results table if no table by that ID already exists. The following string values may be supported: CREATE_NEVER—[Default] Do not create a new table to hold results. CREATE_IF_NEEDED—Create a new table if one does not exist and the query result set has more than zero records.

The property "configuration.query.writeDisposition" may have a value "string" and may be mutable at creation. The property may be optional and may reference whether or not to overwrite an existing results table with the specified name. The following string values are supported: WRITE_EMPTY—[Default] Only write to a table with no data, otherwise fail. WRITE_TRUNCATE—Clear the data from the existing table and append the output data. The table schema must match the schema of the new data. WRITE_APPEND—Append the new data to any existing data. The table schema may have to match the schema of the new data.

The property "configuration.query.defaultDataset" may have a value "object" and may be mutable at creation. The property may specify the default datasetId and projectId to assume for any unqualified table names in the query. If not set, all table names in the query string may be fully-qualified in the format projectId:datasetId.tableid. The user may have to specify either both datasetId and projectId, or neither (omit this object).

The property "configuration.query.defaultDataset.datasetId" may have a value "string" and may be mutable at creation. The property may reference the assumed dataset ID of any tables that are not qualified by dataset.

The property "configuration.query.defaultDataset.projectId" may have a value "string" and may be mutable at creation. The property may reference the assumed project ID of any tables not qualified by project.

The property "configuration.load" may have a value "object" and may be mutable at creation. The property may reference an object that must be present only when importing data into a new or existing table from a CSV data file.

The property "configuration.load.sourceUris" may have a value "list" and may be mutable at creation. The property may reference a list of one or more Company Storage objects containing table data. The device for the user calling jobs.insert may have to have read access to all objects referenced. All objects may have to be CSV files in the proper format, with the same table schema. These may have to be be fully-qualified names, for example: gs://mybucket/myobject.csv The property "configuration.load.schema" may have a value "object" and may be mutable at creation. The property may reference a schema descriptor that describes all imported tables. All tables may follow the schema described in this object.

The property "configuration.load.schema.fields" may have a value "list" and may be mutable at creation. The property may reference a list of one or more objects, each describing a column in the imported table(s) schema. These values may be applied to the table created, if a new table is created rather than appended to.

The property "configuration.load.schema.fields.name" may have a value "string" and may be mutable at creation. The property may reference a friendly name for this column. This name may be assigned to the column in the newly created table.

The property "configuration.load.schema.fields.type" may have a value "string" and may be mutable at creation. The property may reference the field type.

The property "configuration.load.schema.fields.mode" may have a value "string" and may be mutable at creation. The property may reference the field mode.

The property "configuration.load.schema.fields.fields" may have a value "list of schema objects" and may be mutable at creation. The property may be present only in a column that holds nested fields. This object may describe any nested fields.

The property "configuration.load.destinationTable" may have a value "object" and may be mutable at creation. This object may be the tableID of the destination table to hold the query results, if more than zero result rows are returned. The user may specify whether to create a new table or overwrite or append to an existing one by setting createDispostion and writeDispostion.

The property "configuration.load.destinationTable.projectId" may have a value "string" and may be mutable at creation. The property may reference the assumed project ID of any tables not qualified by project. Optionally, the property may reference the ID of the project that contains the dataset to write the result table to. If not specified, the system may write to the project containing the job.

The property "configuration.load.destinationTable.datasetId" may have a value "string" and may be mutable at creation. The property may reference the unqualified ID of the dataset to write the result table to. The user may have to have write access in this dataset.

The property "configuration.load.destinationTable.tableId" may have a value "string" and may be mutable at creation. The property may reference the unqualified table ID of the table to create or append to. The table may have to already exist unless configuration.load.createDisposition=CREATE_IF_NEEDED.

The property "configuration.load.createDisposition" may have a value "string" and may be mutable at creation. The property may reference whether or not to create a new table, if none exists. The following string values may be supported: CREATE_NEVER [Default]—Do not create a new table. CREATE_IF_NEEDED—If a table does not exist, create one.

The property "configuration.load.writeDisposition" may have a value "string" and may be mutable at creation. The property may reference whether or not to overwrite an existing table. The following string values may be supported: WRITE_EMPTY—[Default] Only write to a table with no data, otherwise fail. WRITE_TRUNCATE—If a table exists, replace existing data with new data. WRITE_APPEND—If a table exists, append new data to the end.

The property "configuration.extract" may have a value "object" and may be mutable at creation. The property may reference an object that may be present only when exporting a table to Company storage.

The property "configuration.extract.sourceTable" may have a value "object" and may be mutable at creation. The property may reference an object describing the Processingservice table to be exported.

The property "configuration.extract.sourceTable.projectId" may have a value "string" and may be mutable at creation. The property may reference the ID of the project containing the source table.

The property "configuration.extract.sourceTable.datasetId" may have a value "string" and may be mutable at creation. The property may reference the datasetId of the dataset containing the source table. The user must have read access on this dataset.

The property "configuration.extract.sourceTable.tableId" may have a value "string" and may be mutable at creation. The property may reference the tableId of the table to export, in the specified dataset.

The property "configuration.extract.destinationUri" may have a value "string" and may be mutable at creation. The property may reference the fully-qualified Company Storage URI of the object where the user has requested that the table is saved. This is in the format bucket/object with the gs:// prefix. The user may have write access on this bucket. Example: gs://mybucket/myobject.

The property "status" may have a value "object" and may be mutable at creation. The property may reference the status of this job. The user can examine this value when polling an asynchronous job to see if the job is complete.

The property "status.state" may have a value "string" and may be mutable at creation. The property may reference the current state of this job. The property supports the following string values: PENDING—Queued. RUNNING—Running. DONE—Completed, either successfully or not. If unsuccessful, the errorResult field should contain additional information.

The property "status.errorResult" may have a value "object" and may not be mutable at creation. The property may reference an object that may only be present if the job has failed.

The property "status.errorResult.domain" may have a value "string" and may not be mutable at creation. The property may reference a scoping mechanism that, when combined with status.errors.reason, defines a unique string.

The property "status.errorResult.code" may have a value "string" and may not be mutable at creation. The property may reference a Processingservice error code appropriate for this error.

The property "status.errorResult.errorMessage" may have a value "string" and may not be mutable at creation. The property may reference a user-friendly description of the error. Status.errors.code may be used to trap specific errors.

The property "status.errors" may have a value "list" and may not be mutable at creation. The property may reference a list of non-fatal errors that occurred during job processing. It is possible that a job can complete successfully even if there are some errors. In import or export requests, it is possible that some rows were unable to be imported or exported due to errors.

The property "status.errors.domain" may have a value "string" and may not be mutable at creation. A scoping mechanism that, when combined with status.errors.reason, defines a unique string.

The property "status.errors.code" may have a value "string" and may not be mutable at creation. The property may reference a Processingservice error code appropriate for this error.

The property "status.errors.debug Info" may have a value "string" and may not be mutable at creation. The property may reference additional information about the error.

The property "status.errors.errorMessage" may have a value "string" and may not be mutable at creation. The property may reference a user-friendly description of the error. Use status.errors.code to trap specific errors.

The property "statistics" may have a value "object" and may not be mutable at creation. The property may reference information about this job.

The property "statistics.startTime" may have a value "long" and may not be mutable at creation. The property may reference the start time of this job, in milliseconds since the epoch. This starts ticking when the job status changes to RUNNING, not when the request is sent by the user or received by Processingservice.

The property "statistics.endTime" may have a value "long" and may not be mutable at creation. This may be end time of the job, in milliseconds since the epoch. This may be when the status changed to DONE, successfully or not. If the job has not finished, this member may not be present.

processingservice.jobs.list

This method may list all the Jobs in the current project that the user has READ access to. Jobs may be retained indefinitely unless the user calls processingservice.jobs.delete on a job. Authentication may be required. To call the method, a user may need to have one of the following rights: project.READ; Users who create a specific job can list that job.

REST Request: GET https://www.companyapis.com/processingservice/v2beta1/projects/{projectId}/jobs[?pageToken={page_token}]&[maxResults={max_results}]

The parameter "page Token" can have a type of "Integer." The parameter is optional and may reference a page token used when requesting a specif page in a set of paged results.

The parameter "maxResults" can have a type of "Integer." The parameter is optional and may reference the maximum number of rows to return. If not specified, the method may return up to the maximum amount of data that may fit in a reply.

The structure of the response follows:

```
{
    "kind": "processingservice#jobList",
    "etag": string,
    "nextPageToken": string,
    "jobs": [
        {
            "id": string,
            "projectId": string,
            "jobId": string,
            "state": string,
            "startTime": long,
            "endTime": long
        }, . . . additional jobs . . .
    ]
}
```

The property "kind" can have a value "processingservice#jobList." The property can reference the resource type of the response.

The property "etag" can have a value "string." The property can reference a hash of this page of results.

The property "nextPageToken" can have a value "string." The property can reference a token to request the next page of results. The property may be present only when there is more than one page of results.

The property "jobs" can have a value "list." The property may reference an array of one or more Job descriptions. The property may be absent when there are no jobs in the specified project.

The property "jobs.id" can have a value "string." The property may reference the fully-qualified job ID, in the format projectId:jobId.

The property "jobs.projectId" can have a value "string." The property may reference the id of the project that contains this job.

The property "jobs.jobId" can have a value "string." The property may reference the jobId of the job.

The property "jobs.state" can have a value "string." The property may reference the current state of this job.

The property "jobs.startTime" can have a value "long." The property may reference the start time of this job, in milliseconds since the epoch. The clock starts ticking when the job status changes to RUNNING, not when the request is sent by the user or received by the processing service.

The property "jobs.endTime" can have a value "long." The property reference the end time of this job, in milliseconds since the epoch. The property is when the status changed to DONE, successfully or not. If the job has not finished, this may be null.

The property "jobs.errorResult" can have a value "object." An object that may be present only if a job has failed.

processingservice.jobs.get

This method retrieves the specified job by ID. The user may specify the unqualified jobId value, not the fully-qualified id value of the job. To call this method, the user may have to have one of the following rights: dataset.access.READ; dataset.access.WRITE; dataset.access.OWNER; project.READ. A user may also get any job that that user had created.

REST Request: GET https://www.companyapis.com/processingservice/v2beta1/projects/{projectId}/jobs/{jobId}

Response: The response can be a job resource or an error message. If the requested job does not exist, the system may return an HTTP 404 error.

processingservice.jobs.insert

This method starts a new asynchronous job. The user may have to have write access to a project in order to run a job. This method returns immediately. The user may have to call jobs.get( ) and examine the job status to learn when the job is complete. The user may have to include one and only one of the following child members in the job resource. The child member that that the user includes defines the type of job that this is.

The child member "load" may load data from a CSV file into a table. The job can create a new table, overwrite an existing table, or append data to an existing table with a matching schema, as the user specifies in the job description. The caller may need to have read rights on any objects holding the data to import.

The child member "query" may query.

The child member "extract" may export a data processing service table to Company Storage as a CSV file, using the data processing service CSV syntax.

REST Request: POST https://www.companyapis.com/processingservice/v2beta1/projects/{projectId}/jobs Request Data: The user can pass in the following object with appropriate values. The job resource documentation can provide additional information.

```
{
    "projectId": string, // Required
    "jobId": string, // Optional
    "configuration": { // Required: one of the following members:
        "query": { // Required for query jobs
            "query": string, // Required
                "destinationTable": { // Required
                    "projectId": string, // Required
                    "datasetId": string, // Required
                    "tableId": string // Required
                },
                "createDisposition": string, // Optional
                "writeDisposition": string, // Optional
                "defaultDataset": { // Optional
                    "datasetId": string, // Optional
                    "projectId": string // Optional
                }
        },
        "load": { // Required for import jobs
            "sourceUris": [ // Required one or more values
                string,
                . . .
            ],
            "schema": { // Required
                "fields": [
                    {
                        "name": string, // Required
                        "type": string, // Required
                        "mode": string, // Required
                    }
                ]
            },
            "destinationTable": { // Required
                "projectId": string, // Required
                "datasetId": string, // Required
                "tableId": string // Required
            },
            "createDisposition": string, // Optional
            "writeDisposition": string // Optional
        },
        "extract": { // Required for export jobs
            "sourceTable": { // Required
                "projectId": string, // Required
                "datasetId": string, // Required
                "tableId": string // Required
            },
            "destinationUri": string // Required
        }
    }
}
```

Response: The method returns a copy of the request data if successful. The user may have to call processingservice.jobs.get( ) with the returned jobid value to poll the job status.

processingservice.jobs.delete

The method deletes a completed job specified by jobId. The job may have to be completed, either successfully or not, to call this method.

Required ACLs: To call this method, the user may have to have one of the following rights: project.WRITE/OWNER; or be the job creator REST Request: DELETE https://www.companyapis.com/processingservice/v2beta1/projects/{projectId}/jobs/{jobId}

Response: HTTP 204 code on success processingservice.jobs.query

The method runs a synchronous SQL query. To perform an asynchronous query, the user may call Jobs.insert( ). This method creates a result table, or deposits data in the specified table, if there are any results, and returns the first page of results synchronously. After getting the first page of results, the user may have to use the processingservice.tabledata. list( ) command to page through any additional results in the result table specified by tableId. The number of rows returned is limited by the lesser of either the maximum page size or the maxResults property. The create/write disposition values used by this method are CREATE_IF_NEEDED and WRITE_EMPTY.

Required ACLs: To call this method, the user may have to have one of the following sets of rights: dataset. access.WRITE/OWNER+project.WRITE/OWNER REST Request: POST https://www.companyapis.com/ processingservice/v2beta1/projects/{projectId}/queries Request data: An object with the following syntax.

```
{
    "query" : string, // Required
    "destinationTable": { // Required
        "projectId": string, // Required
        "datasetId": string, // Required
        "tableId": string // Required
    },
    "maxResults" : long, // Optional
    "defaultDataset" : { // Optional
        "datasetId" : string, // Optional
        "projectId" : string, // Optional
    }
    "createDisposition" : string, // Optional. Default is
    CREATE_IF_NEEDED
    "writeDisposition" : string // Optional. Default is WRITE_EMPTY
}
```

The property "maxResults" can have a value "long." The property is optional and can reference the maximum number of results to return per page of results. If the response list exceeds the maximum response size for a particular response, the user may have to page through the results. The default may be to return the maximum response size.

Response:

```
{
    "kind": "processingservice#queryResults",
    "schema": {
        "fields": [
            {
                "name": string,
                "type": string,
                "mode": string,
                "fields": [
                    (nested field object . . . )
                ]
            }
        ]
    },
    "job":{
        "kind" : "processingservice#job",
        "id" :string,
        "selfLink" :string,
        "projectId" :string,
        "jobId" :string,
        "configuration" : {job.configuration.query object},
        "status" : {job.status object},
        "statistics" : {job.statistics object},
    },
    "totalRows": integer,
    "rows": [
        {
            "f": [
                {
                    "v": (value)
                }
            ]
        }
    ]
}
```

The property name "kind" can have a value of "processingservice#queryResults." The property can reference the resource type of the response.

The property name "id" can have a value of "string." The property can reference the fully-qualified job name, in the format projectId:jobId.

The property name "selfLink" can have a value of "string." The property can reference an URL that can be used to access this resource again. The user can use this URL in Get( ) requests for this resource.

The property name "projectId" can have a value of "string." The user can use the ID of the project that contains this job.

The property name "jobId" can have a value of "string." The property can reference a unique ID for this job within the project.

The property name "configuration" can have a value of "object." The property can reference information about the query.

The property name "status" can have a value of "object." The property can reference the status of this job. The user can examine this value when polling an asynchronous job to see if the job is complete.

The property name "statistics" can have a value of "object." The property can reference statistics about this job.

The property name "schema" can have a value of "object." The property can reference an object describing the schema of the result set.

The property name "job" can have a value of "object." The property can reference a job resource describing the query job.

The property name "totalRows" can have a value of "integer." The property can reference the total number of rows in the complete query result set, which can be more than the number of rows in this single page of results.

The property name "rows" can have a value of "list." The property can reference an object with as many results as can be contained within the maximum permitted reply size. To get any additional rows, the user may call processingservice.tabledata.list( ).

The property name "rows.f" can have a value of "list." The property may represent a single row in the result set, consisting of one or more fields.

The property name "rows.f.v" can have any value. The property may contains the field value in this row.

Project Collection

Project

A user can list projects to which the user has read access using the processingservice.projects.list method; however, to create or manage projects, the user may have to use a separate system. Note that the project name and the project ID are not the same thing: a project name may be a human-readable string, and may not be required to be unique. A project ID may be a unique GUID string across all projects registered by the system.

A project can hold zero or more datasets. When the user creates a dataset, the user may have to assign it to an existing project. The user may have at least have read access to a project to be able to see any of the datasets that it contains.

processingservice.projects.list

Lists all the projects to which a user has at least read access.

REST Request: GET https://www.companyapis.com/processingservice/v2beta1/projects[?pageToken={page_token}]&[maxResults={max_results}]

The parameter "pageToken" can have the type "Integer." The parameter may be optional and may reference a page token used when requesting a specific page in a set of paged results.

The parameter "maxResults" can have the type "Integer." The parameter may be optional and may reference the maximum number of rows to return. If not specified, the method may return up to the maximum amount of data that may fit in a reply.

Response:

```
{
    "kind" : "processingservice#projectList",
    "etag" : string,
    "nextPageToken" : string,
    "projects" : [
        {
            "id" : string,
            "friendlyName" : string,
        }
    ]
}
```

The property "kind" can have the value "processingservice#datasetList." The property can reference the resource type.

The property "etag" can have the value "string." The property can reference a hash of this page of results.

The property "nextPageToken" can have the value "string." The property can reference a token to request the next page of results. The property may be present only when there is more than one page of results.

The property "projects" can have the value "list." The property can reference an array of zero or more projects to which the user has read/write access.

The property "projects.id" can have the value "string." The property can reference the ID of this project.

The property "projects.friendlyName" can have the value "string." The property can reference a descriptive name for this project.

Tabledata Collection

Tabledata.

Tabledata is used to return a slice of rows from a specified table. All columns may be returned. Each row is actually a Tabledata resource. To get a slice of rows, the user may call processingservice.tabledata.list( ). The user may specify a zero-based start row and a number of rows to retrieve in the list( ) request. Results may be paged if the number of rows exceeds the maximum for a single page of data. The column order may be the order specified by the table schema.

Tabledata Resource.

A JSON representation of a single row of table data. All columns specified by the table schema may be retrieved. See tabledata.list( ) for details about how the returned data is structured.

processingservice.tabledata.list

This method may be used to retrieve table data from a specified set of rows. The user may specify a zero-based starting row. If the user requests a row index greater than the number of available rows, the method may return successfully, but without a "rows" member. Column labels, table schema, and other metadata are may not be part of the response. Note that the response also may not include nextPageToken or etag members. Data may be returned in a JSON object that can be accessed in JavaScript, where the cell data is stored in the 'v' member of a two dimensional array, accessible like this: cellVal=returnedJson[row][column].v;

Required ACLs: To call this method, the user may have to have one of the following rights: dataset.access.READ; dataset.access.WRITE; dataset.access.OWNER.

REST Request: GET https://www.companyapis.com/processingservice/v2beta1/projects/{projectId}/datasets/{datasetId}/tables/{tableId}/data[?startIndex={start_index}]&[maxResults={max_results}]

The parameter "startIndex" can have the type "Integer." The parameter is optional and may reference the zero-based index of the starting row. This can be useful to jump to the middle or end of a large table. Values greater than the number of available rows may return successfully, but without a "rows" member.

The parameter "maxResults" can have the type "Integer." The parameter is optional and may reference the maximum number of rows to return. If not specified, the method may return up to the maximum amount of data that may fit in a reply.

Response:

```
{
    "kind": "processingservice#tableDataList",
    "totalRows": integer,
    "rows": [ // Present only when the result has data.
        {
            "f": [
                {
                    "v": (value)
                }
            ]
        }
    ]
}
```

The property "kind" can have a value "processingservice#tableDataList." The property can reference the resource type of the response.

The property "total Rows" can have a value "integer." The property can reference the total number of rows in the complete table, which can be more than the number of rows in this single page of results.

The property "rows" can have a value "list." The property can reference an array of one or more table rows. If the user requests a table with no data, or with a start index beyond the table length, this member may be absent.

The property "rows.f" can have a value "list." The property can reference an array of cells in the row.

The property "rows.f.v" can have any value. The property can reference the value of a single cell in the row.

Tables Collection

All tables are part of a dataset.

Tables Resource.

A table's schema is specified when the table is crated.

```
{
    "kind": "processingservice#table",
    "id": string,
    "selfLink": string,
    "projectId": string,
    "datasetId": string,
    "tableId": string,
    "friendlyName": string,
    "description": string,
    "schema": {
```

-continued

```
        "fields": [
            {
                "name": string,
                "type": string,
                "mode": string,
                "fields": [
                    (nested or repeated fields)
                ]
            }
        ]
    },
    "creationTime": string,
    "lastModifiedTime": long
}
```

The property "kind" can have the value "processingservice#table," and may not be mutable. The property can reference the resource type ID.

The property "id" can have the value "string," and may not be mutable. The property can represent the fully-qualified name of this table in the format projectId:datasetId:tableId.

The property "selfLink" can have the value "string," and may not be mutable. The property can reference a URL that can be used to access this resource. This URL can be used in the get( ) or update( ) requests to this resource.

The property "projectId" can have the value "string," and may be mutable on creation. The property can reference the projectId of the project that contains this table.

The property "datasetId" can have the value "string," and may be mutable on creation. The property can reference the datasetId of the dataset that contains this table.

The property "tableId" can have the value "string," and may mutable on creation. The property can reference a unique ID for this table. Use this to refer to the table in code. The user may have to specify this value when creating a new table. This property may have to be a string of 1-1024 characters satisfying the regular expression [A-Za-z0-9\-].

The property "friendlyName" can have the value "string," and may be mutable on creation. The property can reference an optional user-friendly name for this table.

The property "description" can have the value "string," and may be mutable. The property can reference a user-friendly description of this table.

The property "schema" can have the value "object," and may be mutable on creation. The property can reference an object describing the schema of this table.

The property "schema.fields" can have the value "list," and may be mutable on creation. The property can reference an array of items describing this field.

The property "schema.fields.name" can have the value "string," and may be mutable on creation. The property can reference the name of this field.

The property "schema.fields.type" can have the value "string," and may be mutable on creation. The property can reference the data type of this field.

The property "schema.fields.mode" can have the value "string," and may be mutable on creation. The property can reference the mode of this field (whether it can be null or not).

The property "schema.fields.fields" can have the value "list," and may be mutable on creation. The property can be used for describing nested fields in a table.

The property "creationTime" can have the value "long," and may not be mutable. The property can reference the time when this table was created, in milliseconds since the epoch.

The property "lastModifiedTime" can have the value "long," and may not be mutable. The property can reference the time when either the table schema or table data was last modified, in seconds since the epoch.

processingservice.tables.list

This method lists all tables in the specified dataset.

Required ACLs: To call this method, a user may have to have one of the following rights: dataset.access.READ; dataset.access.WRITE; dataset.access.OWNER.

REST Request: GET https://www.companyapis.com/processingservice/v2beta1/projects/{projectId}/datasets/{datasetId}/tables[?pageToken={page_token}]&[maxResults={max_results}]

The parameter "pageToken" can have the type "Integer." The parameter may be optional and may reference a page token used when requesting a specific page in a set of paged results.

The parameter "maxResults" can have the type "Integer." The parameter may be optional and may reference the maximum number of rows to return. If not specified, the method may return up to the maximum amount of data that may fit in a reply.

Response:

```
{
    "kind": "processingservice#tableList",
    "etag": string,
    "nextPageToken": string,
    "tables": [
        {
            "id": string,
            "projectId": string,
            "datasetId": string,
            "tableId": string,
            "friendlyName": string
        },...
    ],
    "totalItems": integer
}
```

The property "kind" can have the value "string." The property references the resource type of the response.

The property "etag" can have the value "string." The property references a hash of this page of results.

The property "nextPageToken" can have the value "string." The property references a token to request the next page of results. The property may be present only when there is more than one page of results.

The property "tables" can have the value "list." The property references an array of descriptions of one or more tables. The property may be absent when there are no tables in the specified dataset.

The property "tables.id" can have the value "string." The property references the fully-qualified name of this table in the format projectId:datasetId.tableId.

The property "tables.projectId" can have the value "string." The property references the projectId of the project that contains this table.

The property "tables.datasetId" can have the value "string." The property references the datasetId of the dataset that contains this table.

The property "tables.tableId" can have the value "string." The property references the unique ID for this table.

The property "tables.friendlyName" can have the value "string." The property references the user-friendly name of this table.

The property "totalItems" can have the value "integer." The property references the total number of tables in the dataset.

processingservice.tables.get

This method gets the specified table resource by tableId. This method may not return the data in the table, only the table resource, which describes the structure of this table. To retrieve table data, a user can call tabledata.list( ). The user should specify the unqualified tableId value, not the fully-qualified id value of the table.

Required ACLs: To call this method, the user may have to have one of the following rights: dataset.access.READ; dataset.access.WRITE; dataset.access.OWNER.

REST Request: GET https://www.companyapis.com/processingservice/v2beta1/projects/{projectId}/datasets/{datasetId}/tables/{tableId}

Response: Returns the specified table resource, or an error message. If the requested table does not exist, returns an HTTP 404 error.

processingservice.tables.insert

The method creates a new, empty table in the dataset, with the schema provided. Once a table is created using this method, the user may not be able to modify the schema, even if the table does not yet hold data. To populate a table with data, a user can create an appropriate job.

Required ACLs. To call this method, the user may have to have one of the following rights: dataset.access.WRITE; dataset.access.OWNER.

REST Request: POST https://www.companyapis.com/processingservice/v2beta1/projects/{projectId}/datasets/{datasetId}/tables Request data: Submit with an object of the following syntax.

```
{
    "projectId": string, // Required
    "datasetId": string, // Required
    "tableId": string, // Required
    "friendlyName": string, // Optional
    "description": string, // Optional
    "schema": { // Required
        "fields": [ // Required one per column
            {
                "name": string, // Required
                "type": string, // Required
                "mode": string, // Required
            }
        ]
    }
}
```

Response: Returns a copy of the inserted table resource, or an error message.

processingservice.tables.update

The method updates information in an existing table, specified by tableId.

Required ACLs. To call this method, the user may have to have one of the following rights: dataset.access.WRITE; dataset.access.OWNER.

REST Request: PUT https://www.companyapis.com/processingservice/v2beta1/projects/{projectId}/datasets/{datasetId}/tables/{tableId}

Request data: submit an object with the following properties as desired. Properties not included in the submitted resource may not be changed.

```
{
    "friendlyName": string, // Optional
    "description": string, // Optional
}
```

Response: Returns a copy of the updated table resource if successful, or an error message.

processingservice.tables.delete

Deletes the table specified by tableId from the dataset. If the table contains data, all the data may be deleted. After deletion, the user may be able to immediately create a new table with the same name.

Required ACLs. To call this method, the user may have to have one of the following rights: dataset.access.WRITE; dataset.access.OWNER.

REST Request: DELETE https://www.companyapis.com/processingservice/v2beta1/projects/{projectId}/datasets/{datasetId}/tables/{tableId}

Figure 31:
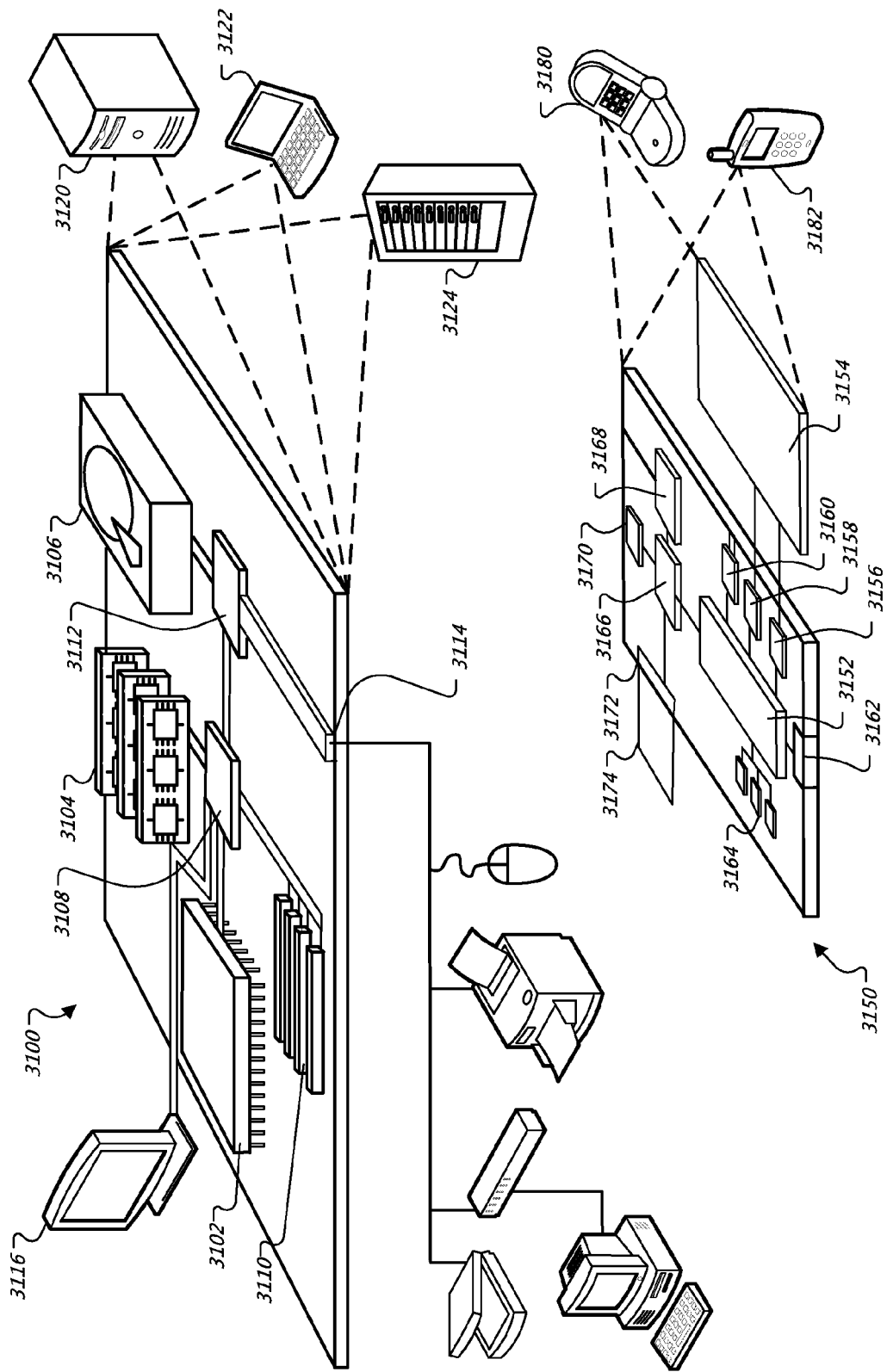
FIG. 31 is a block diagram of computing devices that may be used to implement the systems and methods described in this document, as either a client or as a server or plurality of servers.

FIG. 31 is a block diagram of computing devices 3100, 3150 that may be used to implement the systems and methods described in this document, as either a client or as a server or plurality of servers. Computing device 3100 is intended to represent various forms of digital computers, such as laptops, desktops, workstations, personal digital assistants, servers, blade servers, mainframes, and other appropriate computers. Computing device 3150 is intended to represent various forms of mobile devices, such as personal digital assistants, cellular telephones, smartphones, and other similar computing devices. Additionally computing device 3100 or 3150 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 3100 includes a processor 3102, memory 3104, a storage device 3106, a high-speed interface 3108 connecting to memory 3104 and high-speed expansion ports 3110, and a low speed interface 3112 connecting to low speed bus 3114 and storage device 3106. Each of the components 3102, 3104, 3106, 3108, 3110, and 3112, are interconnected using various busses, and may be mounted on a common motherboard or in other manners as appropriate. The processor 3102 can process instructions for execution within the computing device 3100, including instructions stored in the memory 3104 or on the storage device 3106 to display graphical information for a GUI on an external input/output device, such as display 3116 coupled to high speed interface 3108. In other implementations, multiple processors and/or multiple buses may be used, as appropriate, along with multiple memories and types of memory. Also, multiple computing devices 3100 may be connected, with each device providing portions of the necessary operations (e.g., as a server bank, a group of blade servers, or a multi-processor system).

The memory 3104 stores information within the computing device 3100. In one implementation, the memory 3104 is a volatile memory unit or units. In another implementation, the memory 3104 is a non-volatile memory unit or units. The memory 3104 may also be another form of computer-readable medium, such as a magnetic or optical disk.

The storage device 3106 is capable of providing mass storage for the computing device 3100. In one implementation, the storage device 3106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 3104, the storage device 3106, or memory on processor 3102.

The high speed controller 3108 manages bandwidth-intensive operations for the computing device 3100, while the low speed controller 3112 manages lower bandwidth-intensive operations. Such allocation of functions is exemplary only. In one implementation, the high-speed controller 3108 is coupled to memory 3104, display 3116 (e.g., through a graphics processor or accelerator), and to high-speed expansion ports 3110, which may accept various expansion cards (not shown). In the implementation, low-speed controller 3112 is coupled to storage device 3106 and low-speed expansion port 3114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 3100 may be implemented in a number of different forms, as shown in the figure. For example, it may be implemented as a standard server 3120, or multiple times in a group of such servers. It may also be implemented as part of a rack server system 3124. In addition, it may be implemented in a personal computer such as a laptop computer 3122. Alternatively, components from computing device 3100 may be combined with other components in a mobile device (not shown), such as device 3150. Each of such devices may contain one or more of computing device 3100, 3150, and an entire system may be made up of multiple computing devices 3100, 3150 communicating with each other.

Computing device 3150 includes a processor 3152, memory 3164, an input/output device such as a display 3154, a communication interface 3166, and a transceiver 3168, among other components. The device 3150 may also be provided with a storage device, such as a microdrive or other device, to provide additional storage. Each of the components 3150, 3152, 3164, 3154, 3166, and 3168, are interconnected using various buses, and several of the components may be mounted on a common motherboard or in other manners as appropriate.

The processor 3152 can execute instructions within the computing device 3150, including instructions stored in the memory 3164. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 3150, such as control of user interfaces, applications run by device 3150, and wireless communication by device 3150.

Processor 3152 may communicate with a user through control interface 3158 and display interface 3156 coupled to a display 3154. The display 3154 may be, for example, a TFT (Thin-Film-Transistor Liquid Crystal Display) display or an OLED (Organic Light Emitting Diode) display, or other appropriate display technology. The display interface 3156 may comprise appropriate circuitry for driving the display 3154 to present graphical and other information to a user. The control interface 3158 may receive commands from a user and convert them for submission to the processor 3152. In addition, an external interface 3162 may be provide in communication with processor 3152, so as to enable near area communication of device 3150 with other devices. External interface 3162 may provide, for example, for wired communication in some implementations, or for wireless communication in other implementations, and multiple interfaces may also be used.

The memory 3164 stores information within the computing device 3150. The memory 3164 can be implemented as one or more of a computer-readable medium or media, a volatile memory unit or units, or a non-volatile memory unit or units. Expansion memory 3174 may also be provided and connected to device 3150 through expansion interface 3172, which may include, for example, a SIMM (Single In Line Memory Module) card interface. Such expansion memory 3174 may provide extra storage space for device 3150, or may also store applications or other information for device 3150. Specifically, expansion memory 3174 may include instructions to carry out or supplement the processes described above, and may include secure information also. Thus, for example, expansion memory 3174 may be provide as a security module for device 3150, and may be programmed with instructions that permit secure use of device 3150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 3164, expansion memory 3174, or memory on processor 3152 that may be received, for example, over transceiver 3168 or external interface 3162.

Device 3150 may communicate wirelessly through communication interface 3166, which may include digital signal processing circuitry where necessary. Communication interface 3166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 3168. In addition, short-range communication may occur, such as using a Bluetooth, WiFi, or other such transceiver (not shown). In addition, GPS (Global Positioning System) receiver module 3170 may provide additional navigation- and location-related wireless data to device 3150, which may be used as appropriate by applications running on device 3150.

Device 3150 may also communicate audibly using audio codec 3160, which may receive spoken information from a user and convert it to usable digital information. Audio codec 3160 may likewise generate audible sound for a user, such as through a speaker, e.g., in a handset of device 3150. Such sound may include sound from voice telephone calls, may include recorded sound (e.g., voice messages, music files, etc.) and may also include sound generated by applications operating on device 3150.

The computing device 3150 may be implemented in a number of different forms, as shown in the figure. For example, it may be implemented as a cellular telephone 3180. It may also be implemented as part of a smartphone 3182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for generating and processing columnar storage representations of nested records may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the disclosed systems.

As additional description to the implementations described above, the present disclosure describes a first set of the following implementations:

Implementation 1 is a computer-implemented method. The method comprises receiving, by a computing system and from a remote computing device, a first request to insert one or more first data values into a first database table. The method comprises identifying, by the computing system, that first data stored by the first database table is stored in a first logical partition of a logical collection of data, wherein: (i) the logical collection of data is designated for replication among multiple data centers such that a copy of the logical collection of data is designated to be stored by each of the multiple data centers, (ii) the logical collection of data is logically partitioned into multiple logical partitions which together comprise the logical collection of data, and (iii) the first logical partition is one of the multiple logical partitions of data. The method comprises identifying, by the computing system, that a first data center of the multiple data centers is designated as one data center, of the multiple data centers, that initially writes to the first logical partition of data. The method comprises sending, by the computing system and to the first data center, the first request to insert the one or more first data values into the first database table. The method comprises receiving, by the computing system and from the remote device, a second request to insert one or more second data values into a second database table. The method comprises identifying, by the computing system, that second data stored by the second database table is stored in a second logical partition of the logical collection of data, wherein the second logical partition is one of the multiple logical partitions of data. The method comprises identifying, by the computing system, that a second data center of the multiple data centers is designated as one data center, of the multiple data centers, that initially writes to the second logical partition of data. The method comprises sending, by the computing system and to the second data center, the second request to insert the one or more second data values into the second database table.

Implementation 2 is the method of implementation 1, wherein the first data center comprises over fifty computer processors; and the second data center comprises over fifty computer processors.

Implementation 3 is the method of implementation 1, where the method further comprises receiving, by the computing system and from the remote device, a third request to insert one or more third data values into a third database table. The method further comprises identifying, by the computing system, that third data stored by the third database table is stored in a third logical partition of the logical collection of data, wherein the third logical partition is one of the multiple logical partitions of data. The method further comprises identifying, by the computing system, that a third data center of the multiple data centers is designated as a data center that initially writes to the third logical partition of data. The method further comprises sending, by the computing system and to the third data center, the third request to insert one or more third data values into the third record of the third database table.

Implementation 4 is the method of implementation 1, wherein the method further comprises inserting, by the first data center, the one or more first data values into the first database table. The method further comprises replicating the one or more first data values from the first data center to each of the multiple data centers other than the first data center, including the second data center. The method further comprises inserting, by the second data center, the one or more second data values into the second database table. The method further comprises replicating the one or more second data values from the second data center to each of the multiple data centers other than the second data center, including the first data center.

Implementation 5 is the method of implementation 4, wherein the one or more first data values are replicated after the first data center has inserted the one or more first data values into the first database table. The one or more second data values are replicated after the second data center has inserted the one or more second data values into the second database table.

Implementation 6 is the method of implementation 4, wherein the first request is received by the computing system before the replicating of the one or more first data values. The second request is received by the computing system before the replicating of the one or more second data values.

Implementation 7 is the method of implementation 4, wherein the method further comprises receiving, by the first data center, the one or more second data values as having been replicated from the second data center. The method further comprises inserting, by the first data center, the one or more second data values into the second database table. The method further comprises receiving, by the second data center, the one or more first data values as having been replicated from the first data center. The method further comprises inserting, by the second data center, the one or more first data values into the first database table.

Implementation 8 is the method of implementation 4, wherein: inserting, by the first data center, the one or more first data values into the first database table includes inserting the one or more first data values into a copy of the first database table stored by the first data center; inserting, by the second data center, the one or more second data values into the second database table includes inserting the one or more second data values into a copy of the second database table stored by the second data center; inserting, by the first data center, the one or more second data values into the second database table includes inserting the one or more second data values into a copy of the second database table stored by the first data center; and inserting, by the second data center, the one or more first data values into the first database table includes inserting the one or more first data values into a copy of the first database table stored by the second data center.

Implementation 9 is the method of implementation 1, wherein: the first data stored by the first database table is columnar data arranged for querying by a columnar database querying system; and the second data stored by the second database table is columnar data arranged for querying by the columnar database querying system.

Implementation 10 is the method of implementation 1, wherein the method further comprises receiving, by the computing system and from the remote computing device, a first query to select data from the first database table. The method further comprises sending, by the computing system, the first query to the second data center for selection of data that is responsive to the first query from a copy of the first database table stored by the second data center.

Implementation 11 is the method of implementation 1, wherein: the first data center is an only of the multiple data centers that is designated as initially writing to the first logical partition of data; and the second data center is an only of the multiple data centers that is designated as initially writing to the second logical partition of data.

Implementation 12 is the method of implementation 1, wherein: all data stored by the first database table is stored within the first logical partition; and all data stored by the second database table is stored within the second logical partition.

Implementation 13 is the method of implementation 1, wherein one of the multiple data centers comprises the computing system.

Implementation 14 is the method of implementation 1, wherein the first data center is designated as an only data center of the multiple data centers to write to the first logical partition of data concurrently as the second data center is designated as an only data center of the multiple data centers to write to the second logical partition of data.

Implementation 15 is directed to a recordable media having instructions stored thereon, the instructions, when executed by one or more processors, perform actions according the method of any one of implementations 1 to 14.

Implementation 16 is directed to a system including a recordable media having instructions stored thereon, the instructions, when executed by one or more processors, perform actions according the method of any one of implementations 1 to 14.

Implementation 17 is directed to a computer-implemented system. The system comprises one or more computer processors. The system comprises one or more computer-readable devices storing instructions that, when executed by the one or more computer processors, cause performance of operations. The operations include receiving, by a computing system and from a remote computing device, a first request to insert one or more first data values into a first database table. The operations include identifying, by the computing system, that first data stored by the first database table is stored in a first logical partition of a logical collection of data. The logical collection of data is designated for replication among multiple data centers such that a copy of the logical collection of data is designated to be stored by each of the multiple data centers. The logical collection of data is logically partitioned into multiple logical partitions which together comprise the logical collection of data. The first logical partition is one of the multiple logical partitions of data. The operations include identifying, by the computing system, that a first data center of the multiple data centers is designated as one data center, of the multiple data centers, that initially writes to the first logical partition of data. The operations include sending, by the computing system and to the first data center, the first request to insert the one or more first data values into the first database table. The operations include receiving, by the computing system and from the remote device, a second request to insert one or more second data values into a second database table. The operations include identifying, by the computing system, that second data stored by the second database table is stored in a second logical partition of the logical collection of data, wherein the second logical partition is one of the multiple logical partitions of data. The operations include identifying, by the computing system, that a second data center of the multiple data centers is designated as one data center, of the multiple data centers, that initially writes to the second logical partition of data. The operations include sending, by the computing system and to the second data center, the second request to insert the one or more second data values into the second database table.

Implementation 18 is directed to a computer-implemented method. The method comprises receiving, by a computing system and from a remote computing device, a first request to insert one or more first data values into a first database table. The method comprises identifying, by the computing system, that first data stored by the first database table is stored in a first logical partition of a logical collection of data. The logical collection of data is designated for replication among multiple data centers such that a copy of the logical collection of data is designated to be stored by each of the multiple data centers. Each of the multiple data centers comprises over a fifty computer processors. The logical collection of data is logically partitioned into multiple logical partitions which together comprise the logical collection of data. The first logical partition is one of the multiple logical partitions of data. The method comprises identifying, by the computing system, that a first data center of the multiple data centers is designated as an only one data center, of the multiple data centers, that initially writes to the first logical partition of data. The method comprises sending, by the computing system and to the first data center, the first request to insert the one or more first data values into the first database table. The method comprises inserting, by the first data center, the one or more first data values into a copy of the first database table stored by the first data center. The method comprises replicating, after the insertion of the one or more first data values into the copy of the first database table stored by the first data center, the one or more first data values from the first data center to each of the multiple data centers other than the first data center, including the second data center. The method comprises receiving, by a second data center of the multiple data centers, the one or more first data values as having been replicated from the first data center. The method comprises inserting, by the second data center, the one or more first data values into a copy of the first database table stored by the second data center. The method comprises receiving, by the computing system and from the remote device, a second request to insert one or more second data values into a second database table. The method comprises identifying, by the computing system, that second data stored by the second database table is stored in a second logical partition of the logical collection of data, wherein the second logical partition is one of the multiple logical partitions of data. The method comprises identifying, by the computing system, that the second data center is designated as an only one data center, of the multiple data centers, that initially writes to the second logical partition of data, wherein the second data center is designated as an only one data center, of the multiple data centers, that initially writes to the second logical partition of data concurrent with the first data center being designated as the only one data center, of the multiple data centers, that initially writes to the first logical partition of data. The method comprises sending, by the computing system and to the second data center, the second request to insert the one or more second data values into the second database table. The method comprises inserting, by the second data center, the one or more second data values into a copy of the second database table stored by the second data center. The method comprises replicating, after the insertion of the one or more second data values into the copy of the second database table stored by the second data center, the one or more second data values from the second data center to each of the multiple data centers other than the second data center, including the first data center. The method comprises receiving, by the first data center, the one or more second data values as having been replicated from the second data center. The method comprises inserting, by the first data center, the one or more second data values into a copy of the second database table stored by the first data center.

As additional description to the implementations described above, the present disclosure describes a second set of the following implementations:

Implementation 1 is directed to a computerized system. The system comprises a first data center of multiple data centers, the multiple data centers configured to replicate a logical collection of data among the multiple data centers, wherein the logical collection of data comprises multiple logical partitions of data that as a whole comprise the logical collection of data, wherein the multiple logical partitions of data comprise a first logical partition of data, a second logical partition of data, and a third logical partition of data. The system comprises a second data center of the multiple data centers. The system comprises a third data center of the multiple data centers. The system comprises a first writing subsystem, executable by computers at the first data center, that is designated to write updates to a copy of the first logical partition of data that is stored by the first data center. The system comprises a second writing subsystem, executable by computers at the second data center, that is designated to write updates to a copy of the second logical partition of data that is stored by the second data center. The system comprises a third writing subsystem, executable by computers at the third data center, that is designated to write updates to a copy of the third logical partition of data that is stored by the third data center. The system comprises a writing query distributor, executable by one or more computers, that is configured to receive multiple queries from multiple remote computing devices over a period of time, and to: (i) distribute, to the first writing subsystem at the first data center, those of the multiple queries that have been identified as being structured to write to the first logical partition of data, (ii) distribute, to the second writing subsystem at the second data center, those of the multiple queries that have been identified as being structured to write to the second logical partition of data, and (iii) distribute, to the third writing subsystem at the third data center, those of the multiple queries that have been identified as being structured to write to the third logical partition of data.

Implementation 2 is the system of implementation 1, wherein: those of the multiple queries that have been identified as being structured to write to the first logical partition of data are all of the multiple queries that have been identified as being structured to write to the first logical partition of data; those of the multiple queries that have been identified as being structured to write to the second logical partition of data are all of the multiple queries that have been identified as being structured to write to the second logical partition of data; and those of the multiple queries that have been identified as being structured to write to the third logical partition of data are all of the multiple queries that have been identified as being structured to write to the third logical partition of data.

Implementation 3 is the system of implementation 1, wherein: the period of time is at least an hour; those of the multiple queries that have been identified as being structured to write to the first logical partition of data including at least a hundred queries; those of the multiple queries that have been identified as being structured to write to the second logical partition of data including at least a hundred queries; and those of the multiple queries that have been identified as being structured to write to the third logical partition of data including at least a hundred queries.

Implementation 4 is the system of implementation 1, wherein the system further comprises a first replicating subsystem, executable by computers at the first data center, to replicate the updates to the first logical partition of data from the first data center to the second data center and the third data center. The system further comprises a second replicating subsystem, executable by computers at the second data center, to replicate the updates to the second logical partition of data from the second data center to the first data center and the third data center. The system further comprises a third replicating subsystem, executable by computers at the third data center, to replicate the updates to the third logical partition of data from the third data center to the first data center and the second data center.

Implementation 5 is the system of implementation 1, wherein the system further comprises a first querying subsystem, executable by computers at the first data center, to receive queries and, in response, to query copies of the first logical partition of data, second logical partition of data, and third logical partition of data that are stored by the first data center. The system further comprises a second querying subsystem, executable by computers at the second data center, to receive queries and, in response, to query copies of the first logical partition of data, second logical partition of data, and third logical partition of data that are stored by the second data center. The system further comprises a third querying subsystem, executable by computers at the third data center, to receive queries and, in response, to query copies of the first logical partition of data, second logical partition of data, and third logical partition of data that are stored by the third data center.

Implementation 6 is the system of implementation 1, wherein: the first data center comprises at least fifty computer processors; the second data center comprises at least fifty computer processors; and the third data center comprises at least fifty computer processors.

Implementation 7 is the system of implementation 1, wherein the system further comprises a reading query router, executable by at least one computer, to receive a reading query that is structured to select data from a table that is stored within the logical collection of data, and to route the reading query to one of the first data center, the second data center, or the third data center that is geographically closest to the at least one computer, without regard for whether the table is logically stored within the first logical partition of data, the second logical partition of data, or the third logical partition of data.

Implementation 8 is the system of implementation 7, the reading query is structured to select data from the second logical partition of data; and the reading query router is configured to route the reading query to the first data center during the period of time.

Implementation 9 is the system of implementation 1, wherein one or more computers through which the writing query distributor is executable are one or more computers of the first data center, the second data center, or the third data center.

As additional description to the implementations described above, the present disclosure describes a third set of the following implementations:

Implementation 10 is directed to a computer-implemented method. The method comprises receiving, by a computing system, a query that is structured to cause a querying system to select data from a database table. The method comprises identifying, by the computing system, that the data that is to be selected from the database table is stored within one or more logical portions of data. The method comprises identifying, by the computing system, multiple data centers among which the one or more logical portions of data are designated for replication. The method comprises identifying, by the computing system, that the one or more logical portions of data have been fully replicated among none of the multiple data centers. The method comprises, in response to identifying that the one or more logical portions of data have been fully replicated among none of the multiple data centers, identifying, by the computing system, a most-recent data center of the multiple data centers that most-recently updated the one or more logical portions of data. The method comprises sending, by the computing system, the query to the identified most-recent data center, so as to cause the identified most-recent data center to select data, in accordance with the query, from a copy of the database table that is stored by the most-recent data center.

Implementation 11 is the method of implementation 10, wherein identifying the most-recent data center includes identifying that a write timestamp for a copy of the one or more logical portions of data stored by the most-recent data center is more recent than write timestamps for copies of the one or more logical portions of data stored by other of the multiple data centers that do not include the most-recent data center.

Implementation 12 is the method of implementation 10, wherein the method further comprises receiving, by the computing system, a second query that is structured so as to cause the querying system to select second data from a second database table. The method further comprises identifying, by the computing system, that the second data that is to be selected from the second database table is stored by one or more second logical portions of data. The method further comprises identifying, by the computing system, that the one or more second logical portions of data are designated for replication among the multiple data centers. The method further comprises identifying, by the computing system, that one or more of the second logical portions of data have been fully replicated among at least two of the multiple data centers. The method further comprises, in response to identifying that the one or more of the second logical portions of data have been fully replicated among at least two of the multiple data centers, identifying, by the computing system, one of the at least two data centers to handle the second query based at least in part on a first criterion. The method further comprises sending, by the computing system, the second query to the identified one data center for execution of the second query.

Implementation 13 is the method of implementation 10, wherein identifying that the one or more of the second logical portions have been fully replicated among at least two of the multiple data centers includes: identifying, by the computing system, a first data center of the multiple data centers as being one of the at least two of the multiple data centers among which the one or more second logical portions of data have been fully replicated, based on identifying that the first data center is designated as a data center that initially updates a local copy of the one or more second logical portions of data before other of the multiple data centers update respective local copies of the one or more second logical portions of data; and identifying, by the computing system, a second data center of the multiple data centers as being another of the at least two of the multiple data centers among which the one or more second logical portions of data have been fully replicated, based on identifying that a copy of the one or more second logical portions of data that is stored by the second data center has a write timestamp that is more recent than a write timestamp for a copy of the one or more second logical portions of data that is stored by the first data center.

Implementation 14 is the method of implementation 13, wherein the computing system is adapted to not select certain of the multiple data centers as having fully replicated the one or more second logical portions of data as a result of identifying that copies of the one or more second logical portions of data stored by the certain data centers have write timestamps for the copies of the one or more second logical portions of data that are less recent than a write timestamp for the copy of the one or more second logical portions of data that is stored by the first data center.

Implementation 15 is the method of implementation 13, wherein the method further comprises receiving, by the computing system, a third query that is structured so as to select data from a third database table. The method further comprises identifying, by the computing system, that the third data that is to be selected from the database table is stored by the one or more third logical portions of data; identifying, by the computing system, that the one or more third logical portions of data are designated for replication among the multiple data centers. The method further comprises identifying, by the computing system, that a single one of the multiple data centers has fully replicated the logical data. The method further comprises, in response to identifying that a single one of the multiple data centers has fully replicated the logical data, sending, by the computing system, the third query to the single one of the multiple data centers.

Implementation 16 is the method of implementation 12, wherein identifying one of the at least two data centers to handle the second query based at least in part on the first criterion includes identifying which of the at least two data centers is geographically closest to a remote computing device that transmitted the second query to the computing system.

Implementation 17 is the method of implementation 12, wherein identifying one of the at least two data centers to handle the second query based at least in part on the first criterion includes identifying which of the at least two data centers is associated with a shortest trip time for a message transmitted between (i) a remote computing device that transmitted the second query to the computing system, and (ii) each of the at least two data centers.

Implementation 18 is the method of implementation 12, wherein identifying one of the at least two data centers to handle the second query based at least in part on the first criterion includes identifying which of the at least two data centers has been determined to have a most available computing capacity from among the at least two data centers.

Implementation 19 is directed to a recordable media having instructions stored thereon, the instructions, when executed by one or more processors, perform actions according the method of any one of implementations 10 to 18.

Implementation 20 is directed to a system including a recordable media having instructions stored thereon, the instructions, when executed by one or more processors, perform actions according the method of any one of implementations 10 to 18.

What is claimed is:

1. A computerized system, comprising:
   a first data center of multiple data centers, the multiple data centers configured to replicate a logical collection of data among the multiple data centers,
      wherein the logical collection of data comprises multiple logical partitions of data that are distinct from each other and that as a whole comprise the logical collection of data, wherein the multiple logical partitions of data comprise a first logical partition of data, a second logical partition of data, and a third logical partition of data,
      wherein each of the multiple data centers includes multiple computers that each include at least one processor and computer-readable memory;
   a second data center of the multiple data centers;
   a third data center of the multiple data centers;
   a first writing subsystem, executable by at least some of the computers at the first data center, that is designated to write updates to a copy of the first logical partition of data that is stored by the first data center;
   a second writing subsystem, executable by at least some of the computers at the second data center, that is designated to write updates to a copy of the second logical partition of data that is stored by the second data center;
   a third writing subsystem, executable by at least some of the computers at the third data center, that is designated to write updates to a copy of the third logical partition of data that is stored by the third data center;
   a first replicating subsystem, executable by at least some of the computers at the first data center, to replicate the updates to the first logical partition of data from the first data center to the second data center and the third data center;
   a second replicating subsystem, executable by at least some of the computers at the second data center, to replicate the updates to the second logical partition of data from the second data center to the first data center and the third data center;
   a third replicating subsystem, executable by at least some of the computers at the third data center, to replicate the updates to the third logical partition of data from the third data center to the first data center and the second data center;
   a writing query distributor, executable by one or more computers, that is configured to receive, over a period of time, multiple queries from multiple client computing devices that are geographically remote from the multiple data centers and the one or more computers on which the writing query distributor is executable, and to:
      (i) distribute, to the first writing subsystem at the first data center, those of the multiple queries that have been identified as being structured to write to the first logical partition of data,
      (ii) distribute, to the second writing subsystem at the second data center, those of the multiple queries that have been identified as being structured to write to the second logical partition of data, and
      (iii) distribute, to the third writing subsystem at the third data center, those of the multiple queries that have been identified as being structured to write to the third logical partition of data.

2. The computerized system of claim 1, wherein:
   those of the multiple queries that have been identified as being structured to write to the first logical partition of data are all of the multiple queries that have been identified as being structured to write to the first logical partition of data;
   those of the multiple queries that have been identified as being structured to write to the second logical partition of data are all of the multiple queries that have been identified as being structured to write to the second logical partition of data; and
   those of the multiple queries that have been identified as being structured to write to the third logical partition of data are all of the multiple queries that have been identified as being structured to write to the third logical partition of data.

3. The computerized system of claim 1, wherein:
the period of time is at least an hour;
those of the multiple queries that have been identified as being structured to write to the first logical partition of data include at least a hundred queries;
those of the multiple queries that have been identified as being structured to write to the second logical partition of data include at least a hundred queries; and
those of the multiple queries that have been identified as being structured to write to the third logical partition of data include at least a hundred queries.

4. The computerized system of claim 1, further comprising:
a first querying subsystem, executable by at least some of the computers at the first data center, to receive queries and, in response, to query copies of the first logical partition of data, second logical partition of data, and third logical partition of data that are stored by the first data center;
a second querying subsystem, executable by at least some of the computers at the second data center, to receive queries and, in response, to query copies of the first logical partition of data, second logical partition of data, and third logical partition of data that are stored by the second data center; and
a third querying subsystem, executable by at least some of the computers at the third data center, to receive queries and, in response, to query copies of the first logical partition of data, second logical partition of data, and third logical partition of data that are stored by the third data center.

5. The computerized system of claim 1, wherein:
the first data center comprises at least fifty computer processors;
the second data center comprises at least fifty computer processors; and
the third data center comprises at least fifty computer processors.

6. The computerized system of claim 1, further comprising:
a reading query router, executable by at least one computer, to receive a reading query that is structured to select data from a table that is stored within the logical collection of data, and to route the reading query to one of the first data center, the second data center, or the third data center that is geographically closest to the at least one computer, without regard for whether the table is logically stored within the first logical partition of data, the second logical partition of data, or the third logical partition of data.

7. The computerized system of claim 6, wherein:
the reading query is structured to select data from the second logical partition of data; and
the reading query router is configured to route the reading query to the first data center during the period of time as a result of determining that the first data center is geographically closest to the at least one computer.

8. The computerized system of claim 1, wherein the one or more computers through which the writing query distributor is executable are one or more computers of the first data center, the second data center, or the third data center.

9. A computer-implemented method, comprising:
receiving, by a computing system, a query that is structured to cause a querying system to select data from a database table;
identifying, by the computing system, that the data that is to be selected from the database table is stored within one or more logical portions of data;
identifying, by the computing system, multiple data centers among which the one or more logical portions of data are designated for replication;
identifying, by the computing system, that the one or more logical portions of data have been fully replicated among none of the multiple data centers;
in response to identifying that the one or more logical portions of data have been fully replicated among none of the multiple data centers, identifying, by the computing system, a most-recent data center of the multiple data centers that most-recently updated the one or more logical portions of data, wherein identifying the most-recent data center includes identifying that a write timestamp for a copy of the one or more logical portions of data stored by the most-recent data center is more recent than write timestamps for copies of the one or more logical portions of data stored by other of the multiple data centers that do not include the most-recent data center; and
sending, by the computing system, the query to the identified most-recent data center, so as to cause the identified most-recent data center to select data, in accordance with the query, from a copy of the database table that is stored by the most-recent data center.

10. The computer-implemented method of claim 9, further comprising:
receiving, by the computing system, a second query that is structured so as to cause the querying system to select second data from a second database table;
identifying, by the computing system, that the second data that is to be selected from the second database table is stored by one or more second logical portions of data;
identifying, by the computing system, that the one or more second logical portions of data are designated for replication among the multiple data centers;
identifying, by the computing system, that one or more of the second logical portions of data have been fully replicated among at least two of the multiple data centers;
in response to identifying that the one or more of the second logical portions of data have been fully replicated among at least two of the multiple data centers, identifying, by the computing system, one of the at least two data centers to handle the second query based at least in part on a first criterion; and
sending, by the computing system, the second query to the identified one data center for execution of the second query.

11. The computer-implemented method of claim 10, wherein identifying that the one or more of the second logical portions have been fully replicated among at least two of the multiple data centers includes:
identifying, by the computing system, a first data center of the multiple data centers as being one of the at least two of the multiple data centers among which the one or more second logical portions of data have been fully replicated, based on identifying that the first data center is designated as a data center that initially updates a local copy of the one or more second logical portions of data before other of the multiple data centers update respective local copies of the one or more second logical portions of data; and identifying, by the computing system, a second data center of the multiple data centers as being another of the at least two of the multiple data centers among which the one or more second logical portions of data have been fully replicated, based on identifying that a copy of the one or more second logical portions of data that is stored by the second data center has a write timestamp that is more recent than a write timestamp for a copy of the one or more second logical portions of data that is stored by the first data center.

12. The computer-implemented method of claim 11, wherein the computing system is adapted to not select certain of the multiple data centers as having fully replicated the one or more second logical portions of data as a result of identifying that copies of the one or more second logical portions of data stored by the certain data centers have write timestamps for the copies of the one or more second logical portions of data that are less recent than a write timestamp for the copy of the one or more second logical portions of data that is stored by the first data center.

13. The computer-implemented method of claim 11, further comprising:

receiving, by the computing system, a third query that is structured so as to select data from a third database table;

identifying, by the computing system, that the third data that is to be selected from the database table is stored by the one or more third logical portions of data;

identifying, by the computing system, that the one or more third logical portions of data are designated for replication among the multiple data centers;

identifying, by the computing system, that a single one of the multiple data centers has fully replicated the logical data; and in response to identifying that a single one of the multiple data centers has fully replicated the logical data, sending, by the computing system, the third query to the single one of the multiple data centers.

14. The computer-implemented method of claim 10, wherein identifying one of the at least two data centers to handle the second query based at least in part on the first criterion includes identifying which of the at least two data centers is geographically closest to a remote computing device that transmitted the second query to the computing system.

15. The computer-implemented method of claim 10, wherein identifying one of the at least two data centers to handle the second query based at least in part on the first criterion includes identifying which of the at least two data centers is associated with a shortest trip time for a message transmitted between (i) a remote computing device that transmitted the second query to the computing system, and (ii) each of the at least two data centers.

16. The computer-implemented method of claim 10, wherein identifying one of the at least two data centers to handle the second query based at least in part on the first criterion includes identifying which of the at least two data centers has been determined to have a most available computing capacity from among the at least two data centers.

* * * * *